US010981772B1

(12) United States Patent
Lyons et al.

(10) Patent No.: US 10,981,772 B1
(45) Date of Patent: Apr. 20, 2021

(54) PORTABLE BEVERAGE CONTAINER SYSTEMS AND METHODS FOR ADJUSTING THE COMPOSITION OF A BEVERAGE

(71) Applicant: LIFEFUELS, INC., Reston, VA (US)

(72) Inventors: Mark Lyons, Ashburn, VA (US); Robert Lawson-Shanks, Reston, VA (US); Abraham MacLean, Arlington, VA (US); Justin Toelle, Washington, DC (US); Filipe Aguiar, Reston, VA (US); Aleksander Drozdetski, Herndon, VA (US)

(73) Assignee: LifeFuels, Inc., Reston, VA (US)

( * ) Notice: Subject to any disclaimer, the term of this patent is extended or adjusted under 35 U.S.C. 154(b) by 0 days.

(21) Appl. No.: 16/664,846

(22) Filed: Oct. 26, 2019

Related U.S. Application Data

(60) Provisional application No. 62/900,510, filed on Sep. 14, 2019.

(51) Int. Cl.
*B67D 1/08* (2006.01)
*B67D 1/00* (2006.01)
(Continued)

(52) U.S. Cl.
CPC ........ *B67D 1/0888* (2013.01); *B01F 13/0022* (2013.01); *B01F 15/00155* (2013.01);
(Continued)

(58) Field of Classification Search
CPC .. A47J 43/0716; A47J 43/046; A47J 43/0727; A47J 19/02; A47J 31/005;
(Continued)

(56) References Cited

U.S. PATENT DOCUMENTS

D95,559 S 5/1935 Vogel
D97,347 S 10/1935 Gambell
(Continued)

FOREIGN PATENT DOCUMENTS

CN 1942392 4/2007
DE 3428178 2/1986
(Continued)

OTHER PUBLICATIONS

Space Linear Acceleration Mass Measurement Device (SLAMMD); NASA Life Sciences Data Archive; https://lsda.jsc.nasa.gov/Hardware/hardw/963? / Date Jul. 15, 2004.

*Primary Examiner* — Charles Cooley
(74) *Attorney, Agent, or Firm* — Kenealy Vaidya LLP

(57) ABSTRACT

A beverage apparatus, the beverage apparatus being hand-holdable by a user of the beverage apparatus to be portable, can include a beverage chamber housing that includes a chamber for storing a consumable liquid. The beverage apparatus can include a dispensing assembly that includes a receptacle. The receptacle can retain a vessel. The vessel can include an electronic tag and can contain an additive. The dispensing assembly can be operatively controllable by a controller to output the additive from the vessel into the consumable liquid. The beverage apparatus can include one or more sensors, devices, or assemblies that can be used to detect a volume of liquid in the chamber or a liquid level in the chamber. The beverage apparatus can include an apparatus computer processor portion (ACP) and an apparatus database portion.

18 Claims, 56 Drawing Sheets

(51) Int. Cl.
*B67D 1/12* (2006.01)
*B01F 13/00* (2006.01)
*B01F 15/00* (2006.01)

(52) U.S. Cl.
CPC ......... *B67D 1/0019* (2013.01); *B67D 1/0882* (2013.01); *B67D 1/1238* (2013.01); *B67D 1/1243* (2013.01); *B01F 2215/0022* (2013.01)

(58) Field of Classification Search
CPC ............. H04B 5/0056; G06K 7/10297; G06K 19/07788; B65D 81/3205; B65D 83/06; B65D 2203/10; B65D 23/14; B01F 3/1271; B01F 15/00155; B01F 13/0022; B01F 2215/0022; G01F 23/2962; G01F 23/296; B67D 1/0019; B67D 1/0888; B67D 1/1238; B67D 1/1243; B67D 1/0882; G01C 9/00; G01S 19/52
USPC .......................................................... 366/130
See application file for complete search history.

(56) References Cited

U.S. PATENT DOCUMENTS 2,071,399 A 2/1937 Gambell
D157,486 S 2/1950 Glowacki
2,682,355 A 6/1954 Robbins
D192,814 S 5/1962 Edwin
3,319,637 A 5/1967 Gore
3,548,657 A 12/1970 Panerai
D225,364 S 12/1972 Antoni
3,727,803 A 4/1973 Cobb
D242,132 S 11/1976 Hasegawa
4,051,726 A 10/1977 Hastbacka
4,087,024 A 5/1978 Martin
4,125,187 A 11/1978 Vecchiotti
4,133,457 A 1/1979 Klassen
4,450,722 A 5/1984 Keyes, IV
D279,621 S 7/1985 Richer
4,688,701 A 8/1987 Sedam
4,728,006 A 3/1988 Drobish
D295,954 S 5/1988 Kirchhoff
D296,302 S 6/1988 Weber
4,898,306 A 2/1990 Pardes
4,938,387 A 7/1990 Kervefors
4,964,541 A 10/1990 Gueret
5,080,260 A 1/1992 Doring
5,119,279 A 6/1992 Makowsky
5,139,169 A 8/1992 Boyer
5,174,458 A 12/1992 Segati
5,182,084 A 1/1993 Plester
D336,216 S 6/1993 Rohrbeck
5,325,765 A 7/1994 Sylvan
D352,204 S 11/1994 Hayes
5,377,877 A 1/1995 Brown et al.
5,379,916 A 1/1995 Martindale
5,398,853 A 3/1995 Latham
5,474,211 A 12/1995 Hellenberg
D372,867 S 8/1996 Lambelet
D382,808 S 8/1997 Fenton
D383,383 S 9/1997 Prestia
D387,992 S 12/1997 Kotoucek
5,725,125 A 3/1998 Bessette
5,747,824 A 5/1998 Jung
D396,603 S 8/1998 Gasser
5,810,062 A 9/1998 Bonora
D399,098 S 10/1998 Yang
D400,050 S 10/1998 Littmann
D404,253 S 1/1999 Littmann
5,938,080 A 8/1999 Haaser
6,077,579 A 6/2000 De Laforcade
6,142,063 A 11/2000 Beaulieu
6,170,712 B1 1/2001 Kasboske
6,230,884 B1 5/2001 Coory
6,422,422 B1 7/2002 Forbes
6,446,049 B1 9/2002 Janning
6,504,481 B2 1/2003 Teller
6,529,446 B1 3/2003 de la Huerga
D477,791 S 7/2003 Wells
D478,073 S 8/2003 Topinka
6,615,881 B2 9/2003 Bartholomew
6,644,471 B1 11/2003 Anderson
6,703,935 B1 3/2004 Chung
6,722,530 B1 4/2004 King
6,761,318 B2 7/2004 Dudek
D499,603 S 12/2004 Nikkhah
D500,936 S 1/2005 Nikkhah
6,889,872 B2 5/2005 Herman
6,921,911 B2 7/2005 Siepmann
6,925,871 B2 8/2005 Frank
6,935,493 B2 8/2005 Cho
D514,385 S 2/2006 Smith
7,004,213 B2 2/2006 Hansen
D517,852 S 3/2006 Jalet
7,009,519 B2 3/2006 Leonard
7,032,818 B2 * 4/2006 Thomas .............. B67D 1/0884
D522,860 S 6/2006 LaFortune
D523,332 S 6/2006 McEldowney
D525,135 S 7/2006 Bakic
7,104,184 B2 9/2006 Biderman
7,107,838 B2 9/2006 Chai
D529,340 S 10/2006 Laib
D530,968 S 10/2006 Bodum
D533,018 S 12/2006 Berg
7,172,095 B2 2/2007 Marshall
7,196,624 B2 3/2007 Teller
D541,106 S 4/2007 Spiegel
D541,596 S 5/2007 Hicks
7,228,879 B2 6/2007 Miller
7,319,523 B2 1/2008 Chiarello
D565,350 S 4/2008 Gauger
7,387,239 B2 6/2008 Thomas
D572,588 S 7/2008 Osborn
D573,464 S 7/2008 Kogure
7,439,859 B2 * 10/2008 Humphrey ........... G06Q 20/105
222/1
D582,767 S 12/2008 Batton
7,464,811 B2 12/2008 Patterson
7,501,933 B2 3/2009 Rousso
D591,599 S 5/2009 Okin
D593,411 S 6/2009 Bizzell
D596,487 S 7/2009 Batton
7,612,675 B2 11/2009 Miller
7,614,496 B2 11/2009 Dvorak
D608,637 S 1/2010 Getsy
D611,298 S 3/2010 Freeman
D613,183 S 4/2010 Overgaard
7,710,567 B1 5/2010 Mentzer
7,715,277 B2 5/2010 de la Huerga
D618,963 S 7/2010 Freeman
7,762,181 B2 7/2010 Boland
D621,283 S 8/2010 Overgaard
7,798,373 B1 9/2010 Wroblewski
7,825,804 B2 11/2010 Malik
D634,157 S 3/2011 Hoff
D635,823 S 4/2011 Mauffette
D635,864 S 4/2011 Lee
D639,607 S 6/2011 Bracq
RE42,937 E 11/2011 Lasher
8,083,055 B2 12/2011 Simonian
D651,474 S 1/2012 Gut
8,091,735 B2 1/2012 Girard
8,141,700 B2 3/2012 Simonian et al.
D658,982 S 5/2012 Pauser
D659,472 S 5/2012 D'Amato
8,196,776 B2 6/2012 Doglioni Majer
8,210,396 B2 7/2012 Girard
8,240,508 B2 8/2012 Wegelin
8,302,795 B2 11/2012 Van den Broek
8,361,527 B2 1/2013 Winkler
8,378,830 B2 2/2013 Moran
8,397,519 B2 3/2013 Loibl
8,417,377 B2 4/2013 Rothschild
8,463,447 B2 6/2013 Newman

(56) References Cited

U.S. PATENT DOCUMENTS

| | | | | |
|---|---|---|---|---|
| 8,464,633 | B2 | 6/2013 | Anson | |
| 8,485,359 | B2 | 7/2013 | Anderson | |
| D688,531 | S | 8/2013 | Ceder | |
| 8,515,574 | B2 | 8/2013 | Studor | |
| 8,522,968 | B2 | 9/2013 | Middleman | |
| 8,523,837 | B2 | 9/2013 | Wiggins | |
| D690,990 | S | 10/2013 | Boggs | |
| D690,991 | S | 10/2013 | Boggs | |
| 8,556,127 | B2 | 10/2013 | Olson | |
| 8,584,691 | B2 | 11/2013 | Hammonds | |
| 8,584,840 | B2 | 11/2013 | Kim | |
| 8,590,753 | B2 | 11/2013 | Marina | |
| D699,106 | S | 2/2014 | Glaser | |
| D699,996 | S | 2/2014 | De Leo | |
| D700,008 | S | 2/2014 | Ehrenhaus | |
| 8,678,183 | B2 | 3/2014 | Jones | |
| D702,474 | S | 4/2014 | Scherer | |
| 8,684,231 | B2 | 4/2014 | Lane | |
| 8,695,420 | B1 | 4/2014 | Korman | |
| 8,701,906 | B1 | 4/2014 | Anderson | |
| 8,717,182 | B1 | 5/2014 | Brashears | |
| 8,718,819 | B2 | 5/2014 | Hyde | |
| 8,754,769 | B2 | 6/2014 | Stein | |
| 8,757,227 | B2 | 6/2014 | Girard | |
| D709,387 | S | 7/2014 | Marina | |
| 8,794,485 | B2 | 8/2014 | Lunn | |
| 8,801,688 | B2 | 8/2014 | Wiggins | |
| 8,833,607 | B2 | 9/2014 | Wegelin | |
| 8,851,740 | B1 * | 10/2014 | Mills | A47J 43/042 222/132 |
| 8,919,613 | B2 | 12/2014 | Mileti | |
| 8,940,163 | B2 | 1/2015 | Bassett | |
| 8,945,374 | B2 | 2/2015 | Chase | |
| 8,977,389 | B2 | 3/2015 | Witchell | |
| 8,979,539 | B1 | 3/2015 | Snyder | |
| 8,985,395 | B2 | 3/2015 | Tansey | |
| 8,989,673 | B2 | 3/2015 | Sandy | |
| 8,991,648 | B2 | 3/2015 | Smith | |
| D727,171 | S | 4/2015 | Marina | |
| 9,014,846 | B2 * | 4/2015 | Newman | B67D 1/0878 700/233 |
| 9,020,635 | B2 | 4/2015 | Hortin | |
| D729,571 | S | 5/2015 | Wilson | |
| 9,031,689 | B1 | 5/2015 | Fink | |
| 9,035,222 | B2 | 5/2015 | Alexander | |
| 9,035,765 | B2 | 5/2015 | Engelhard | |
| D731,242 | S | 6/2015 | Machovina | |
| D731,243 | S | 6/2015 | Machovina | |
| 9,102,441 | B1 | 8/2015 | Orvik | |
| 9,111,324 | B2 | 8/2015 | Hyde | |
| 9,126,738 | B2 | 9/2015 | Boggs | |
| 9,134,020 | B1 | 9/2015 | Wells | |
| 9,138,091 | B2 | 9/2015 | Zhao | |
| 9,151,605 | B1 | 10/2015 | Sweeney | |
| 9,161,654 | B2 | 10/2015 | Belmont | |
| 9,169,112 | B2 | 10/2015 | Chase | |
| D742,691 | S | 11/2015 | Zhang | |
| D746,046 | S | 12/2015 | Lee | |
| D748,955 | S | 2/2016 | Oliver | |
| 9,254,250 | B1 | 2/2016 | Orofino | |
| D751,865 | S | 3/2016 | Harris | |
| D752,391 | S | 3/2016 | Hatherell | |
| D752,396 | S | 3/2016 | Tu | |
| 9,290,309 | B1 | 3/2016 | Pabon | |
| D758,868 | S | 6/2016 | Bretschneider | |
| 9,357,887 | B2 | 6/2016 | Wegelin | |
| D760,537 | S | 7/2016 | Hertaus | |
| D768,507 | S | 10/2016 | Hotell | |
| 9,506,798 | B2 | 11/2016 | Saltzgiver | |
| D779,881 | S | 2/2017 | Lee | |
| D813,049 | S | 3/2018 | Richmond | |
| 9,932,217 | B2 * | 4/2018 | Perrelli | G06F 19/3475 |
| D826,052 | S | 8/2018 | Harris | |
| 10,095,972 | B2 | 10/2018 | Bhatia et al. | |
| D836,385 | S | 12/2018 | Arzunyan | |
| D837,594 | S | 1/2019 | Palese | |
| 10,231,567 | B2 * | 3/2019 | Perrelli | B67D 1/0017 |
| 10,328,402 | B2 * | 6/2019 | Kolar | H04L 12/281 |
| 10,363,530 | B2 * | 7/2019 | Kolar | G08C 17/02 |
| D856,083 | S * | 8/2019 | Lawson-Shanks | D7/507 |
| 10,413,131 | B2 * | 9/2019 | Kolar | A47J 43/0777 |
| 10,512,358 | B1 * | 12/2019 | Perrelli | B65D 81/3222 |
| D878,864 | S * | 3/2020 | Lawson-Shanks | D7/507 |
| 10,621,850 | B2 * | 4/2020 | Laidlaw | H04W 4/60 |
| 10,674,857 | B2 * | 6/2020 | Lyons | A47J 31/005 |
| 10,765,252 | B2 * | 9/2020 | Perrelli | B67D 1/0871 |
| 2002/0070861 | A1 | 6/2002 | Teller | |
| 2002/0090426 | A1 | 7/2002 | Denny | |
| 2002/0129663 | A1 | 9/2002 | Hoyt | |
| 2005/0284302 | A1 | 12/2005 | Levin | |
| 2007/0137643 | A1 | 6/2007 | Bonney | |
| 2007/0214055 | A1 | 9/2007 | Temko | |
| 2008/0023488 | A1 | 1/2008 | Guerrero | |
| 2008/0190958 | A1 | 8/2008 | Wyner | |
| 2009/0069930 | A1 | 3/2009 | Peters | |
| 2009/0120815 | A1 | 5/2009 | Mitchell | |
| 2009/0205506 | A1 | 8/2009 | Lin | |
| 2009/0206084 | A1 | 8/2009 | Woolf | |
| 2009/0228367 | A1 | 9/2009 | Hughes | |
| 2009/0272274 | A1 | 11/2009 | De Graaff | |
| 2010/0055252 | A1 | 3/2010 | Marina | |
| 2010/0163567 | A1 | 7/2010 | Chiang | |
| 2010/0183776 | A1 | 7/2010 | Gruenwald | |
| 2010/0219151 | A1 | 9/2010 | Risheq | |
| 2011/0006071 | A1 | 1/2011 | Koumans | |
| 2011/0024537 | A1 | 2/2011 | Gonzalez | |
| 2011/0049161 | A1 | 3/2011 | Savinsky | |
| 2011/0050431 | A1 | 3/2011 | Hood | |
| 2011/0052764 | A1 | 3/2011 | Bulgin | |
| 2011/0166910 | A1 | 7/2011 | Marina | |
| 2011/0180563 | A1 | 7/2011 | Fitchett | |
| 2012/0017766 | A1 | 1/2012 | Anson | |
| 2012/0035761 | A1 | 2/2012 | Tilton | |
| 2012/0094261 | A1 | 4/2012 | Hayn | |
| 2012/0097567 | A1 | 4/2012 | Zhao | |
| 2012/0104023 | A1 | 5/2012 | Anselmino | |
| 2012/0173164 | A1 | 7/2012 | Steuerwald | |
| 2012/0230149 | A1 * | 9/2012 | Martin | A47J 43/0727 366/205 |
| 2012/0234183 | A1 | 9/2012 | Edwards | |
| 2012/0267320 | A1 | 10/2012 | Baccigalopi | |
| 2013/0001244 | A1 | 1/2013 | Wegelin | |
| 2013/0037506 | A1 | 2/2013 | Wahlstrom | |
| 2013/0043304 | A1 | 2/2013 | Agan | |
| 2013/0092567 | A1 | 4/2013 | Lok | |
| 2013/0127748 | A1 | 5/2013 | Vertegaal | |
| 2013/0139703 | A1 | 6/2013 | Hogarth | |
| 2013/0156904 | A1 | 6/2013 | Nosler | |
| 2013/0186779 | A1 | 7/2013 | Kambouris | |
| 2013/0226337 | A1 | 8/2013 | Leech | |
| 2013/0240079 | A1 | 9/2013 | Petrini | |
| 2013/0247770 | A1 | 9/2013 | Wilder | |
| 2013/0319915 | A1 | 12/2013 | Gellibolian | |
| 2014/0044837 | A1 | 2/2014 | Weisman | |
| 2014/0079856 | A1 | 3/2014 | Hatherell | |
| 2014/0110476 | A1 | 4/2014 | Sheehan | |
| 2014/0114469 | A1 | 4/2014 | Givens | |
| 2014/0269154 | A1 * | 9/2014 | Kolar | A47J 43/08 366/142 |
| 2014/0272019 | A1 | 9/2014 | Schuh | |
| 2014/0273925 | A1 | 9/2014 | Burgett | |
| 2014/0277707 | A1 | 9/2014 | Akdogan | |
| 2014/0303790 | A1 * | 10/2014 | Huang | G06Q 50/22 700/281 |
| 2014/0305952 | A1 | 10/2014 | Harris | |
| 2014/0312247 | A1 | 10/2014 | McKee | |
| 2014/0324585 | A1 | 10/2014 | Mederos | |
| 2014/0335490 | A1 | 11/2014 | Baarman | |
| 2014/0352843 | A1 | 12/2014 | Solera et al. | |
| 2014/0354438 | A1 | 12/2014 | Hazen | |
| 2014/0372045 | A1 * | 12/2014 | Keski-Pukkila | A61B 5/4875 702/19 |
| 2014/0374438 | A1 | 12/2014 | Carpenter | |
| 2015/0014369 | A1 | 1/2015 | Hatton | |

(56) References Cited

U.S. PATENT DOCUMENTS

2015/0024349 A1 1/2015 Bischoff
2015/0088304 A1 3/2015 Ameye
2015/0115158 A1 4/2015 Fu
2015/0060482 A1 5/2015 Murray
2015/0122688 A1* 5/2015 Dias .................... A47G 19/025 206/459.1
2015/0173488 A1 6/2015 Witchell
2015/0175400 A1 6/2015 Newman
2015/0182797 A1* 7/2015 Wernow ............. G06F 19/3418 434/247
2015/0183627 A1 7/2015 Tansey, Jr.
2015/0223623 A1 8/2015 Davis
2015/0272394 A1 10/2015 Lin
2015/0284163 A1 10/2015 Manwani
2016/0159632 A1* 6/2016 Wheatley ........... G06F 19/3475 222/1
2016/0174470 A1 6/2016 Shaffer
2016/0220973 A1* 8/2016 Kolar ..................... A47J 43/07
2016/0251234 A1 9/2016 Hayslett
2016/0257554 A1 9/2016 Manwani
2016/0317985 A1 11/2016 Mutschler
2016/0376140 A1 12/2016 Tansey
2017/0087524 A1* 3/2017 Deshpande ......... B01F 13/0022
2017/0156540 A1* 6/2017 Wheatley ............. A47J 31/002
2017/0303744 A1* 10/2017 Sutton ................ A47J 43/0772
2017/0361984 A1 12/2017 Fouad
2018/0020875 A1* 1/2018 Kolar .................... B01F 13/047 366/279
2018/0059790 A1* 3/2018 Kolar .................. A47J 43/0722
2018/0072553 A1* 3/2018 Lyons ....................... A45F 3/18
2018/0099850 A1* 4/2018 Lyons .................. A47J 31/002
2018/0168385 A1* 6/2018 Boone ..................... A47J 31/18
2018/0177325 A1* 6/2018 Lyons .................. A47J 31/005
2018/0208447 A1 7/2018 Perrelli
2018/0344070 A1 12/2018 Perrelli
2019/0001288 A1* 1/2019 Ciepiel ............... A47J 43/0716
2019/0015803 A1* 1/2019 Goodson ................ A23G 9/045
2019/0060849 A1* 2/2019 Waggoner ........... B01F 13/0022
2019/0208948 A1 7/2019 Perrelli
2020/0113374 A1* 4/2020 Perrelli ................. A47J 31/521
2020/0122992 A1* 4/2020 Lyons .................. B67D 1/0871
2020/0205615 A1* 7/2020 Pamplin .................... H02J 7/00
2020/0242910 A1* 7/2020 Laidlaw ................. B65D 23/14

FOREIGN PATENT DOCUMENTS

EP 1793326 6/2007
EP 1671568 1/2008
GB 860987 2/1961
WO WO 2008 / 111072 9/2008
WO WO-2016201305 A1 * 12/2016 ........... B67D 1/0016
WO WO 2016201305 A1 12/2016
WO 2017/085073 A1 * 5/2017

* cited by examiner

Ecosystem Server 20
remote data storage 107
Data analytics processing 109
SYSTEM 10
108 Network/Cloud
100
111
APIs to other applications
106
insertable
RFID tag 102
101
Local data storage 105
Position of tag and point of attachment of tag on the pod can be varied
102'

212
201 top end
200
214
213
211
222
216
220
202 bottom end 259 bottom end of additive vessel
281
282
285

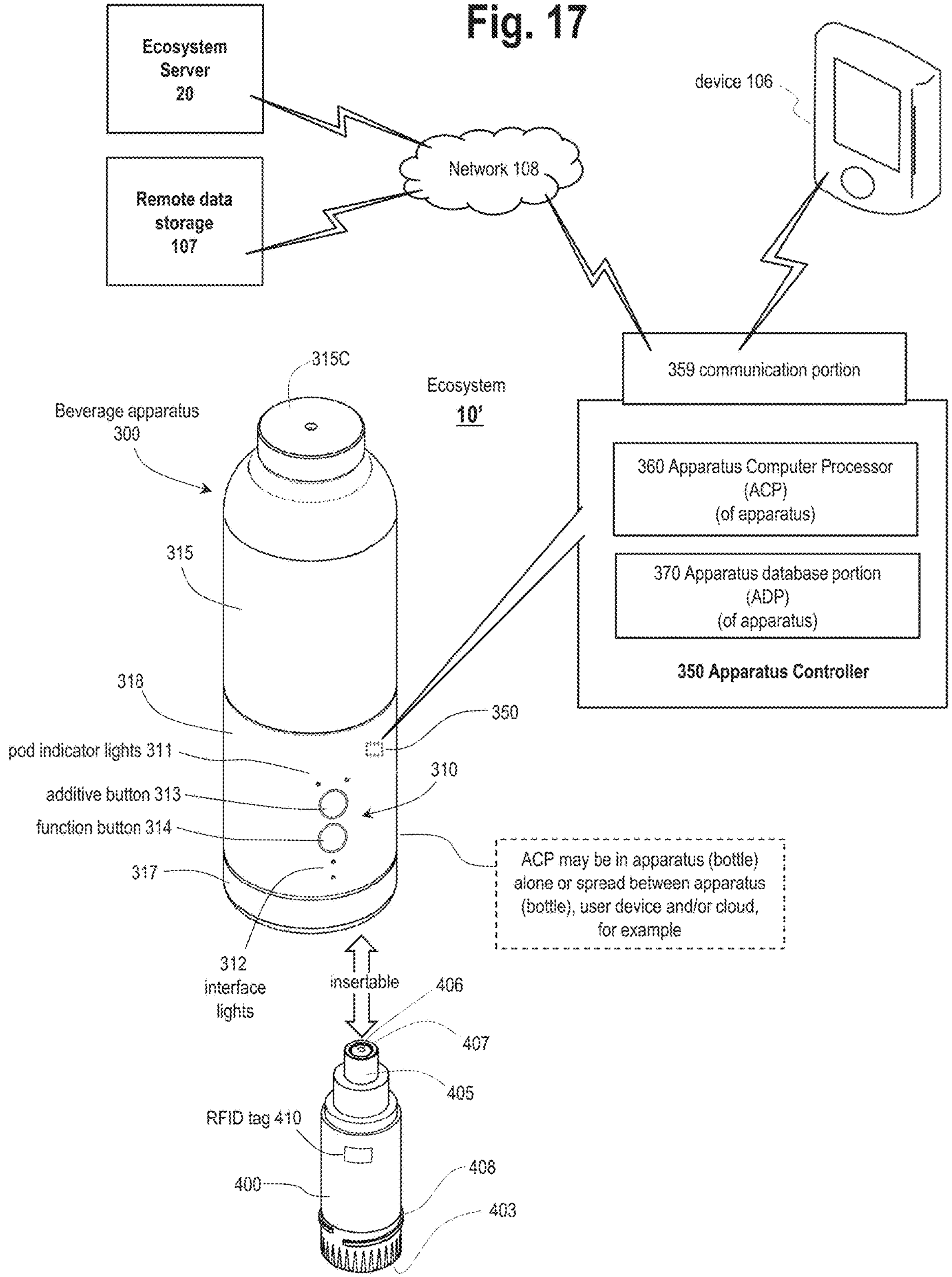

Fig. 17
Ecosystem Server 20
Remote data storage 107
Network 108
device 106
359 communication portion
360 Apparatus Computer Processor (ACP) (of apparatus)
370 Apparatus database portion (ADP) (of apparatus)
350 Apparatus Controller
315C
Ecosystem 10'
Beverage apparatus 300
315
318
350
pod indicator lights 311
310
additive button 313
function button 314
317
ACP may be in apparatus (bottle) alone or spread between apparatus (bottle), user device and/or cloud, for example
312 interface lights
insertable
406
407
405
RFID tag 410
408
400
403

300 Beverage apparatus
INTERNAL VOLUME 316
406
390
307
308
390'
309S
M
341 RFID Transceiver (reader)
350 Controller
309S
318
317
400
403
tag 410
342
340
309
342'
340'
400'
410' RFID tag
350 Apparatus Controller
360 Apparatus processing portion (ACP) (of apparatus)
370 Apparatus database portion (ADP) (of apparatus)
Apparatus Controller 350

| Apparatus Data Record | Memory Block |
|---|---|
| 1 | Pod1_Enabled? |
| 2 | Facility_ID_Recalled |
| 3 | Lot_number_Recalled |
| 4 | Profile_warnings_data |
| 5 | HASH_Function |
| 6 | TPP_HASH_value |

315C
300

315
316
307
353 ultrasonic sensor
351
305
319
319 dispense mechanism
306
360 ACP (apparatus computer processor)
370 database portion
318
357
350 apparatus controller
400
354
308
352 clock
355 accelerometer
351
356 angle sensor
317
410
403
309

410 RFID Tag
420
430
411 tag structure (substrate)
412 antenna
430 tag memory portion (TMP) (see Fig. 24)
420 Tag processing portion (TPP) (integrated circuit)

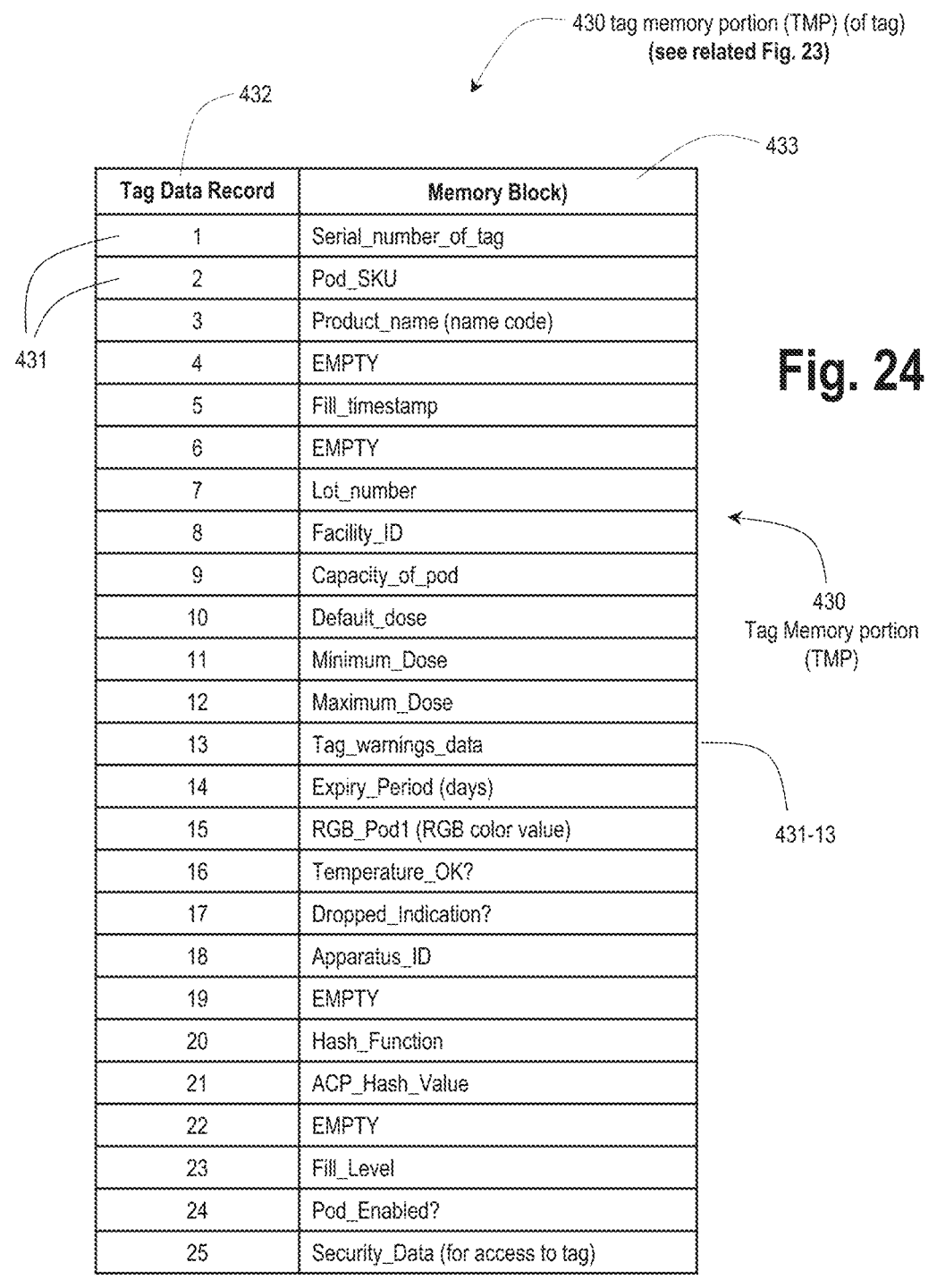

| Tag Data Record | Memory Block) |
|---|---|
| 1 | Serial_number_of_tag |
| 2 | Pod_SKU |
| 3 | Product_name (name code) |
| 4 | EMPTY |
| 5 | Fill_timestamp |
| 6 | EMPTY |
| 7 | Lot_number |
| 8 | Facility_ID |
| 9 | Capacity_of_pod |
| 10 | Default_dose |
| 11 | Minimum_Dose |
| 12 | Maximum_Dose |
| 13 | Tag_warnings_data |
| 14 | Expiry_Period (days) |
| 15 | RGB_Pod1 (RGB color value) |
| 16 | Temperature_OK? |
| 17 | Dropped_Indication? |
| 18 | Apparatus_ID |
| 19 | EMPTY |
| 20 | Hash_Function |
| 21 | ACP_Hash_Value |
| 22 | EMPTY |
| 23 | Fill_Level |
| 24 | Pod_Enabled? |
| 25 | Security_Data (for access to tag) |

Fig. 24

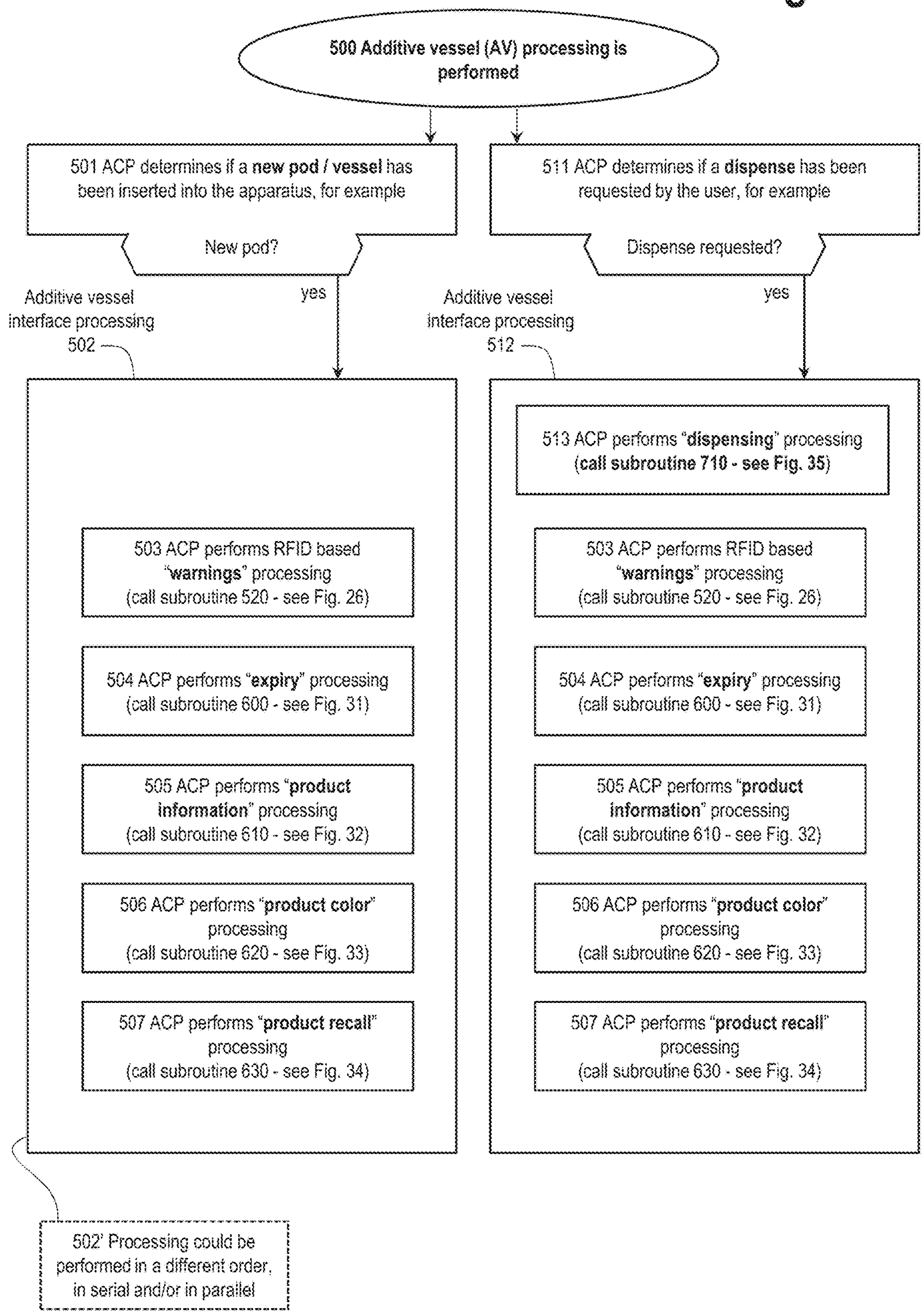
Fig. 25
500 Additive vessel (AV) processing is performed
501 ACP determines if a new pod / vessel has been inserted into the apparatus, for example
New pod?
yes
511 ACP determines if a dispense has been requested by the user, for example
Dispense requested?
yes
Additive vessel interface processing 502
Additive vessel interface processing 512
513 ACP performs "dispensing" processing (call subroutine 710 - see Fig. 35)
503 ACP performs RFID based "warnings" processing (call subroutine 520 - see Fig. 26)
504 ACP performs "expiry" processing (call subroutine 600 - see Fig. 31)
505 ACP performs "product information" processing (call subroutine 610 - see Fig. 32)
506 ACP performs "product color" processing (call subroutine 620 - see Fig. 33)
507 ACP performs "product recall" processing (call subroutine 630 - see Fig. 34)
503 ACP performs RFID based "warnings" processing (call subroutine 520 - see Fig. 26)
504 ACP performs "expiry" processing (call subroutine 600 - see Fig. 31)
505 ACP performs "product information" processing (call subroutine 610 - see Fig. 32)
506 ACP performs "product color" processing (call subroutine 620 - see Fig. 33)
507 ACP performs "product recall" processing (call subroutine 630 - see Fig. 34)
502' Processing could be performed in a different order, in serial and/or in parallel

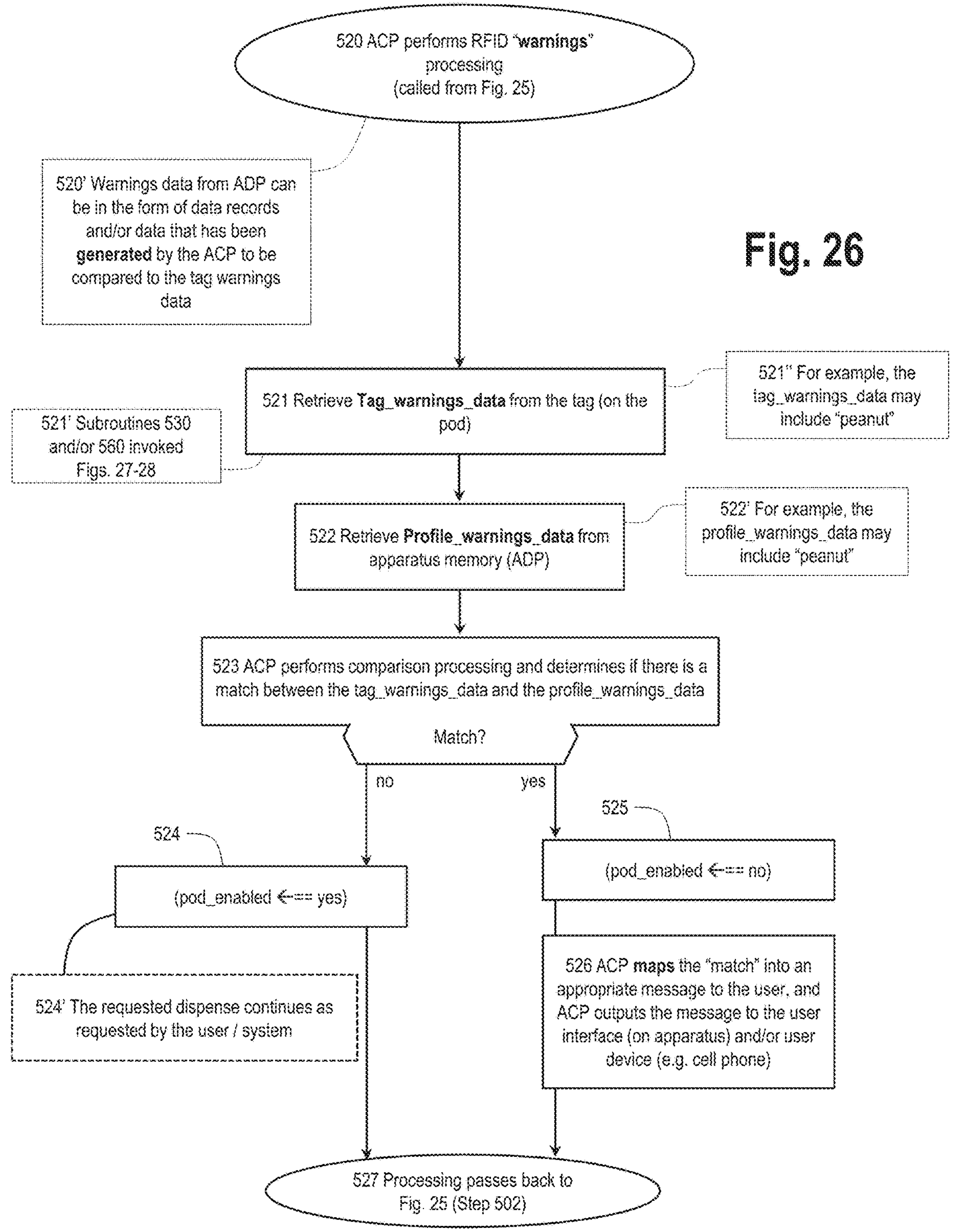
520 ACP performs RFID "warnings" processing (called from Fig. 25)
520' Warnings data from ADP can be in the form of data records and/or data that has been generated by the ACP to be compared to the tag warnings data
Fig. 26
521 Retrieve Tag_warnings_data from the tag (on the pod)
521'' For example, the tag_warnings_data may include "peanut"
521' Subroutines 530 and/or 560 invoked Figs. 27-28
522 Retrieve Profile_warnings_data from apparatus memory (ADP)
522' For example, the profile_warnings_data may include "peanut"
523 ACP performs comparison processing and determines if there is a match between the tag_warnings_data and the profile_warnings_data
Match?
no
yes
524
(pod_enabled <== yes)
525
(pod_enabled <== no)
524' The requested dispense continues as requested by the user / system
526 ACP maps the "match" into an appropriate message to the user, and ACP outputs the message to the user interface (on apparatus) and/or user device (e.g. cell phone)
527 Processing passes back to Fig. 25 (Step 502)

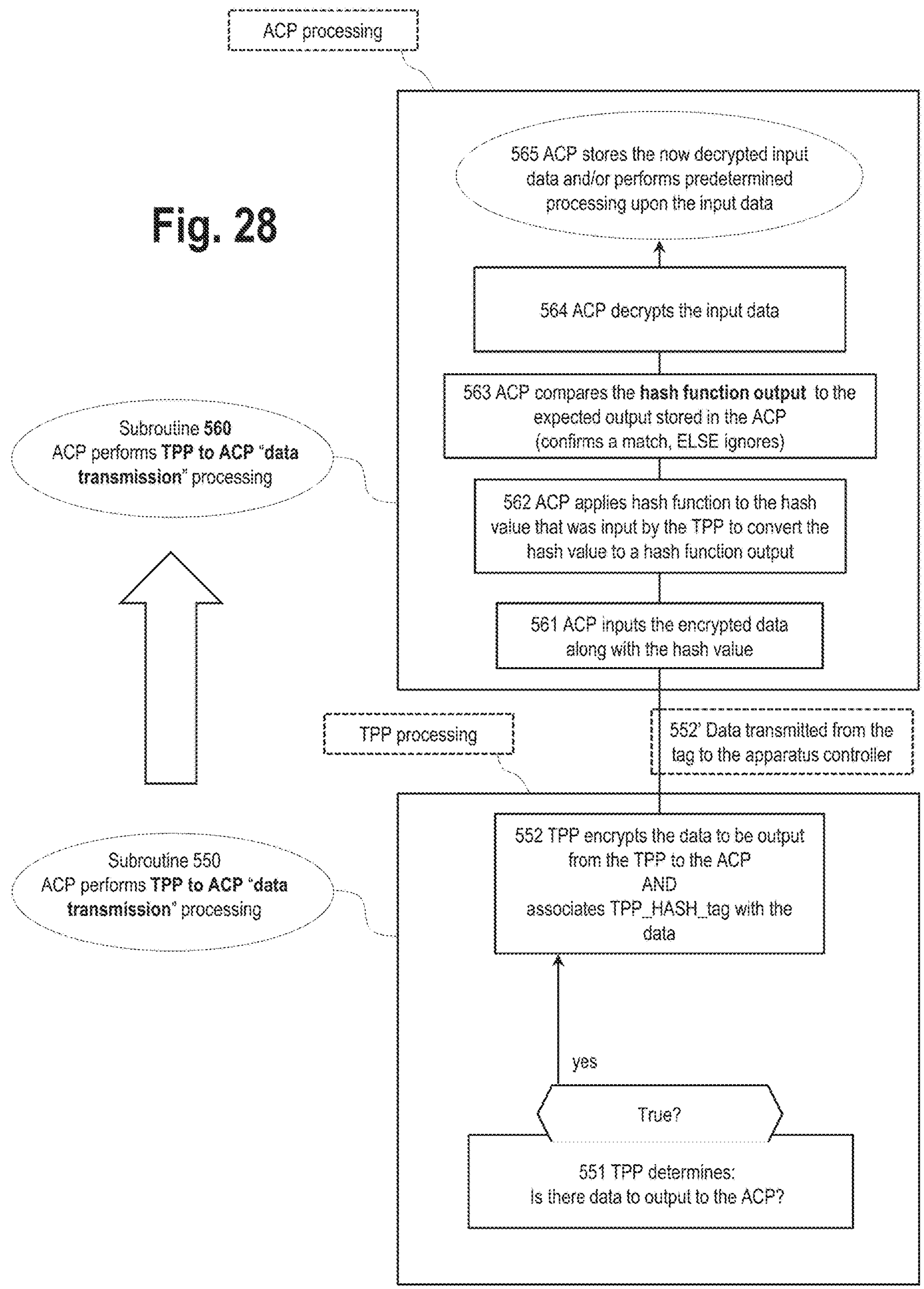
ACP processing
Fig. 28
565 ACP stores the now decrypted input data and/or performs predetermined processing upon the input data
564 ACP decrypts the input data
563 ACP compares the hash function output to the expected output stored in the ACP (confirms a match, ELSE ignores)
Subroutine 560 ACP performs TPP to ACP "data transmission" processing
562 ACP applies hash function to the hash value that was input by the TPP to convert the hash value to a hash function output
561 ACP inputs the encrypted data along with the hash value
TPP processing
552' Data transmitted from the tag to the apparatus controller
552 TPP encrypts the data to be output from the TPP to the ACP AND associates TPP_HASH_tag with the data
Subroutine 550 ACP performs TPP to ACP "data transmission" processing
yes
True?
551 TPP determines: Is there data to output to the ACP?

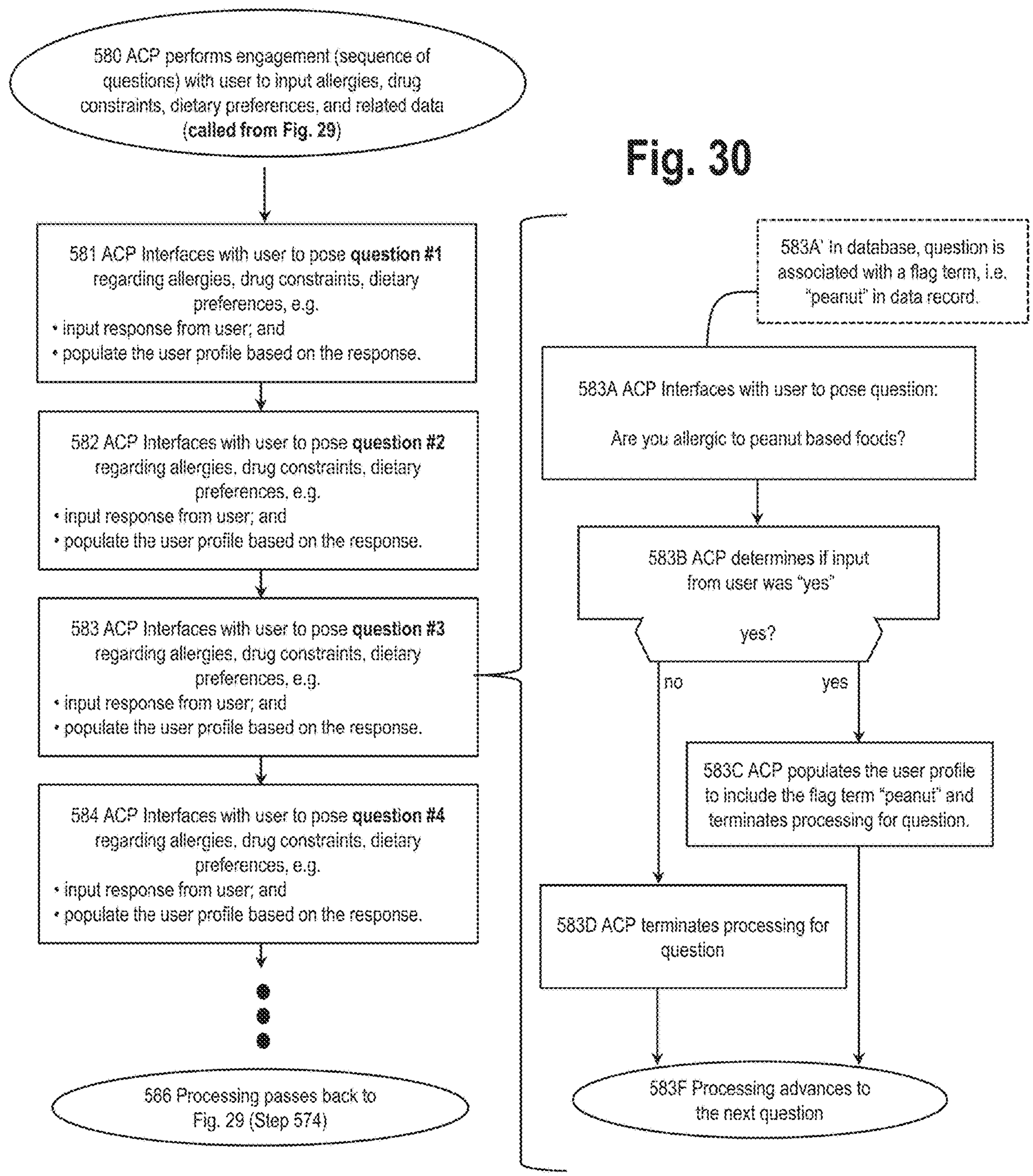

580 ACP performs engagement (sequence of questions) with user to input allergies, drug constraints, dietary preferences, and related data (called from Fig. 29)
Fig. 30
581 ACP Interfaces with user to pose question #1 regarding allergies, drug constraints, dietary preferences, e.g.
• input response from user; and
• populate the user profile based on the response.
582 ACP Interfaces with user to pose question #2 regarding allergies, drug constraints, dietary preferences, e.g.
• input response from user; and
• populate the user profile based on the response.
583 ACP Interfaces with user to pose question #3 regarding allergies, drug constraints, dietary preferences, e.g.
• input response from user; and
• populate the user profile based on the response.
584 ACP Interfaces with user to pose question #4 regarding allergies, drug constraints, dietary preferences, e.g.
• input response from user; and
• populate the user profile based on the response.
586 Processing passes back to Fig. 29 (Step 574)
583A' In database, question is associated with a flag term, i.e. "peanut" in data record.
583A ACP Interfaces with user to pose question:
Are you allergic to peanut based foods?
583B ACP determines if input from user was "yes"
yes?
no
yes
583C ACP populates the user profile to include the flag term "peanut" and terminates processing for question.
583D ACP terminates processing for question
583F Processing advances to the next question

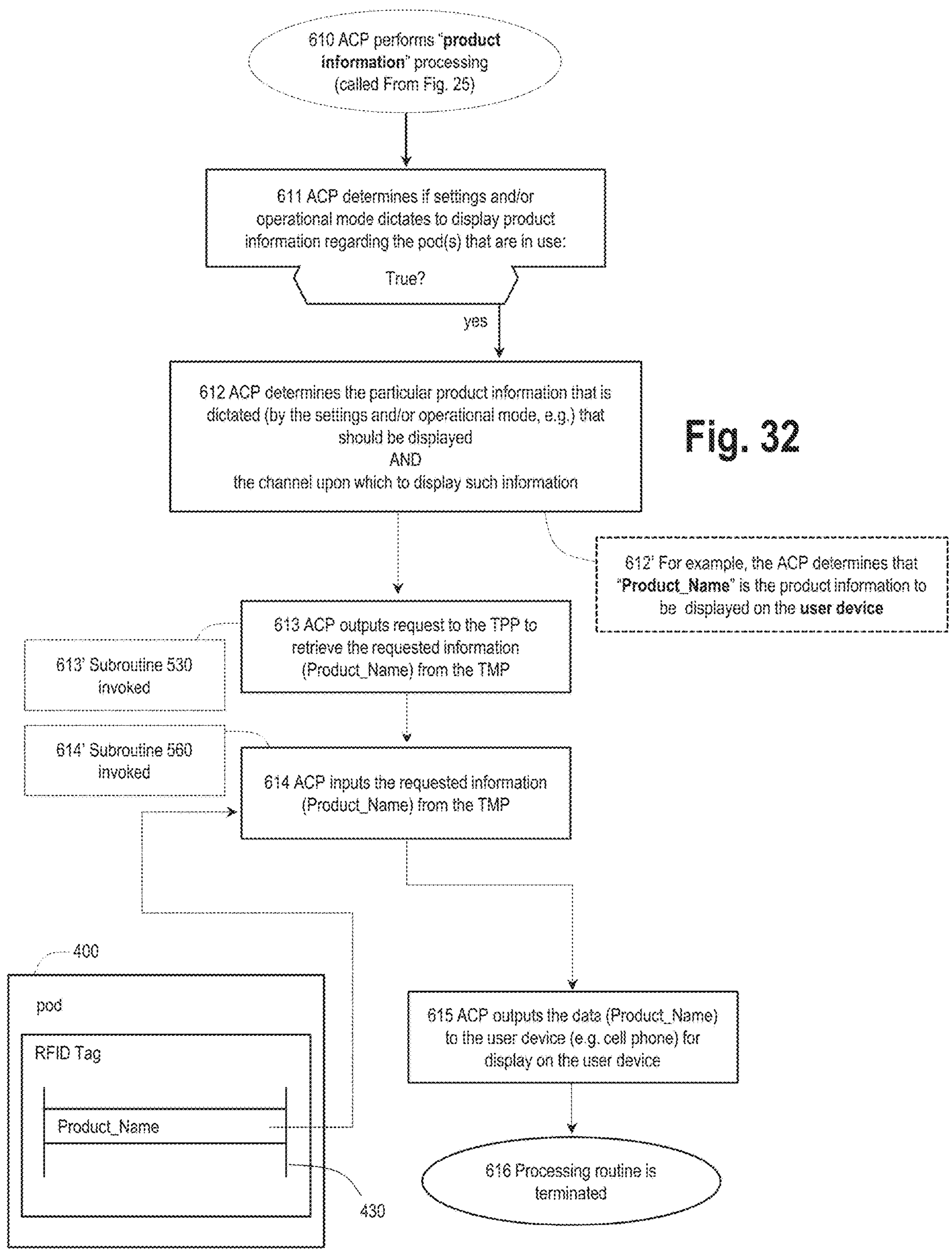
610 ACP performs "product information" processing (called From Fig. 25)
611 ACP determines if settings and/or operational mode dictates to display product information regarding the pod(s) that are in use:
True?
yes
612 ACP determines the particular product information that is dictated (by the settings and/or operational mode, e.g.) that should be displayed
AND
the channel upon which to display such information
Fig. 32
612' For example, the ACP determines that "Product_Name" is the product information to be displayed on the user device
613 ACP outputs request to the TPP to retrieve the requested information (Product_Name) from the TMP
613' Subroutine 530 invoked
614' Subroutine 560 invoked
614 ACP inputs the requested information (Product_Name) from the TMP
400
pod
RFID Tag
Product_Name
430
615 ACP outputs the data (Product_Name) to the user device (e.g. cell phone) for display on the user device
616 Processing routine is terminated

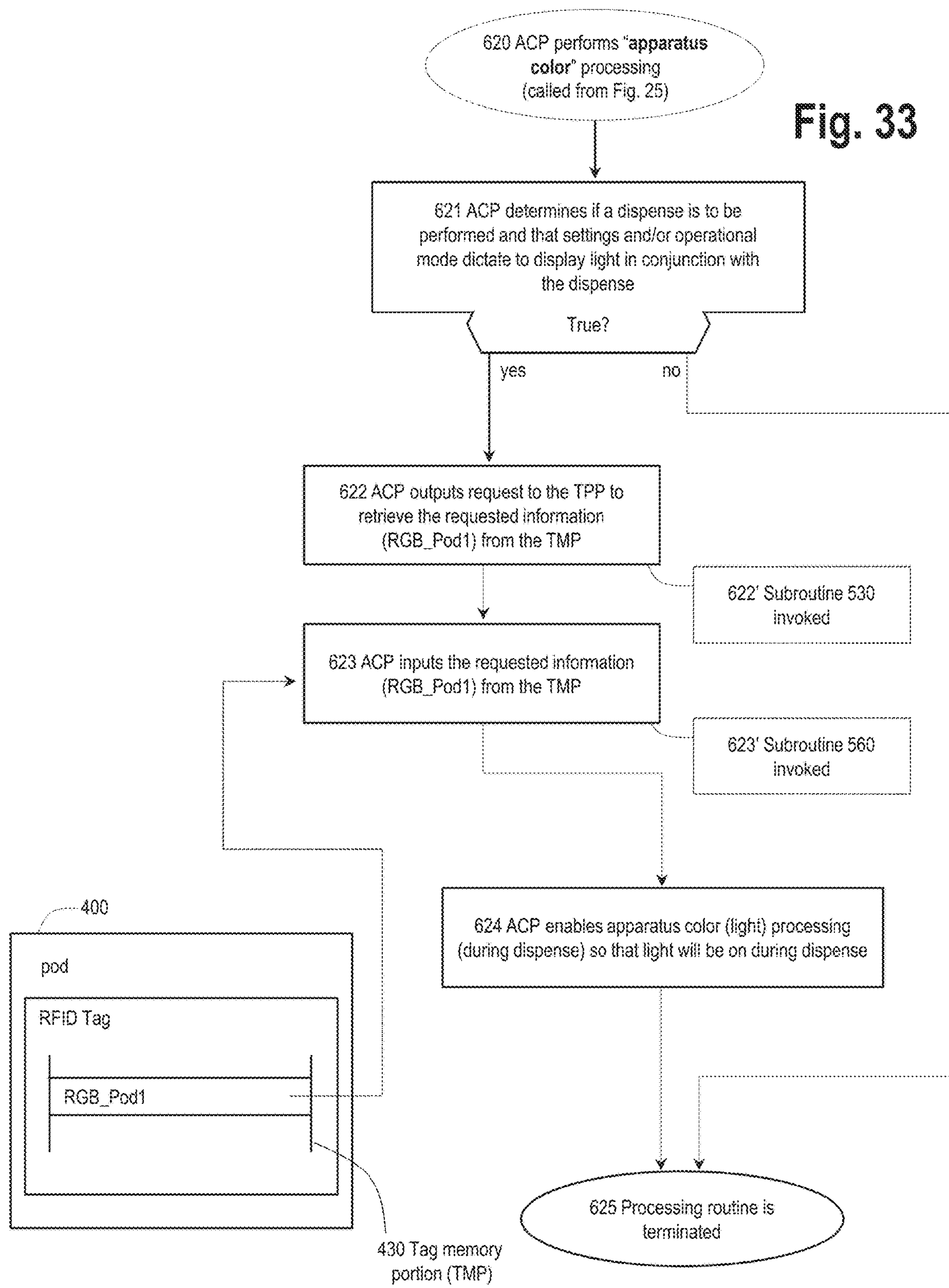
620 ACP performs "apparatus color" processing (called from Fig. 25)
Fig. 33
621 ACP determines if a dispense is to be performed and that settings and/or operational mode dictate to display light in conjunction with the dispense
True?
yes
no
622 ACP outputs request to the TPP to retrieve the requested information (RGB_Pod1) from the TMP
622' Subroutine 530 invoked
623 ACP inputs the requested information (RGB_Pod1) from the TMP
623' Subroutine 560 invoked
624 ACP enables apparatus color (light) processing (during dispense) so that light will be on during dispense
400
pod
RFID Tag
RGB_Pod1
430 Tag memory portion (TMP)
625 Processing routine is terminated

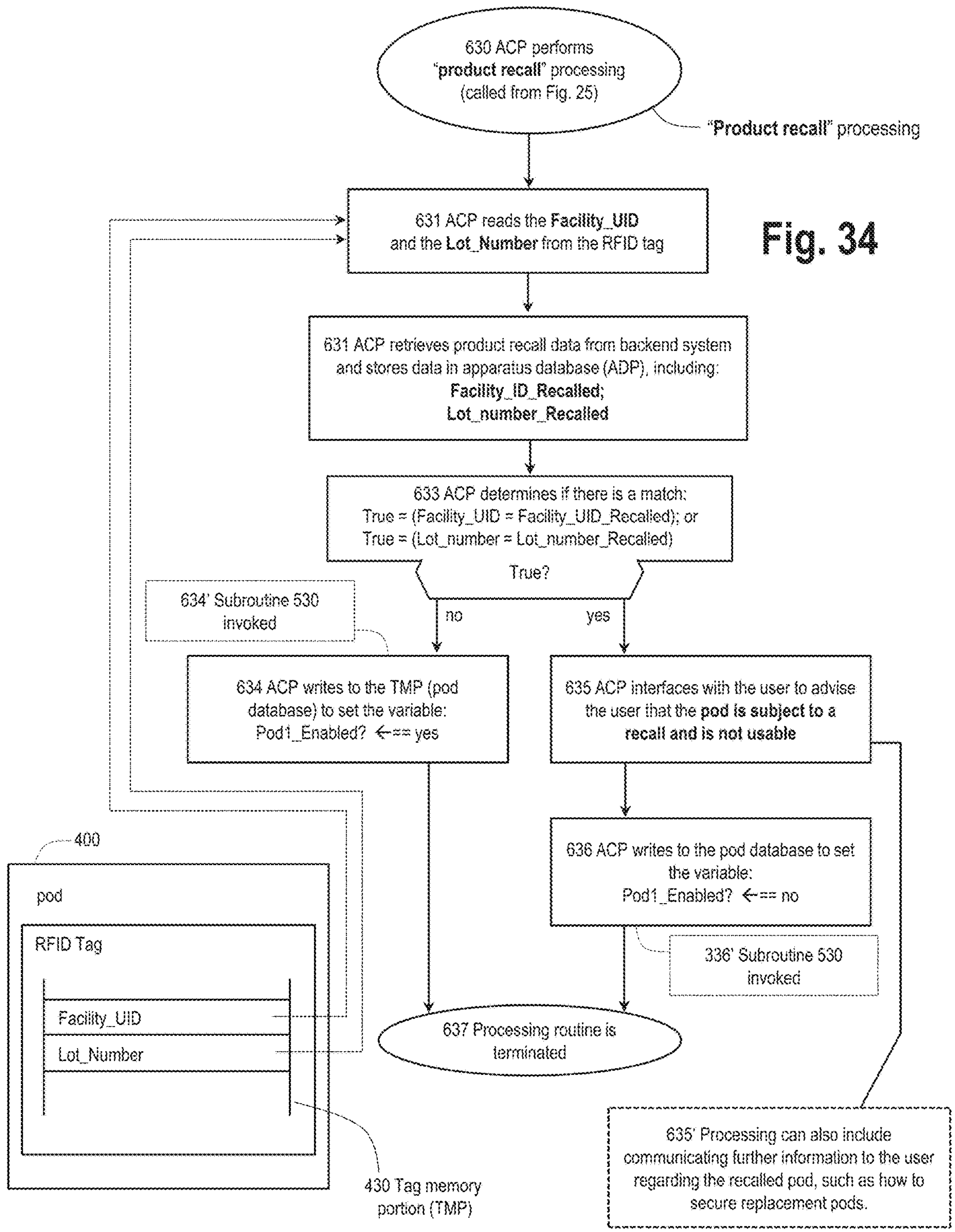
630 ACP performs "product recall" processing (called from Fig. 25)
"Product recall" processing
631 ACP reads the Facility_UID and the Lot_Number from the RFID tag
Fig. 34
631 ACP retrieves product recall data from backend system and stores data in apparatus database (ADP), including: Facility_ID_Recalled; Lot_number_Recalled
633 ACP determines if there is a match: True = (Facility_UID = Facility_UID_Recalled); or True = (Lot_number = Lot_number_Recalled)
True?
no
yes
634' Subroutine 530 invoked
634 ACP writes to the TMP (pod database) to set the variable: Pod1_Enabled? <== yes
635 ACP interfaces with the user to advise the user that the pod is subject to a recall and is not usable
636 ACP writes to the pod database to set the variable: Pod1_Enabled? <== no
336' Subroutine 530 invoked
637 Processing routine is terminated
400
pod
RFID Tag
Facility_UID
Lot_Number
430 Tag memory portion (TMP)
635' Processing can also include communicating further information to the user regarding the recalled pod, such as how to secure replacement pods.

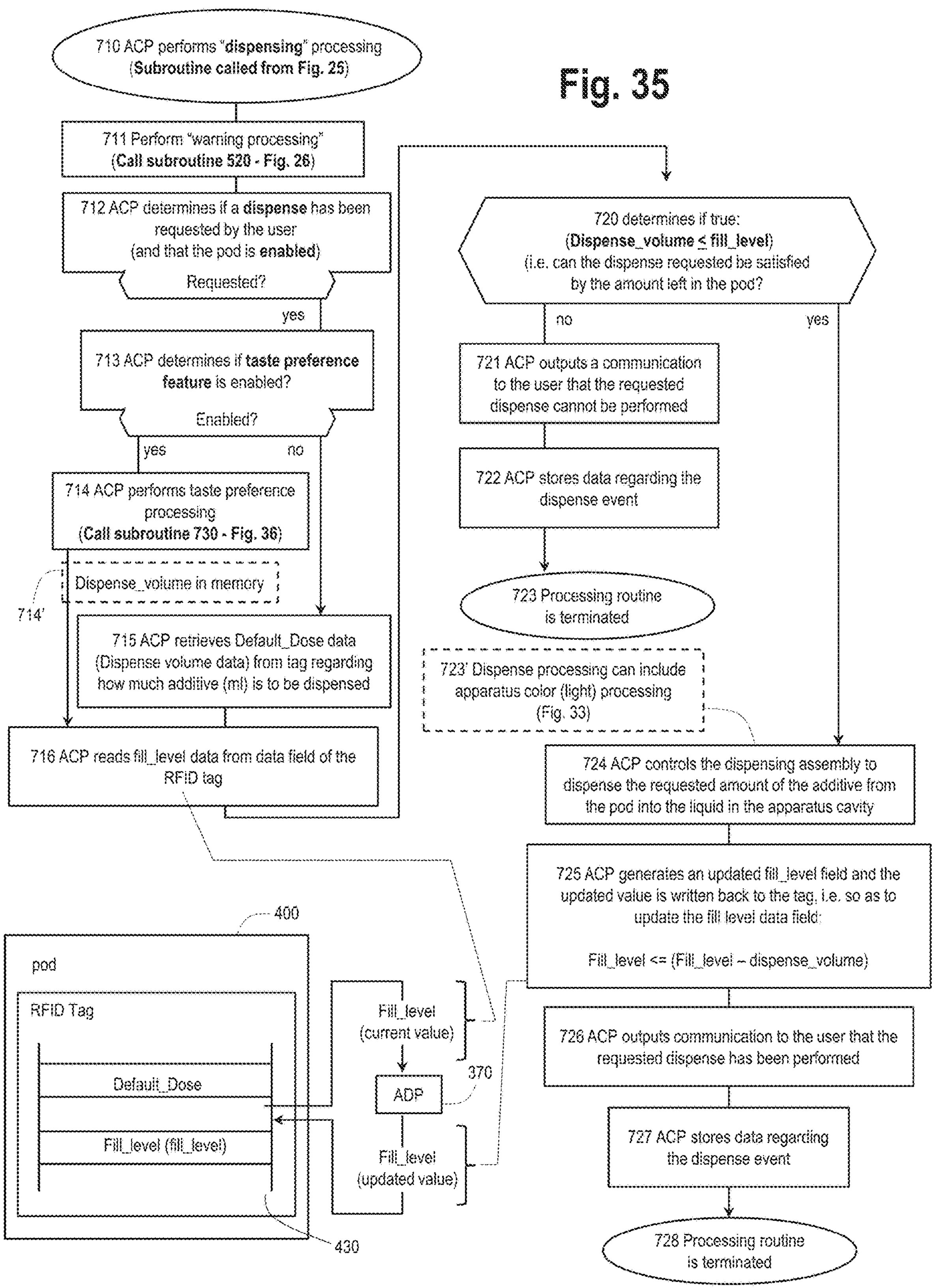

710 ACP performs "dispensing" processing (Subroutine called from Fig. 25)
Fig. 35
711 Perform "warning processing" (Call subroutine 520 - Fig. 26)
712 ACP determines if a dispense has been requested by the user (and that the pod is enabled)
Requested?
yes
713 ACP determines if taste preference feature is enabled?
Enabled?
yes
no
714 ACP performs taste preference processing (Call subroutine 730 - Fig. 36)
Dispense_volume in memory
714'
715 ACP retrieves Default_Dose data (Dispense volume data) from tag regarding how much additive (ml) is to be dispensed
716 ACP reads fill_level data from data field of the RFID tag
720 determines if true: (Dispense_volume ≤ fill_level) (i.e. can the dispense requested be satisfied by the amount left in the pod?
no
yes
721 ACP outputs a communication to the user that the requested dispense cannot be performed
722 ACP stores data regarding the dispense event
723 Processing routine is terminated
723' Dispense processing can include apparatus color (light) processing (Fig. 33)
724 ACP controls the dispensing assembly to dispense the requested amount of the additive from the pod into the liquid in the apparatus cavity
725 ACP generates an updated fill_level field and the updated value is written back to the tag, i.e. so as to update the fill level data field:
Fill_level <= (Fill_level – dispense_volume)
726 ACP outputs communication to the user that the requested dispense has been performed
727 ACP stores data regarding the dispense event
728 Processing routine is terminated
400
pod
RFID Tag
Default_Dose
Fill_level (fill_level)
430
Fill_level (current value)
ADP
370
Fill_level (updated value)

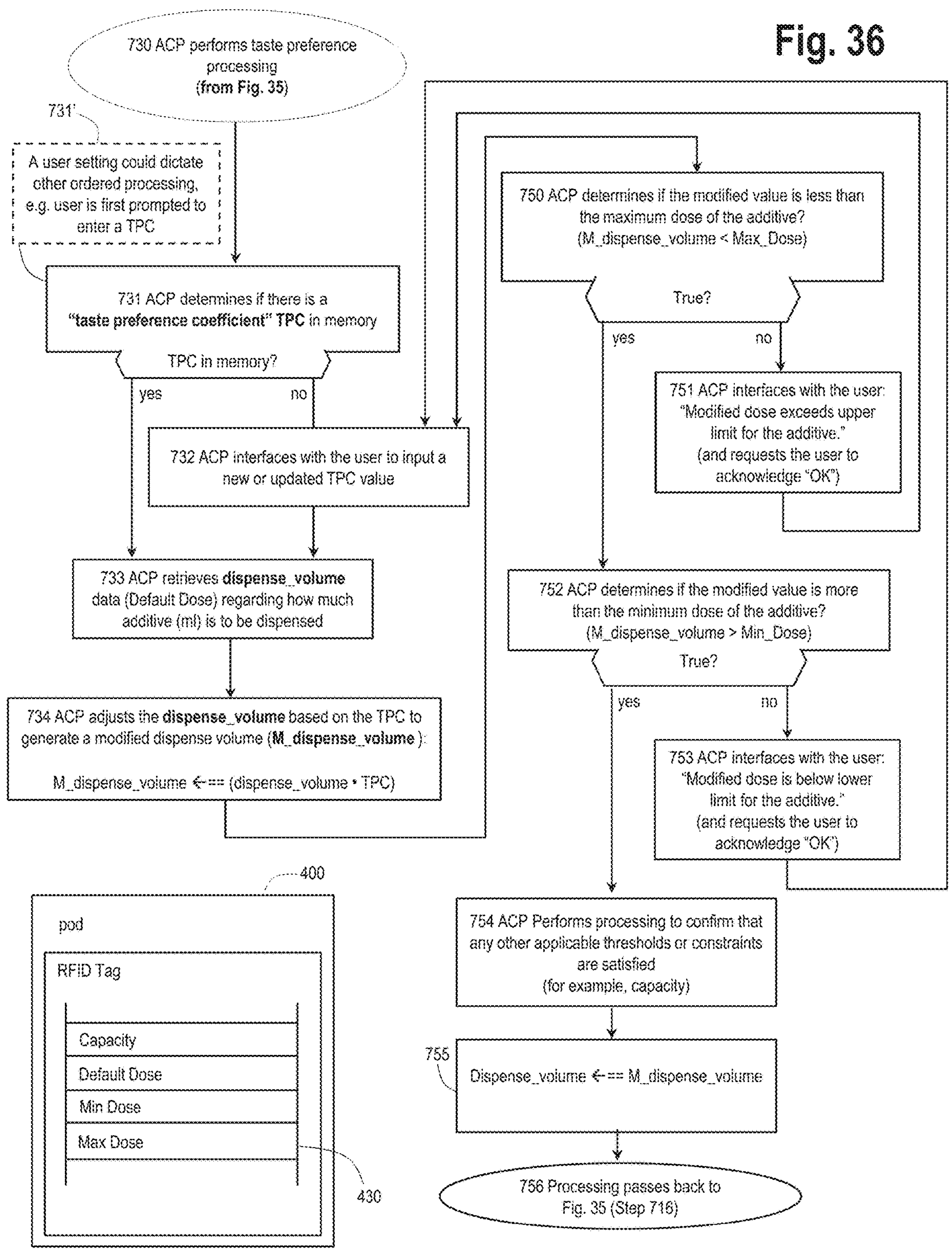
Fig. 36
730 ACP performs taste preference processing (from Fig. 35)
731'
A user setting could dictate other ordered processing, e.g. user is first prompted to enter a TPC
731 ACP determines if there is a "taste preference coefficient" TPC in memory
TPC in memory?
yes
no
732 ACP interfaces with the user to input a new or updated TPC value
733 ACP retrieves dispense_volume data (Default Dose) regarding how much additive (ml) is to be dispensed
734 ACP adjusts the dispense_volume based on the TPC to generate a modified dispense volume (M_dispense_volume):
M_dispense_volume ⇐== (dispense_volume * TPC)
750 ACP determines if the modified value is less than the maximum dose of the additive? (M_dispense_volume < Max_Dose)
True?
yes
no
751 ACP interfaces with the user: "Modified dose exceeds upper limit for the additive." (and requests the user to acknowledge "OK")
752 ACP determines if the modified value is more than the minimum dose of the additive? (M_dispense_volume > Min_Dose)
True?
yes
no
753 ACP interfaces with the user: "Modified dose is below lower limit for the additive." (and requests the user to acknowledge "OK")
754 ACP Performs processing to confirm that any other applicable thresholds or constraints are satisfied (for example, capacity)
755
Dispense_volume ⇐== M_dispense_volume
756 Processing passes back to Fig. 35 (Step 716)
400
pod
RFID Tag
Capacity
Default Dose
Min Dose
Max Dose
430

840 communication assembly

Antenna connection
834
1
830
Controller
350
Transceiver (reader)
(RFID transceiver)
841
Antenna
switch
900
834'
2
830'
834"
3
830"
842
843
844
357

3721
1

Transceiver
(reader)
(RFID
transceiver)
841
830
2
900'
830'
3711
842
Controller
350
Power source
3700S
3712
3722

840 communication assembly

Controller
350
913
921
921A fourth pads
915
915A
911
911A
910
830
834
834A
834B
921B
902
902A
915B
842
921C
834'
901
921D
Transceiver (reader)
(RFID transceiver)
841
843A
921E
834"
921F
914
920
830'
843
843B
911B
902B
934
830"
933'
932 actuator rod
933 actuator actuator
844
931 actuator body
900
antenna
switch
930 actuator

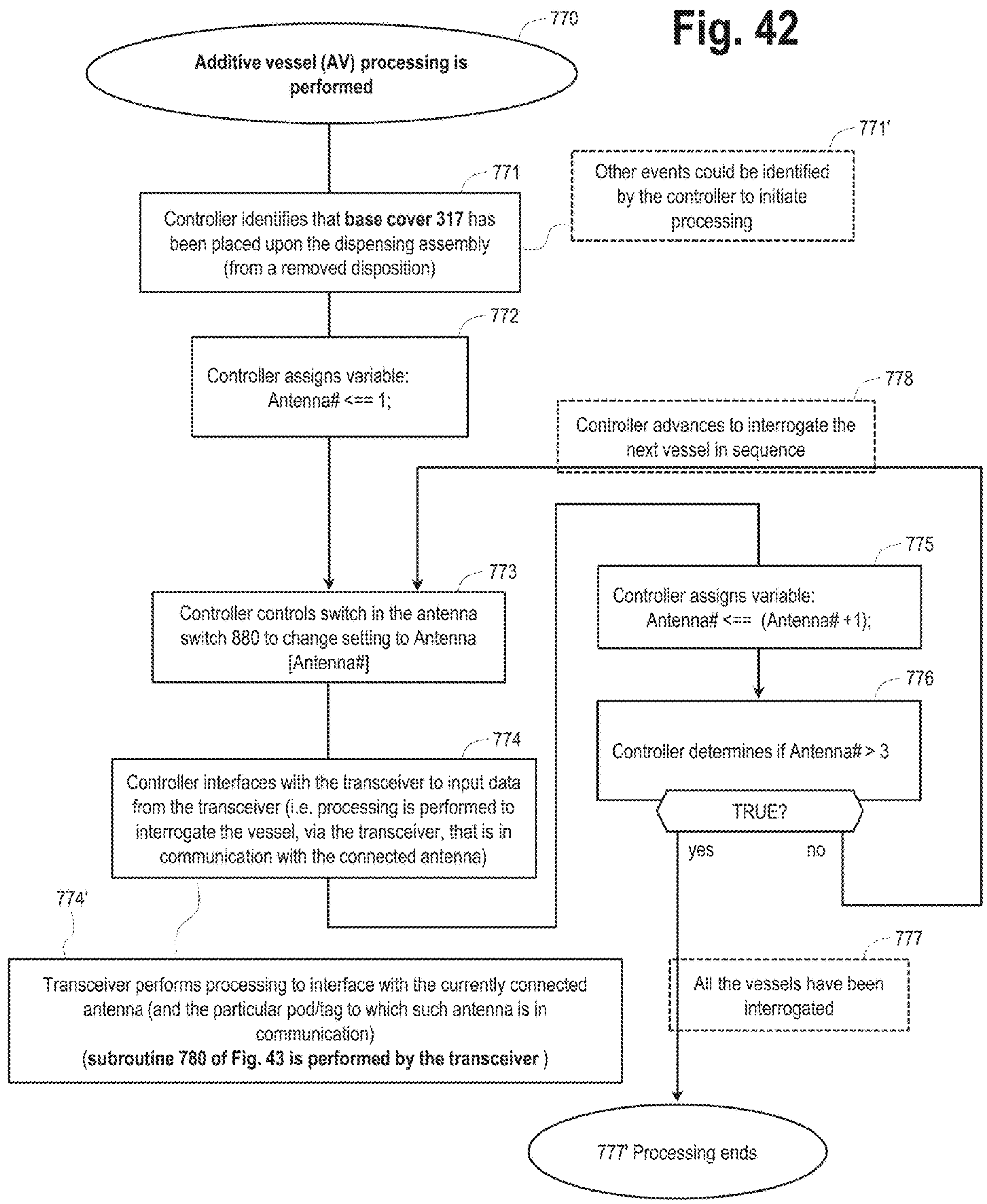
Fig. 42
770
Additive vessel (AV) processing is performed
771
Controller identifies that base cover 317 has been placed upon the dispensing assembly (from a removed disposition)
771'
Other events could be identified by the controller to initiate processing
772
Controller assigns variable: Antenna# <== 1;
778
Controller advances to interrogate the next vessel in sequence
773
Controller controls switch in the antenna switch 880 to change setting to Antenna [Antenna#]
775
Controller assigns variable: Antenna# <== (Antenna# +1);
776
Controller determines if Antenna# > 3
TRUE?
yes
no
774
Controller interfaces with the transceiver to input data from the transceiver (i.e. processing is performed to interrogate the vessel, via the transceiver, that is in communication with the connected antenna)
774'
Transceiver performs processing to interface with the currently connected antenna (and the particular pod/tag to which such antenna is in communication)
(subroutine 780 of Fig. 43 is performed by the transceiver)
777
All the vessels have been interrogated
777' Processing ends

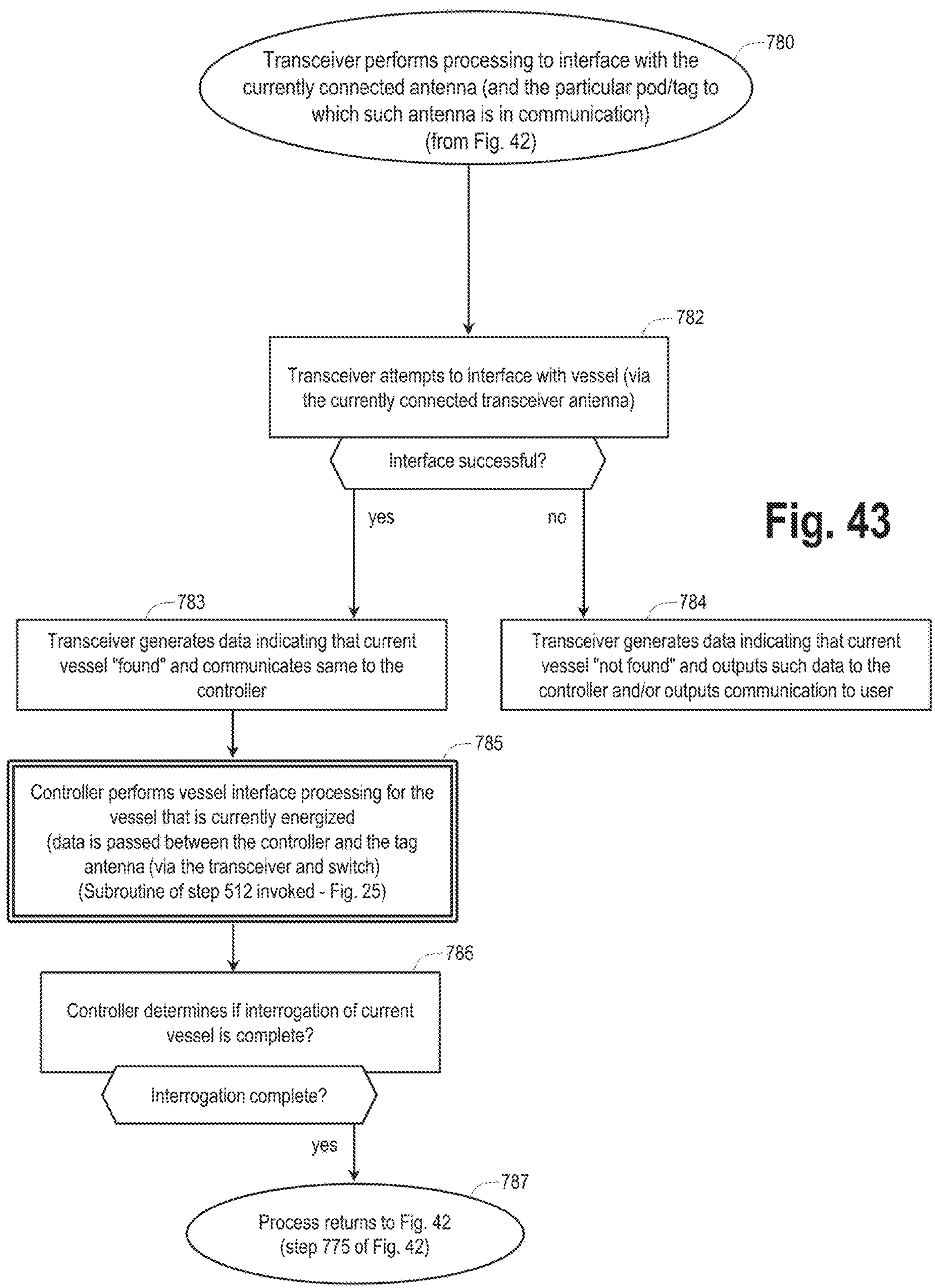
780
Transceiver performs processing to interface with the currently connected antenna (and the particular pod/tag to which such antenna is in communication) (from Fig. 42)
782
Transceiver attempts to interface with vessel (via the currently connected transceiver antenna)
Interface successful?
yes
no
Fig. 43
783
Transceiver generates data indicating that current vessel "found" and communicates same to the controller
784
Transceiver generates data indicating that current vessel "not found" and outputs such data to the controller and/or outputs communication to user
785
Controller performs vessel interface processing for the vessel that is currently energized (data is passed between the controller and the tag antenna (via the transceiver and switch) (Subroutine of step 512 invoked - Fig. 25)
786
Controller determines if interrogation of current vessel is complete?
Interrogation complete?
yes
787
Process returns to Fig. 42 (step 775 of Fig. 42)

PORTABLE BEVERAGE CONTAINER SYSTEMS AND METHODS FOR ADJUSTING THE COMPOSITION OF A BEVERAGE

RELATED APPLICATIONS

This application claims priority to U.S. Provisional Patent Application Ser. No. 62/900,510 filed Sep. 14, 2019 the entire disclosure of which is hereby incorporated by reference.

The subject matter of this application is related to U.S. application Ser. No. 15/694,659, filed Sep. 1, 2017 (U.S. Publication 2018/0099850), the entire disclosure of which is hereby incorporated by reference. This application is related to U.S. application Ser. No. 15/179,709, filed Jun. 10, 2016 (U.S. Publication 2017/0156540 and now U.S. Pat. No. 10,231,567), the entire disclosure of which is hereby incorporated by reference. This application is related to U.S. application Ser. No. 15/862,206, filed Jan. 4, 2018 (U.S. Publication 2018/0177325), the entire disclosure of which is hereby incorporated by reference.

This application is related to U.S. Provisional Patent Application Ser. No. 62/442,039, filed Jan. 4, 2017, the entire disclosure of which is hereby incorporated by reference.

The subject matter of this application is related to U.S. application Ser. No. 14/960,109, filed Dec. 4, 2015 and published Jun. 9, 2016 (U.S. Publication 2016/0159632 and now U.S. Pat. No. 9,932,217), which claims priority to U.S. Provisional Patent Application Ser. No. 62/174,935, filed Jun. 12, 2015; U.S. Provisional Patent Application Ser. No. 62/174,466, filed Jun. 11, 2015; U.S. Provisional Patent Application Ser. No. 62/174,415, filed Jun. 11, 2015; and U.S. Provisional Patent Application Ser. No. 62/088,189, filed Dec. 5, 2014, the entire disclosures of which are hereby incorporated by reference. The subject matter of this application is also related to International Application Ser. No. PCT/US2015/063974, filed Dec. 4, 2015 and published Jun. 9, 2016, the entire disclosure of which is hereby incorporated by reference.

The subject matter of this application is related to U.S. application Ser. No. 15/179,709, filed Jun. 10, 2016, which claims priority to U.S. Provisional Patent Application Ser. No. 62/174,935, filed Jun. 12, 2015; U.S. Provisional Patent Application Ser. No. 62/174,466, filed Jun. 11, 2015; U.S. Provisional Patent Application Ser. No. 62/174,459, filed Jun. 11, 2015; U.S. Provisional Patent Application Ser. No. 62/174,453, filed Jun. 11, 2015; U.S. Provisional Patent Application Ser. No. 62/174,447, filed Jun. 11, 2015; U.S. Provisional Patent Application Ser. No. 62/174,427, filed Jun. 11, 2015; U.S. Provisional Patent Application Ser. No. 62/174,415, filed Jun. 11, 2015; U.S. Provisional Patent Application Ser. No. 62/174,343, filed Jun. 11, 2015; U.S. Provisional Patent Application Ser. No. 62/174,336, filed Jun. 11, 2015; U.S. Provisional Patent Application Ser. No. 62/174,254, filed Jun. 11, 2015; and U.S. Provisional Patent Application Ser. No. 62/174,440, filed Jun. 11, 2015, the entire disclosures of which are hereby incorporated by reference. The subject matter of this application is also related to International Application Ser. No. PCT/US2016/036992, filed Jun. 10, 2016 and published Dec. 15, 2016, the entire disclosure of which is hereby incorporated by reference.

BACKGROUND

Portable refillable bottles and other containers used for water and other beverages are widely used and are important for health and hydration. Such bottles and containers are used with increasing frequency to consume functional ingredients, such as, for example, energy, protein, and sleep supplements. However, one limitation of many of such bottles and other hydration containers is that the consumable contents remain constant and unchanged except for changes in quantity as the contents (frequently, but not exclusively water) are consumed and subsequently replenished.

Other problems and limitations exist with known bottles, as well as with systems and methods that are used with such known bottles and other containers.

SUMMARY OF THE DISCLOSURE

A beverage apparatus, the beverage apparatus being hand-holdable by a user of the beverage apparatus to be portable, can include a beverage chamber housing that includes a chamber for storing a consumable liquid. The beverage apparatus can include a dispensing assembly that includes a receptacle. The receptacle can retain a vessel. The vessel can include an electronic tag and can contain an additive. The dispensing assembly can be operatively controllable by a controller to output the additive from the vessel into the consumable liquid. The beverage apparatus can include one or more sensors, devices, or assemblies that can be used to detect a volume of liquid in the chamber or a liquid level in the chamber. The beverage apparatus can include an apparatus computer processor (ACP) and an apparatus database portion. The apparatus database portion can include instructions that are performed by the ACP in operation of the beverage apparatus. The ACP can be configured to control the dispensing assembly to perform dispensing of the additive from the vessel into the consumable liquid. The ACP can communicate with the electronic tag of the vessel so as to input data from and output data to the electronic tag. The ACP can communicate with the electronic tag to determine state of the additive in the vessel and processing can be performed based on the state of the additive in the vessel. The beverage apparatus can include various additional features. Related systems and methods are disclosed.

BRIEF DESCRIPTION OF THE DRAWINGS

These and other objects, features, advantages, and characteristics of the present disclosure will become more apparent to those skilled in the art upon consideration of the following Detailed Description, taken in conjunction with the accompanying claims and drawings, all of which form a part of the present disclosure.

In the drawings:

FIG. 17 is a schematic diagram showing details of a container apparatus or beverage apparatus 300 in an ecosystem 10, according to principles of the disclosure.

FIG. 24 is a diagram showing further details of a tag memory portion (TMP) 430 of FIG. 19, according to principles of the disclosure.

FIG. 25 is a high-level flowchart showing details of "additive vessel processing is performed, according to principles of the disclosure FIG. 26 is a flowchart showing in further detail the apparatus controller 350 performs RFID "warnings" processing step 520, as called upon from FIG. 23, according to principles of the disclosure.

FIG. 28 is a flowchart showing processing associated with output of data from the TMP 430 to the apparatus controller 350, i.e. from the tag to the beverage apparatus 300, according to principles of the disclosure.

FIG. 30 is a flowchart showing details of user engagement processing, according to principles of the disclosure.

FIG. 32 is a flowchart showing details of the "ACP 360 performs product information processing" step 610 that is called from FIG. 23, according to principles of the disclosure.

FIG. 33 is a flowchart showing details of the "ACP 360 performs apparatus color processing" step 620 as called from FIG. 23 according to principles of the disclosure.

FIG. 34 is a flowchart showing in further detail the ACP 360 "performs product recall processing" step 630 as called from FIG. 23, according to principles of the disclosure.

FIG. 35 is a flowchart showing details of the ACP 360 "dispensing processing" step 710 as called from in the processing of FIG. 19, according to principles of the disclosure.

FIG. 36 is a flowchart showing in further detail the ACP 360 performs taste preference processing as called upon from FIG. 33, according to principles of the disclosure.

FIG. 42 is a flowchart showing additive vessel processing, according to principles of the disclosure.

FIG. 43 is a flowchart showing processing in which the transceiver performs processing to interface with the currently connected antenna, according to principles of the disclosure.

Figure 1:
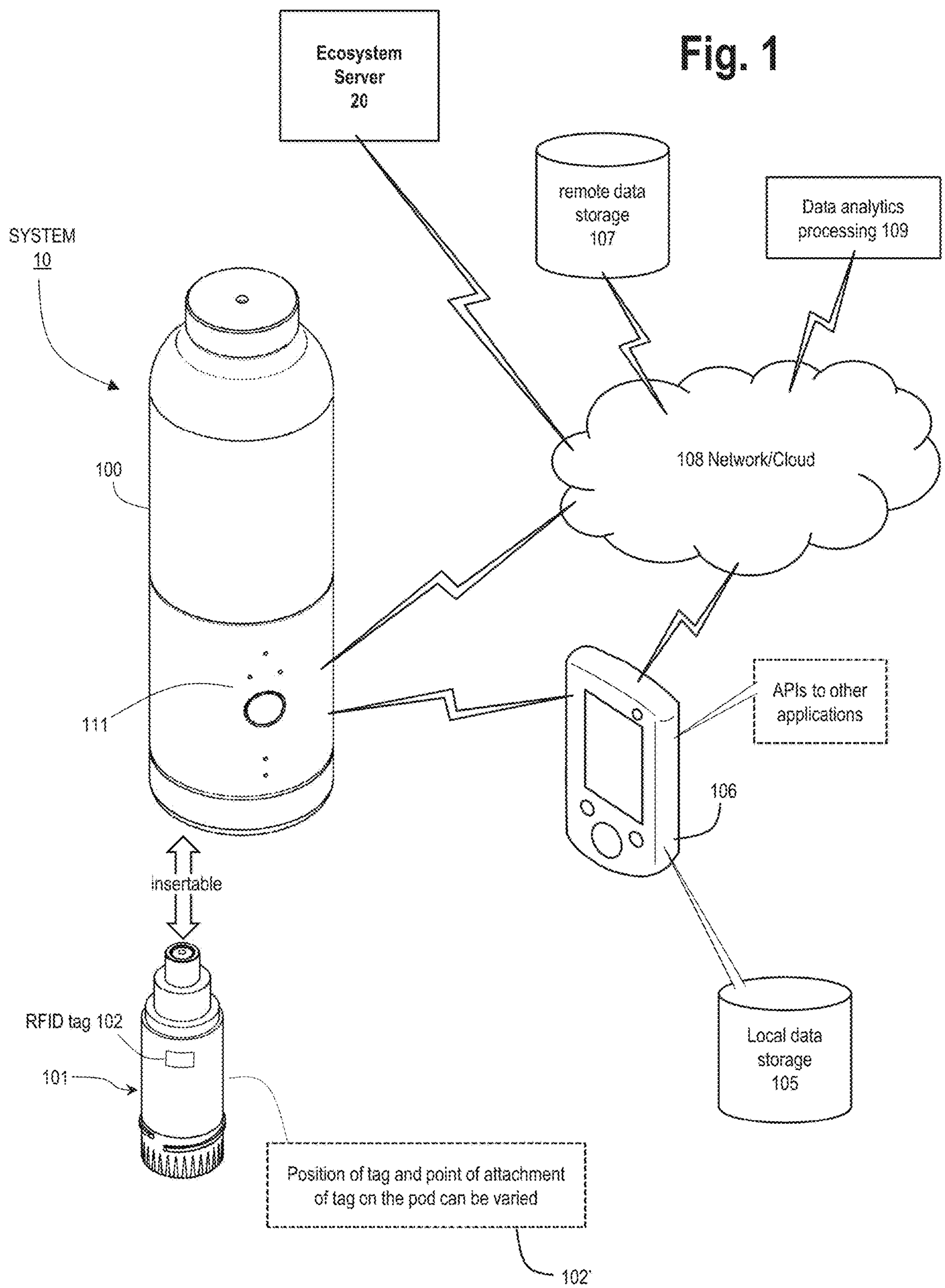
FIG. 1 is a block diagram illustrating an example high-level hydration ecosystem according to principles of the disclosure.

The headings provided herein are for convenience only and do not necessarily affect the scope or meaning of what is claimed in the present disclosure.

In the drawings, same reference numerals and acronyms have been used to identify same or similar structure, components or functionality for ease of understanding and convenience.

DETAILED DESCRIPTION OF THE DISCLOSURE

A few inventive aspects of the disclosed embodiments are explained in detail below with reference to the various drawing figures. Exemplary embodiments are described to illustrate the disclosed subject matter, not to limit its scope, which is defined by the claims. Those of ordinary skill in the art will recognize a number of equivalent variations of the various features provided in the description that follows.

In the following description, references are made to various embodiments in accordance with which the disclosed subject matter can be practiced. Multiple references to "one embodiment" or "an embodiment" do not necessarily refer to the same embodiment. Particular features, structures or characteristics associated with such embodiments can be combined in any suitable manner in various embodiments. Various examples and embodiments are described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

In at least one embodiment, the present disclosure provides a portable, self-contained beverage apparatus comprising a container assembly having a known storage capacity for storing a consumable liquid and a dispensing assembly. The dispensing assembly can be disposed within the container assembly that dispenses variable, non-zero quantities of additives into the consumable liquid stored in the container assembly. The dispensing assembly can include a plurality of apertures structured and arranged to retain vessels or "pods". The vessel or pods can contain respective additives to be dispensed into the consumable liquid.

In at least one embodiment, the portable, self-contained beverage apparatus further includes a controller that controls the dispensing by the dispensing assembly of the variable, non-zero quantities of the additives into the consumable liquid stored in the container assembly. The controller can include one or more processors and one or more databases.

In at least one embodiment, the controller of the portable, self-contained beverage apparatus controls dispensing by the dispensing assembly to maintain a targeted concentration of an additive in the consumable liquid stored in the container assembly, wherein the controlling can be based on tracked consumable liquid level and the quantity of the at least one additive. In at least one embodiment, the portable, self-contained beverage apparatus includes respective vessels retained, in the plurality of apertures, that contain the additives to be dispensed into the consumable liquid stored in the container assembly. The controller of the portable, self-contained beverage apparatus can control dispensing by the dispensing assembly to maintain a desired concentration of an additive in the consumable liquid stored.

Portable hydration containers may be filled in the morning, or other time of day, and topped-off throughout the day as liquid is consumed. It can be neither practical nor desirable to require that a user fill multiple compartments of a container with multiple different consumable liquids or mixtures for consumption throughout the course of the day. It is also not desirable to require a user to carry around separate additive vessels—and to insert additives contained therein into a hydration container when needed by the user. Therefore, a more practical and desirable solution is to dispense a selection, sequence or combination of different additives from one or more additive vessels into a consumable liquid at the appropriate time in response to a signal or signals. The signal can be from the beverage apparatus and/or from a mobile or wearable device, processor or application that is associated with the beverage apparatus. Such arrangement can be used in conjunction with various other features and functionality.

The "beverage apparatus" as disclosed herein can also be described as a "bottle" or "container assembly" of the disclosure. The beverage apparatus, bottle, or container assembly can include various functionality as described herein.

Accordingly, one or more embodiments of the present disclosure relate to a consumable container having a dispensing module assembly with a number of apertures into which additive vessels can be inserted by a user. Each of these additive vessels can have an RFID tag attached to the vessel. An RFID transceiver can be mounted on the dispensing assembly or other structure of the beverage apparatus so as to interface with the RFID tag—and specifically with an antenna of the RFID tag. The RFID transceiver can including a reader, an antenna, and/or other elements for communicating, including writing and reading, with one or more RFID tags on the vessels. The RFID transceiver, on the dispensing assembly, can be mounted on a surface of a dispensing module located on a central axis of the consumable container. In other embodiments, a plurality of RFID transceivers can be provided and each RFID transceiver (of the dispensing assembly) can be positioned in a respective static relationship relative to a respective RFID tag (on a respective additive vessel that is inserted into the beverage apparatus). The arrangement can provide access to data about the contents of the additive vessel from the RFID tag of the additive vessel. The methods, systems, and apparatuses of the disclosure can be designed to access various data about the contents of an additive vessel. One having ordinary skill in the art will recognize that a passive data system such as RFID may be ideal due to its passive nature, read/write capability, and low-cost. However, other functionality, arrangements, and methods could provide similar results, including but not limited to physical key-based methods, or optical methods. As will be described in greater detail below, the methods, systems, and apparatus of the present disclosure can be designed to present information to a user regarding the additives consumed and/or vessel(s) inserted in the beverage apparatus. For example, according to principles of the disclosure, the portable container may display (e.g., on a user interface screen of the container) information or generate an alert to the user when one or more of the additive vessels inserted in the beverage apparatus is, or will soon become empty. In another example, the container may be configured to predict a future date when one or more of the additive vessels inserted in the beverage apparatus will become empty. Such a feature serves to recommend and/or automate future purchases. Such a system might also function to adjust or otherwise modify dispensing protocol to ensure that the additive does not become depleted on or before a targeted time.

In accordance with at least one embodiment, the methods, systems, and apparatuses may be designed to provide for direct or indirect communication of an instruction from a central control application to a container assembly. Such a direct or indirect communication may be, for example, an instruction to dispense an additive, may include a dispensing schedule and/or protocol, or may indicate that an additive (e.g., medication, pharmaceutical, or the like) has, or has not, been dispensed by the dispensing apparatus within the container. Data associated with the dispensing event (or lack thereof) might also be collected and communicated directly or indirectly between the dispensing device and the aforementioned central control application. In accordance with at least one embodiment, Bluetooth low energy may be used as the primary transmission method of such data. However, other transmission technology, channels and/or protocols can be used to provide communication between a vessel and a container assembly.

Also disclosed herein are methods and apparatuses for the precise and continuously variable dispensing of a removable additive vessel through the use of a discretely adjustable piston or actuator. Adjustment of a dispensed additive can be provided by a variable stroke length of the piston or actuator. Such adjustment can be controlled by a user—such as through a sequence of buttons pressed on a user interface. For example, a particular button can be associated with a dispense of a particular additive/additive vessel. As the user's finger is held on the particular button a longer amount of time, the dispense can be extended thus dispensing more additive. The arrangement can provide a dispensing event that is precise and repeatable. Passive electronics or other electronics measuring which additive vessel, dispensing quantity, and how many dispensing events are initiated can log the user's consumption activity and behaviors.

Embodiments of some or all of the methods disclosed herein may be represented as instructions embodied on transitory or non-transitory processor-readable storage media such as optical or magnetic memory or represented as a propagated signal provided to a processor or data processing device via a communication network. The communication network can be, for example, an Internet or telephone connection, or other communication channel. FIG. 1 shows an illustrative diagram of an overall ecosystem or system 10, according to principles of the disclosure. FIG. 1 includes a beverage apparatus 100 that can be portable. The beverage apparatus 100 can be hand-holdable by a user so as to provide portability. The beverage apparatus 100 can contain a consumable (e.g., a liquid) into which liquid, powder, and/or other forms of consumable additives may be dispensed from one or more separate removable additive vessels 101. Data about the additives within each additive vessel 101 may be encoded within an RFID or similar active, passive, or other type tag 102 mounted on or otherwise attached or affixed to or associated with the additive vessel 101. Such data about the additives contained within the additive vessel or vessel 101 can be read from the RFID or similar type tag 102 by, for example, an RFID transceiver with antenna that is a component of the beverage apparatus 100. For example, in accordance with at least one embodiment, the beverage apparatus 100 may include an RFID antenna (not shown in FIG. 1) that rotates around or that is positioned around a central axis of the beverage apparatus 100 to individually and/or sequentially read data from the additive vessels 101. The additive vessels 101 can be inserted in a circular arrangement around the central axis of the beverage apparatus. In other embodiments, a plurality of RFID readers or RFID transceivers can be provided and each RFID reader can be static relative to a respective RFID tag (on a respective additive vessel). There can be one or more than one additive vessel 101. Data about the additives contained in the additive vessels 101, can be collected, analyzed, and/or communicated by the beverage apparatus 100 (e.g., by a processor and/or other components of the beverage apparatus 100), and made available to one or more user devices 106, local data storage 105, remote data storage 107, and other data resources, such as data analytics processor 109. Such information may be presented to the user using a display 111 mounted on the beverage apparatus 100 and/or using a display on the user device 106. The user device 106 can be a cell phone or smart phone, for example. Communications may be performed or provided between the various components of the system 10 over a network 108. The network 108 may be provided using a cloud based architecture or other network.

Figure 2A:
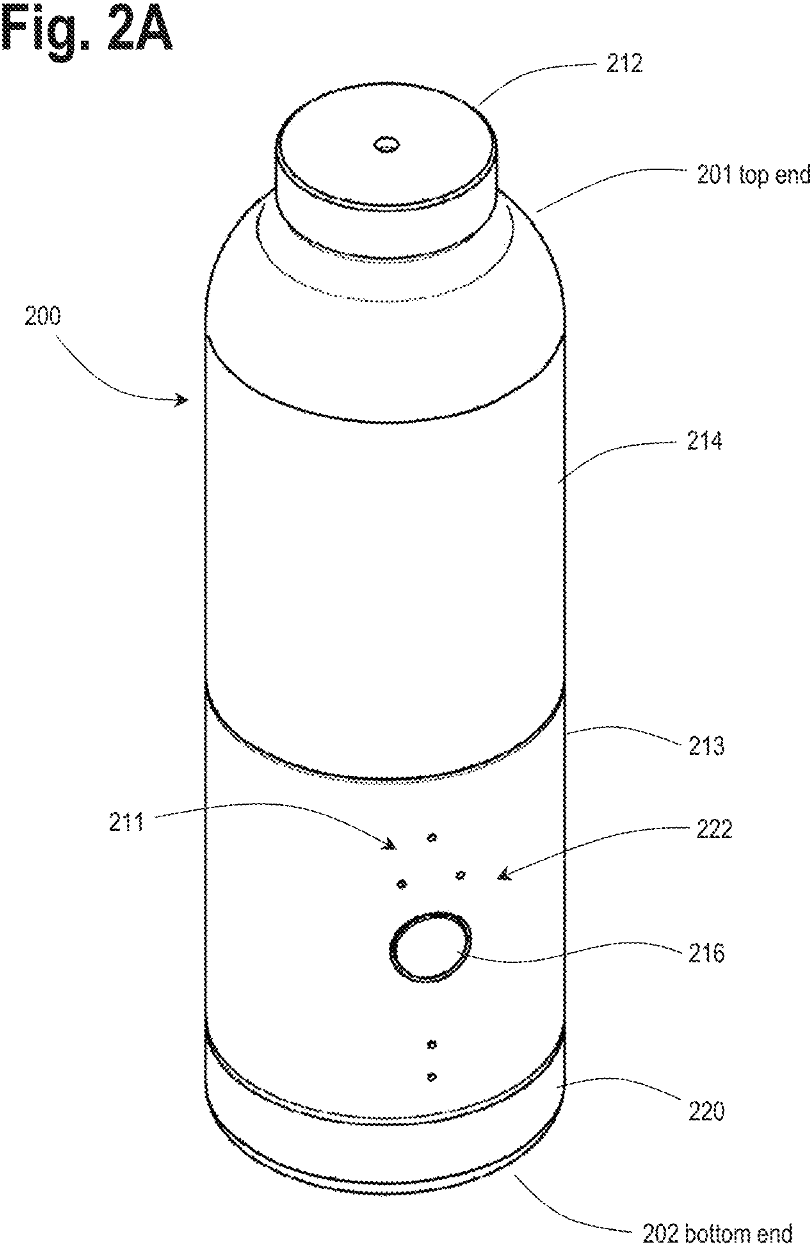
FIG. 2A illustrates a beverage container assembly, according to principles of the disclosure.
Figure 2B:
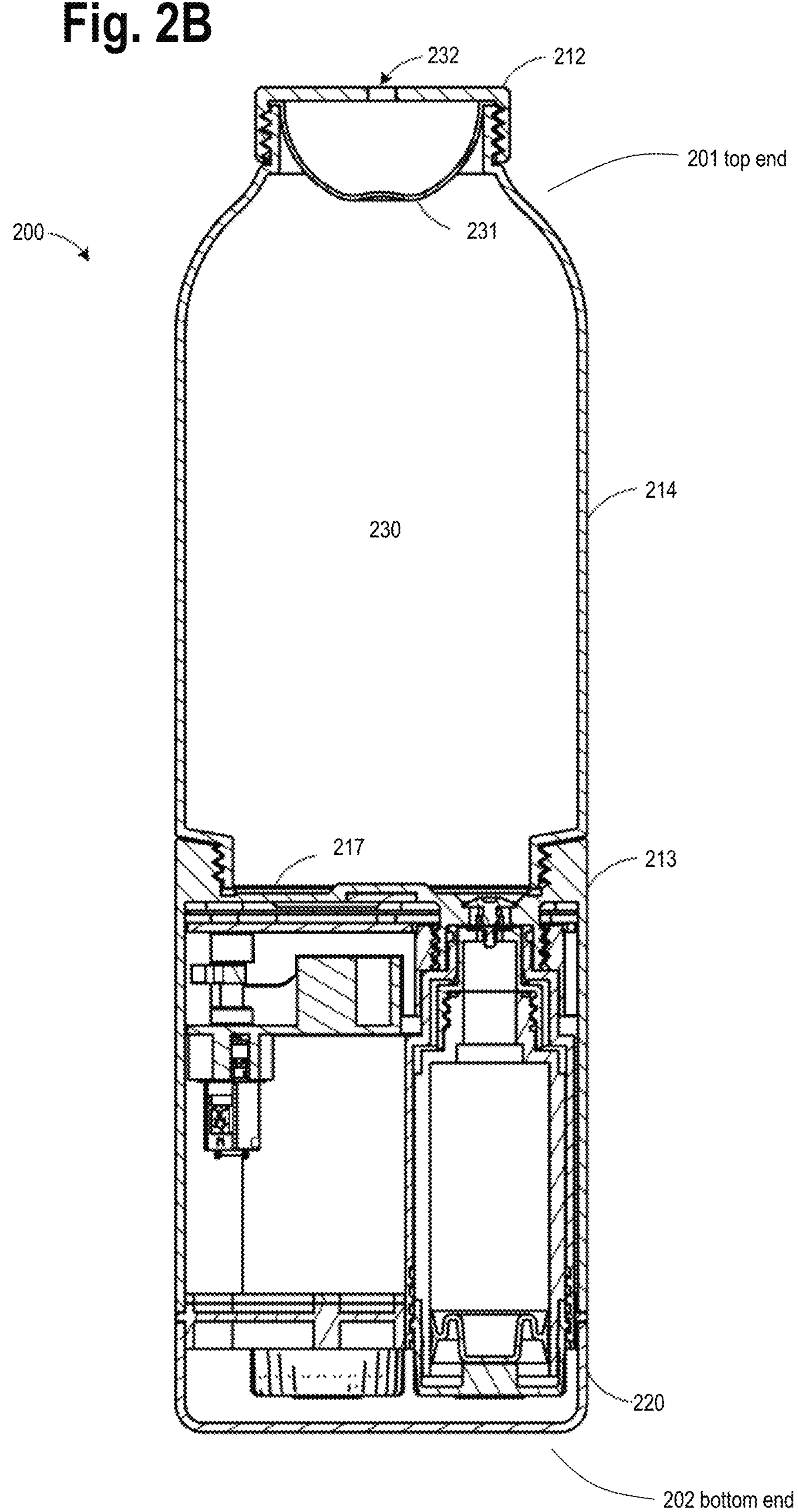
FIG. 2B is a cross section view of a beverage container assembly, according to principles of the disclosure.

FIGS. 2A and 2B illustrate a beverage apparatus 200, in accordance with at least one embodiment, that will be shown in further detail in subsequent FIGS. 3-12 and described in the description that follows. As will be understood by one skilled in the art, the various features and functionality described above and elsewhere in this disclosure can be applied, combined and used in conjunction with the beverage apparatus 200 in accordance with the various embodiments described below. The beverage apparatus 200 may be of similar or same construction as the beverage apparatus 100 of FIG. 1. The beverage apparatus 200 can include a controller 210 that controls operations of the beverage apparatus 200.

Figure 4A:
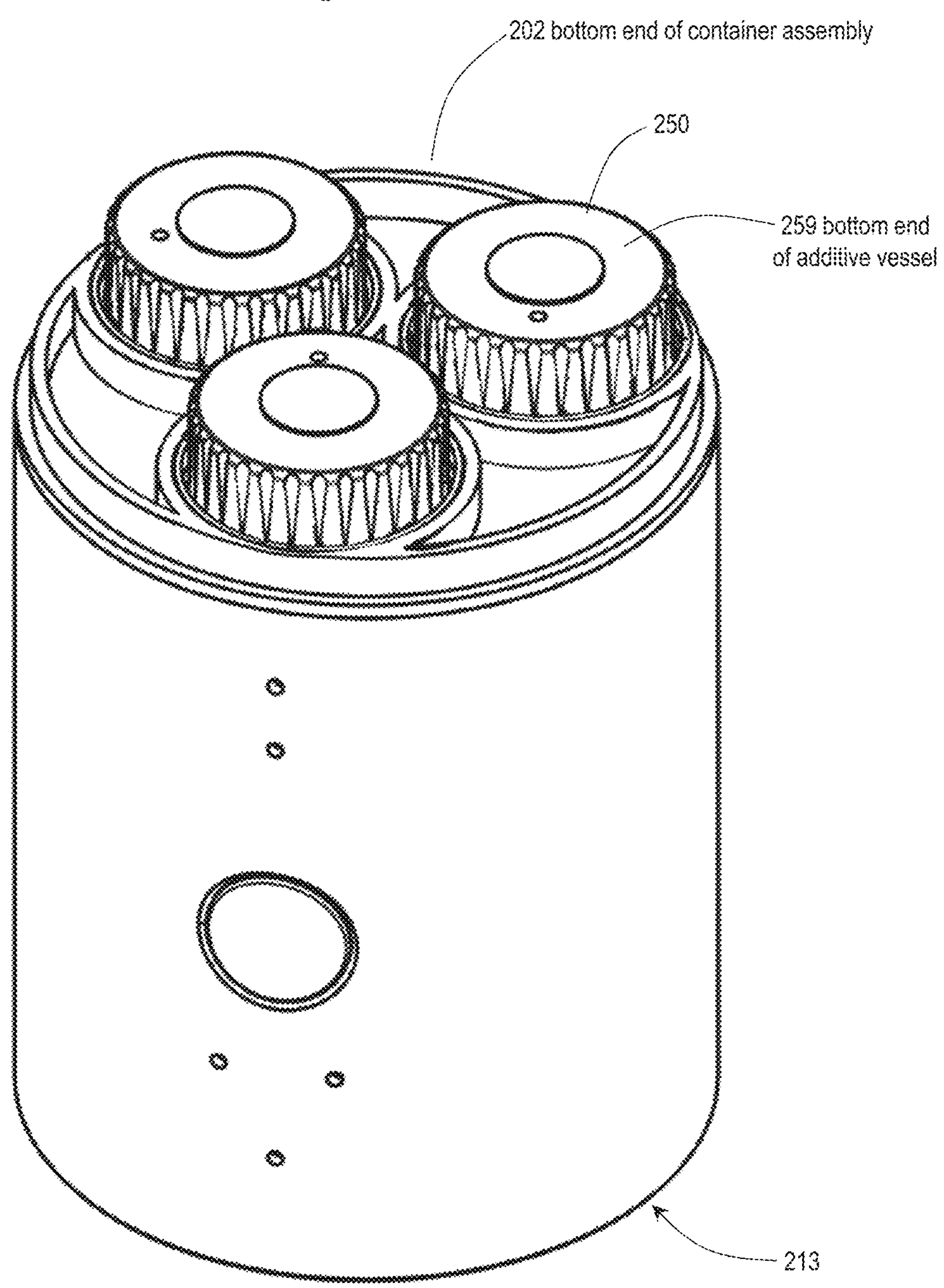
FIG. 4A illustrates a bottom view of the dispensing assembly with a base cover removed and with additive vessels, according to principles of the disclosure.
Figure 5A:
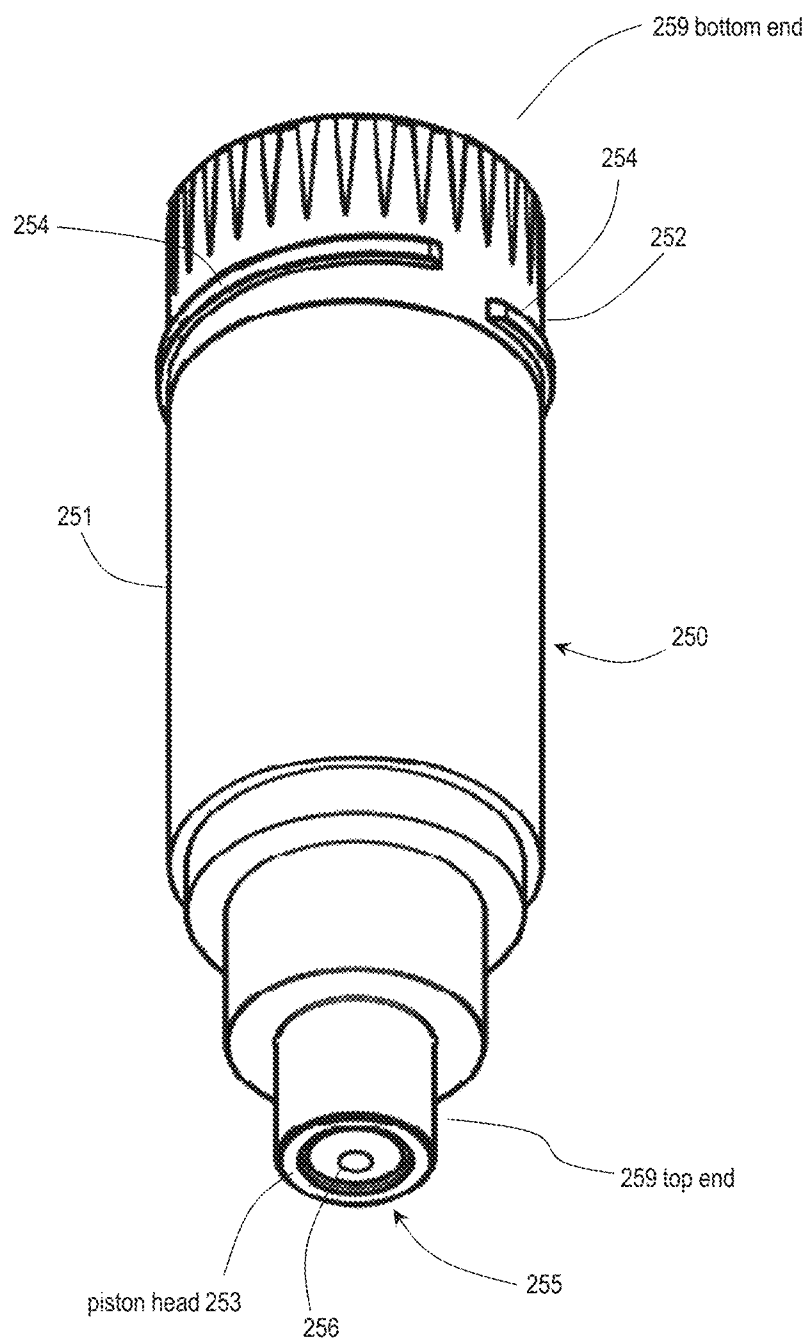
FIG. 5A illustrates an isometric perspective view of an additive container, according to principles of the disclosure.
Figure 5B:
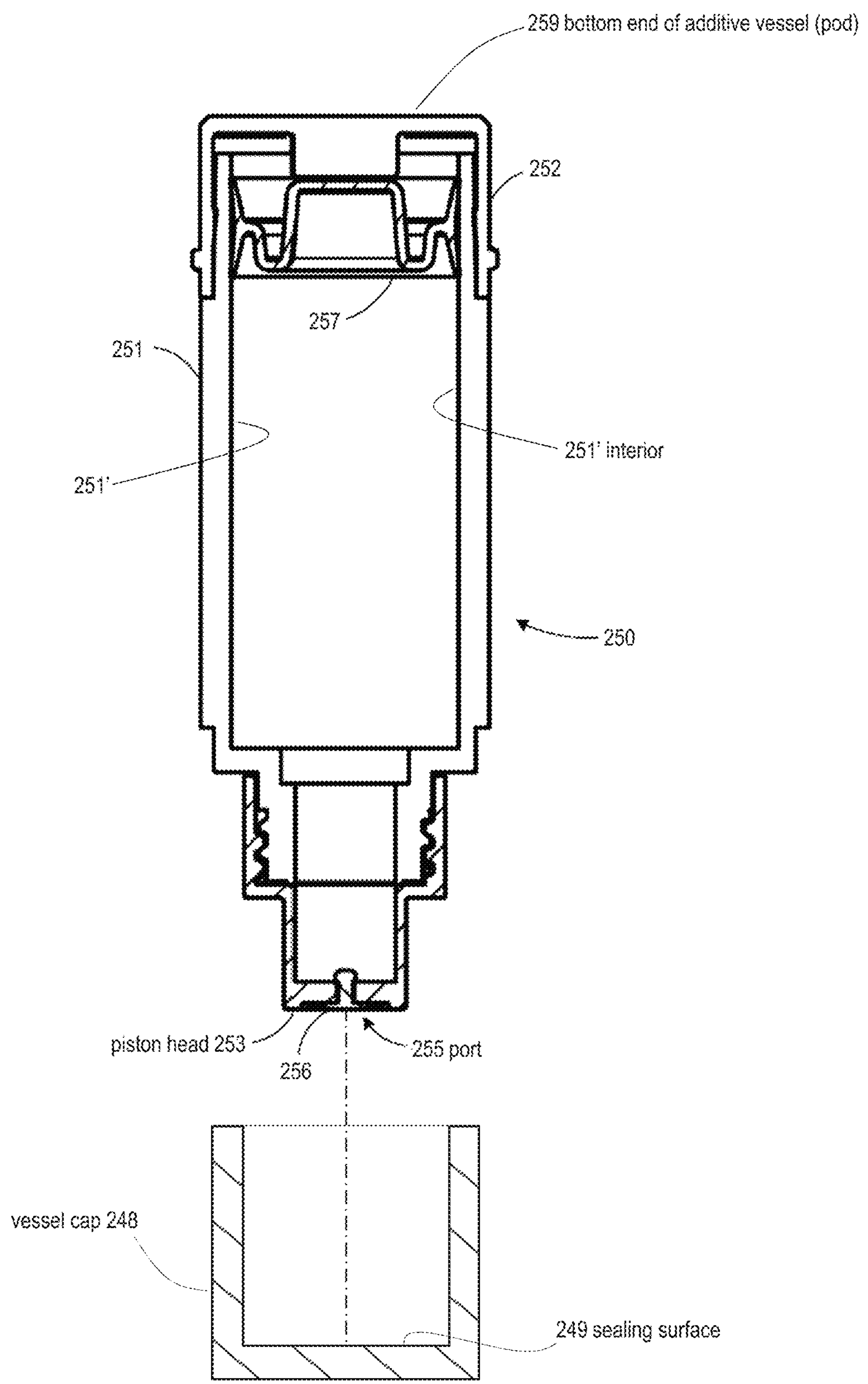
FIG. 5B illustrates a cross section cutaway view of an additive container, according to principles of the disclosure.

FIG. 2A illustrates a perspective view while FIG. 2B illustrates a cross section cutaway view of the beverage container assembly or beverage apparatus 200, according to principles of the disclosure. The beverage apparatus 200 includes a beverage chamber housing 214, which forms a portion of a chamber 230 to contain a beverage. The beverage chamber housing 214 can be configured with an open threaded base that threads onto a top end of a dispensing assembly 213. A top portion of the dispensing assembly 213 can include a platform 217, which can form a bottom half or portion of the chamber 230 to contain the beverage. The dispensing assembly 213 can house one or more containers of additives, i.e. vessels of additives, to be dispensed into the chamber 230, a dispensing mechanism or dispensing assembly configured to control the addition of the additives from the vessels, and electronics configured to control the dispensing mechanism. A removable base cover 220 can be configured to thread on to and off of a bottom end of the dispensing assembly 213 in order to provide access so as to insert and remove containers or vessels of additives. As described herein, each of these containers of additives can be referred to herein as an additive vessel, a vessel, or a "pod" 250, as shown in FIGS. 4A, 5A and 5B, for example.

As shown in FIG. 2A, the beverage apparatus 200 includes a top end 201 and a bottom end 202. It should be appreciated that the various illustrative drawings of embodiments of the disclosure are shown in an upright orientation and in various illustrative drawings of embodiments of the disclosure are shown in an upside down or inverted orientation. Accordingly, labeling of top end and bottom end are provided for clarity.

The beverage apparatus 200 can include a removable cap 212, which, in the illustrated embodiment, seals a top opening of the beverage chamber housing 214 to complete the chamber 230. The cap 212 can be configured to thread or snap onto a top end of the beverage chamber housing 214. Referring to FIG. 2B, in one embodiment, the cap 212 can include a compressible bladder 231 formed of silicone or other suitable rubber or material, that allows for deformation of the bladder so as to accommodate the addition of liquid additives into the chamber 230 by the dispensing assembly 213. The cap 212 also includes an air passageway 232 to allow air to escape from behind the bladder 231 so that the bladder can compress to accommodate the addition of the liquid additives.

Referring to FIG. 2A, the dispensing assembly 213 can be further configured with a user interface 222, which can include a display 211 and one or more user input buttons 216. In the illustrated embodiment of FIG. 2, the display 211 includes five LEDs (light-emitting diodes), with three LEDs in a triangle that can be configured to indicate selection of one of three additive vessels. Another LED can be configured to indicate a power on or wake up condition of the dispensing assembly, and yet another LED that can be configured to indicate that a dispensing of an additive to the beverage chamber housing 214 has been selected. The LEDs may use specific lensing or may be embedded behind a micro-perforated material to abstract the user from the physical components of the LEDs. In one embodiment, a single user input button can be configured as a multi-function button to perform different actions depending on the amount of pressure applied to it by the user, by duration of press(es), sequence or pattern of presses, and/or by quantity of presses, for example. The button of the buttons 216 can also be configured to accommodate partial or complete depression of the button, which can be differentiated by a perceptible detent or click, for example. Such arrangement can provide further varied functionality. The user interface 222 can provide an arrangement for the user to, for example, dispense an additive from an additive vessel or display the current battery level of the system and apparatus.

Figure 3:
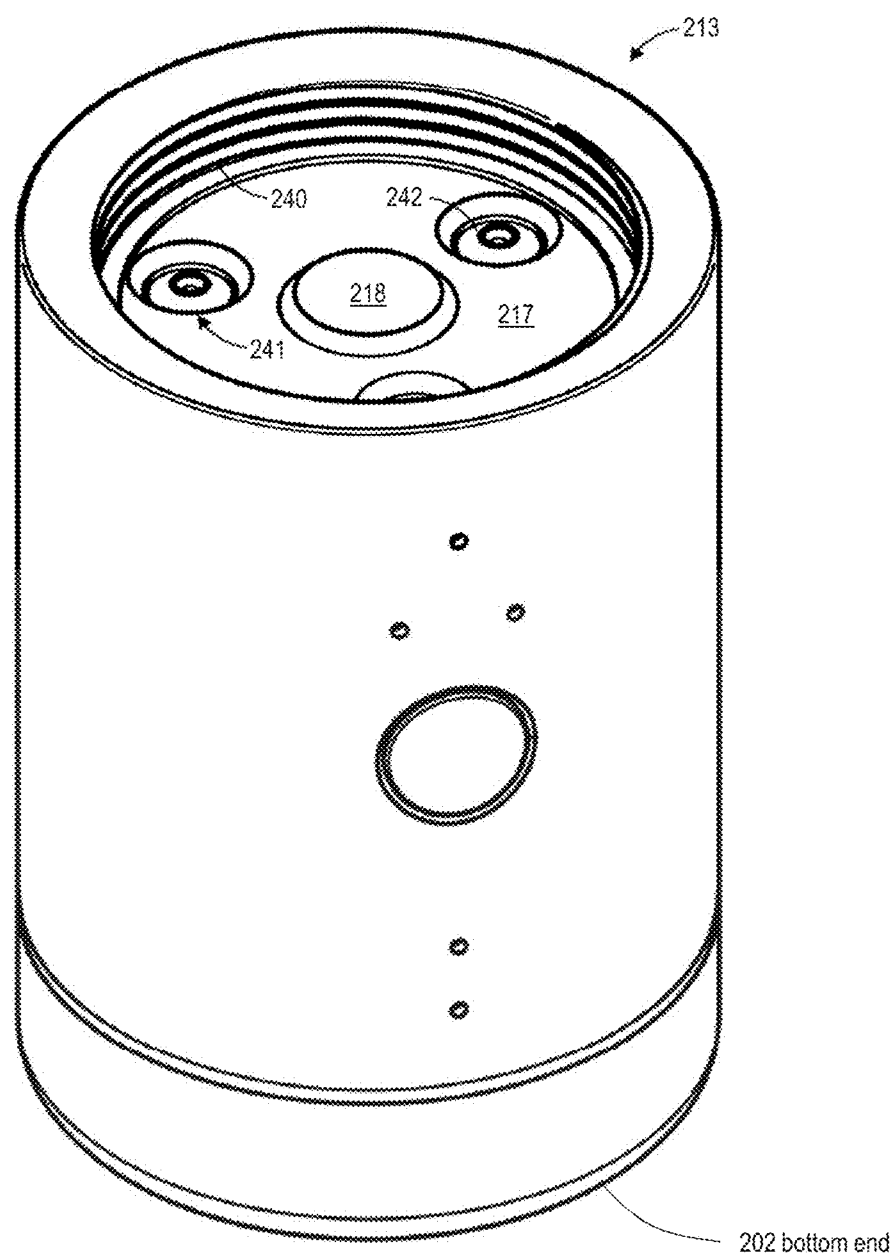
FIG. 3 illustrates a view of a dispensing assembly with a beverage chamber housing removed and with additive vessels, according to principles of the disclosure.

FIG. 3 illustrates a view of the dispensing assembly 213 with the beverage chamber housing 214 removed. A top portion of the dispensing assembly 213 includes an annular wall with threads 240 that engage with matching threads on the beverage chamber housing 214. The top portion of the dispensing assembly 213 can also include the platform 217 to form a base for the beverage chamber housing 214 in order to contain the beverage within the chamber 230. The platform 217 can include one or more outlet ports 241 through which additives are added to the beverage in the chamber, and in the illustrated embodiment of FIG. 3, three (3) such ports 241 are shown. In one embodiment, each port 241 can be sealed by a one-way valve 242 (e.g. an umbrella valve of rubber or silicone) that permits one-way passage of a liquid additive into the chamber from the vessel. As will be discussed below, each one-way valve 242 can form part of a pumping mechanism 260 (FIG. 6) that injects liquid additives into the chamber. In one embodiment, the pumping mechanism 260 can be a reciprocating positive displacement pump. FIG. 3 also illustrates an ultrasonic fluid level sensor 218 disposed on or within the platform 217. In accordance with one embodiment, the fluid level sensor 218 uses "round trip time" for a reflected sound wave(s) to measure the height of a fluid or water column within the chamber 230 and thereby infer or determine fill volume. Other arrangements can be used to sense level of liquid in a container assembly of the disclosure.

Figure 4B:
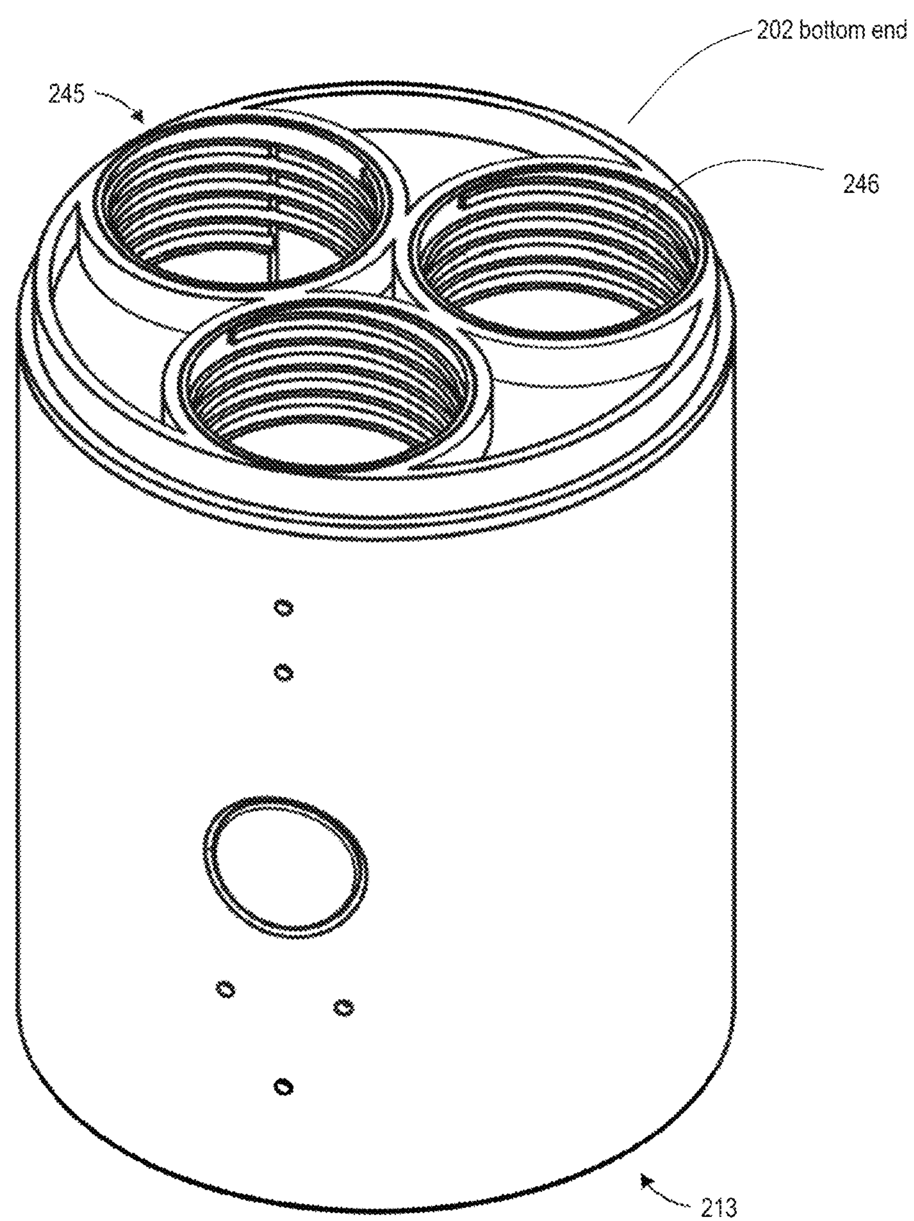
FIG. 4B illustrates a bottom view of the dispensing assembly with a base cover removed and with additive vessels removed, according to principles of the disclosure.

FIGS. 4A and 4B illustrate a bottom view of the dispensing assembly 213 with the base cover 220 removed. FIG. 4A shows the ends of each of three additive vessels 250 that are threaded into three corresponding receptacles or apertures 245 as shown in FIG. 4B. While the term "receptacle" is used in the description that follows, for the purpose of consistency with various embodiments described above, the receptacles 245 can also be referred to as "apertures" 245.

FIGS. 5A and 5B illustrate a perspective view and a cross section cutaway view, respectively, of an additive vessel 250 in accordance with one embodiment. FIG. 5A shows a top end 258 of the additive vessel 250 and a bottom end 259 of the additive vessel 250, as such additive vessel would be positioned in routine use in a container assembly or beverage apparatus, such as is shown in FIG. 2A. The additive vessel 250 can include a housing or body 251, which can be cylindrical in shape to fit into a corresponding cylindrically shaped receptacle or aperture 245 and engage with threads 246. At a first end or proximal end, the housing 251 can be covered with a cap 252 with threads 254. The cap 252 can be snapped or clicked onto the housing 251. The cap 252 can be integrally formed with the housing or body 251 of the vessel 250. The threads 254 of the vessel 250 can be provided on the housing or body 251. The threads 254 of the vessel 250 can be provided on any portion or surface of the vessel and/or connected structure so as to secure the vessel 250 into a respective receptacle 245.

The threads 254 can engage with threads or receiving threads 246 in a receptacle 245 so as to lock the additive vessel 250 into place within the dispensing assembly 213. At a second end or distal end, the vessel 250 can include a piston head 253 that includes a port 255 that is capped or closed by a one-way valve 256 (e.g. an umbrella valve of rubber or silicone). The port 255 and one-way valve 256 function to permit additive to flow in only one direction from the vessel 250, i.e. out of the additive vessel and into a pumping chamber 261 of the pumping mechanism 260, as shown in FIG. 6 and described below.

Referring to FIG. 5B, a slideable plunger 257 is disposed within an interior or interior surface 251' of the housing 251. The interior 251' of the housing 251 and the exterior of the plunger 257 can be a matching cylindrical shape such that the plunger 257 can slide along the length of the housing 251, from a first end to the second end of the housing, as additive contained within the housing is dispensed from the vessel. The plunger 257 is preferably formed of soft plastic such as LDPE (low density polyethylene) that seals against the interior of the housing and moves so that no air is allowed into the vessel 250 during dispensing of the additive.

Figure 6:
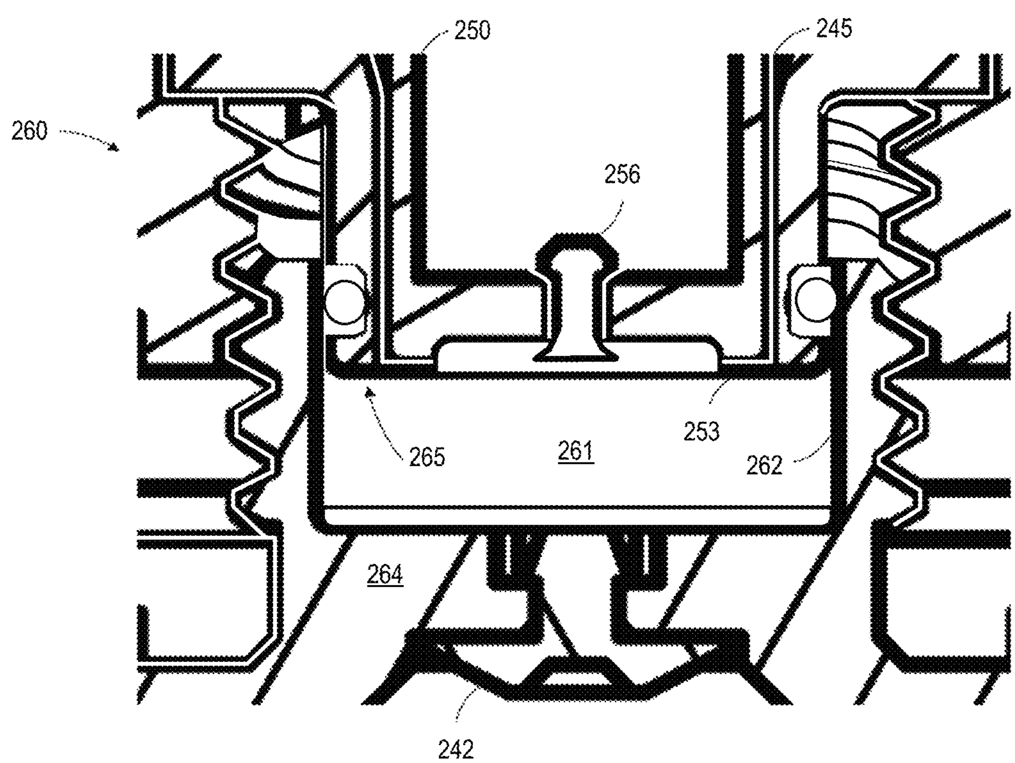
FIG. 6 illustrates a cutaway cross section of the dispensing assembly showing the operation of a pumping mechanism for an additive container, according to principles of the disclosure.
Figure 7A:
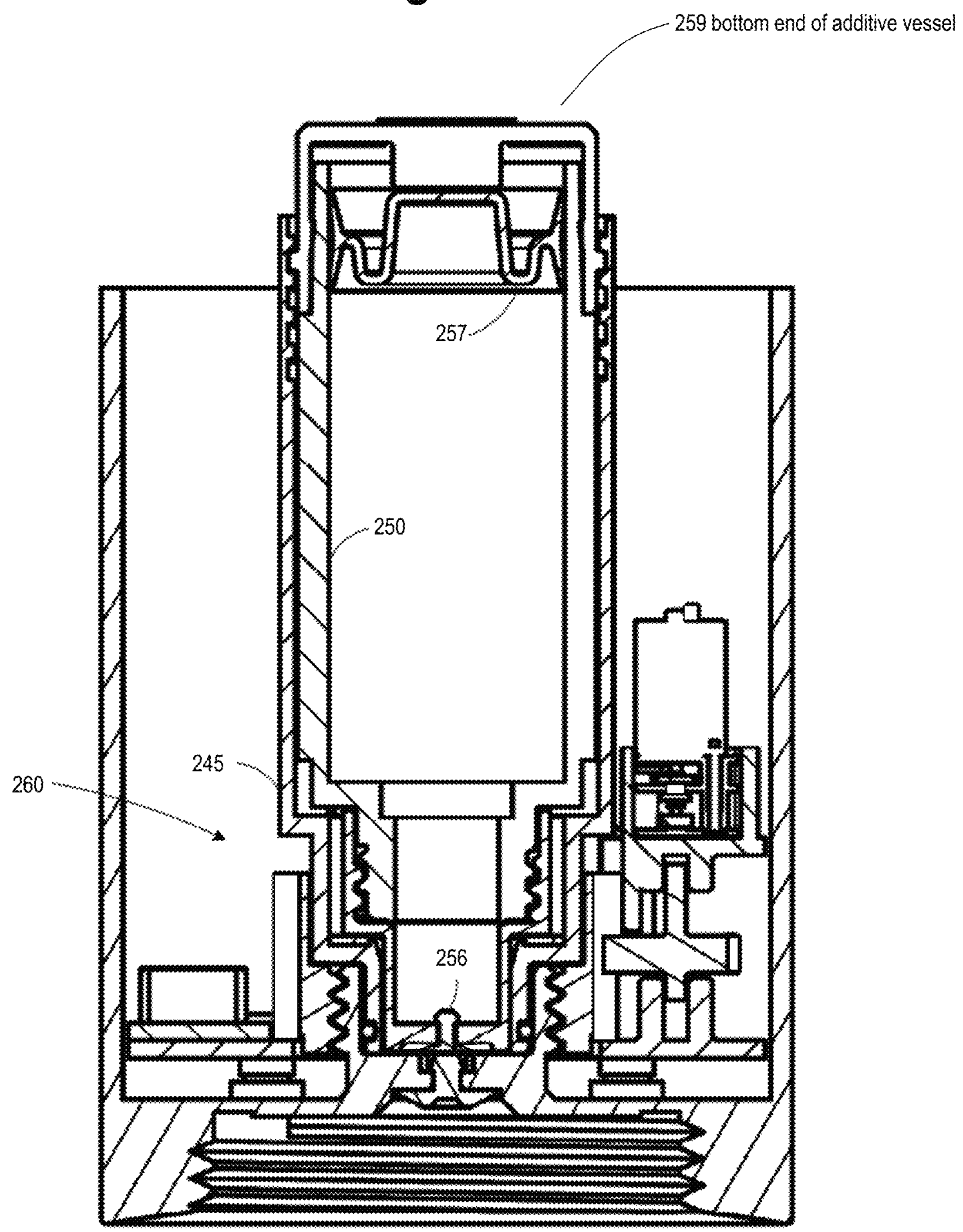
FIGS. 7A-7C illustrate a cutaway cross section of the dispensing assembly showing the operation of a pumping mechanism for an additive container, according to principles of the disclosure.
Figure 7B:
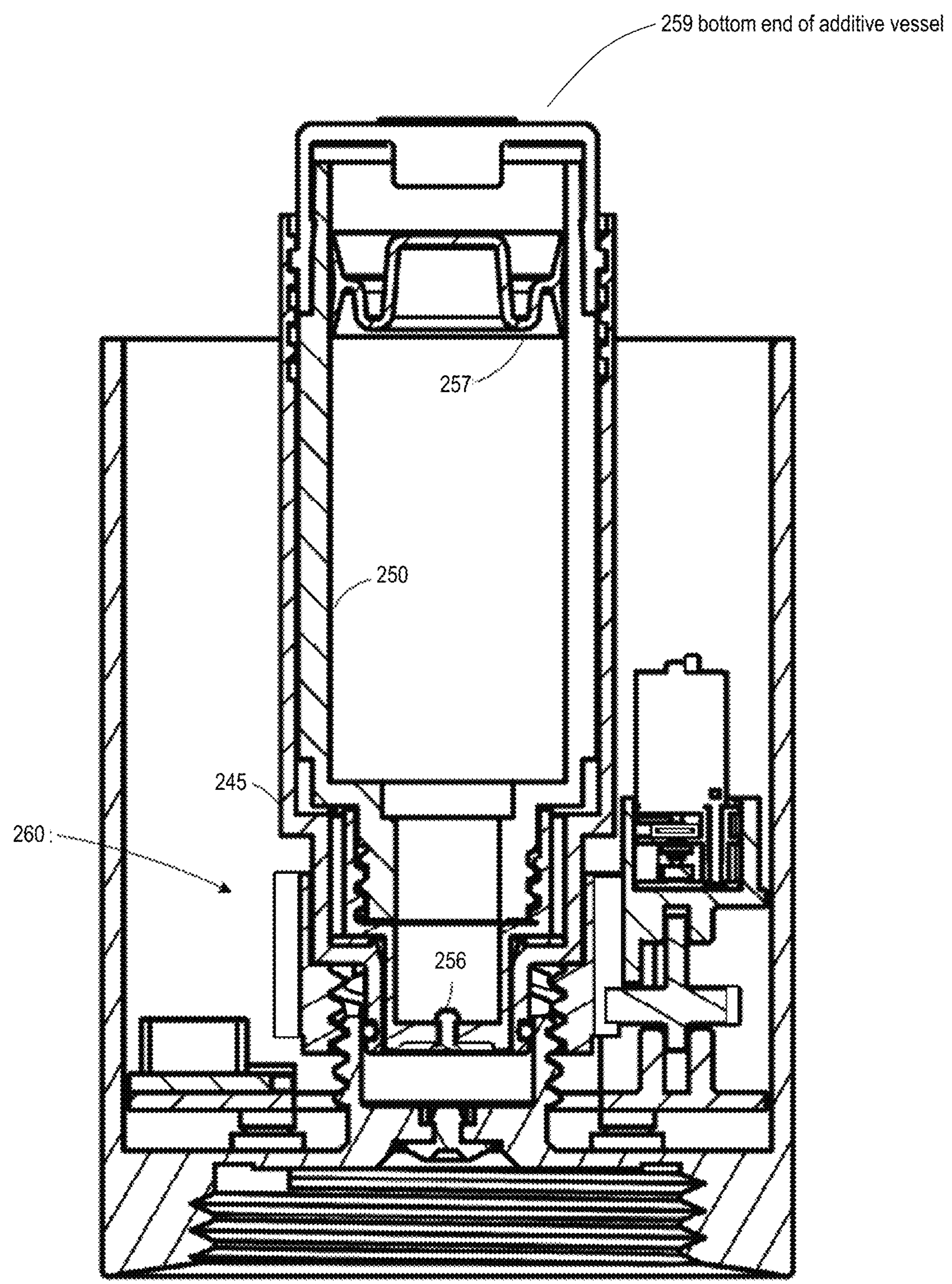

FIGS. 6 and 7A-C illustrate a cutaway cross section of the dispensing assembly showing the operation of the pumping mechanism 260 for an additive vessel 250. FIG. 6 shows an enlarged view of a portion of FIG. 7B showing the pumping mechanism 260 in a partially actuated state, according to principles of the disclosure. As illustrated, the vessel 250 is threaded into the receptacle 245 such that the piston head 253 of the vessel 250 engages or mates with the housing of the receptacle 245 to form or provide a piston 265. The piston 265 can slide back and forth within a pumping chamber 261 formed by a cylinder 262 of a pump housing 264. As described above, the piston head 253 includes a one-way valve 256 that permits flow from the vessel 250 into the pumping chamber 261. At an opposite end or top end of the chamber 261 from the piston head 253, the second one-way valve 242 permits liquid additive to flow from the pumping chamber 261 into the beverage chamber 230 as the piston 265 moves forward, i.e. downward as shown in the inverted arrangement of FIG. 6, in the cylinder 262.

Figure 7C:
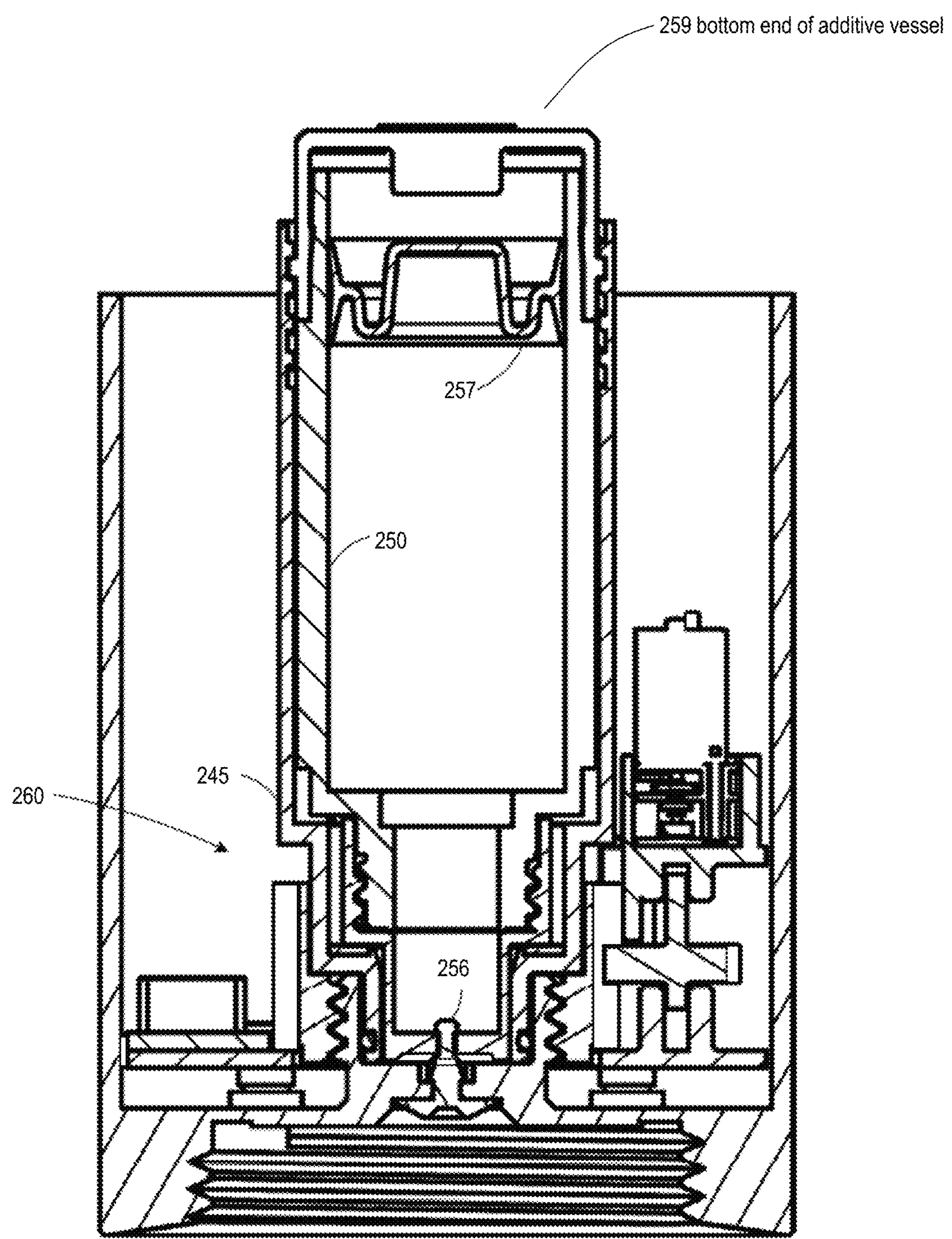

FIG. 7A shows the receptacle 245 and piston 265 in a starting position and the plunger 257 of the additive vessel 250 in an initial position prior to any additive being dispensed from a "full" additive vessel 250. As shown in FIG. 7B, the piston 265 is withdrawn, and the one-way valve 242 at the outlet port 241 blocks fluid flow in the reverse direction, creating a vacuum which draws fluid from the additive vessel 250 through the one-way valve 256 into the pumping chamber 261. It should be noted that in FIG. 7B, the plunger 257 has moved from its starting position illustrated in FIG. 7A to accommodate fluid flow from the vessel 250 into the pumping chamber 261. As shown in FIG. 7C, the piston 265 is driven back to its starting position, compressing the fluid within the chamber 261 and forcing the fluid through the one-way valve 242 at the outlet port 241 (see FIG. 3) and into the beverage chamber 230. The one-way valve 256 blocks the flow of fluid from returning into the vessel 250. Positive pressure, accordingly, is produced in this compression stroke, dispensing the contents of the pump chamber 323 through the outlet port 241 into the beverage chamber 230.

The volume dispensed during a single piston stroke can be modulated linearly by modifying the piston stroke length. Multiple piston strokes can be used to dispense larger quantities. By design, the volume of the pumping chamber can be configured to be as small as practically possible when the piston 265 is in the starting position to avoid wasting additive liquid when a depleted additive vessel is withdrawn from the receptacle.

Figure 8A:
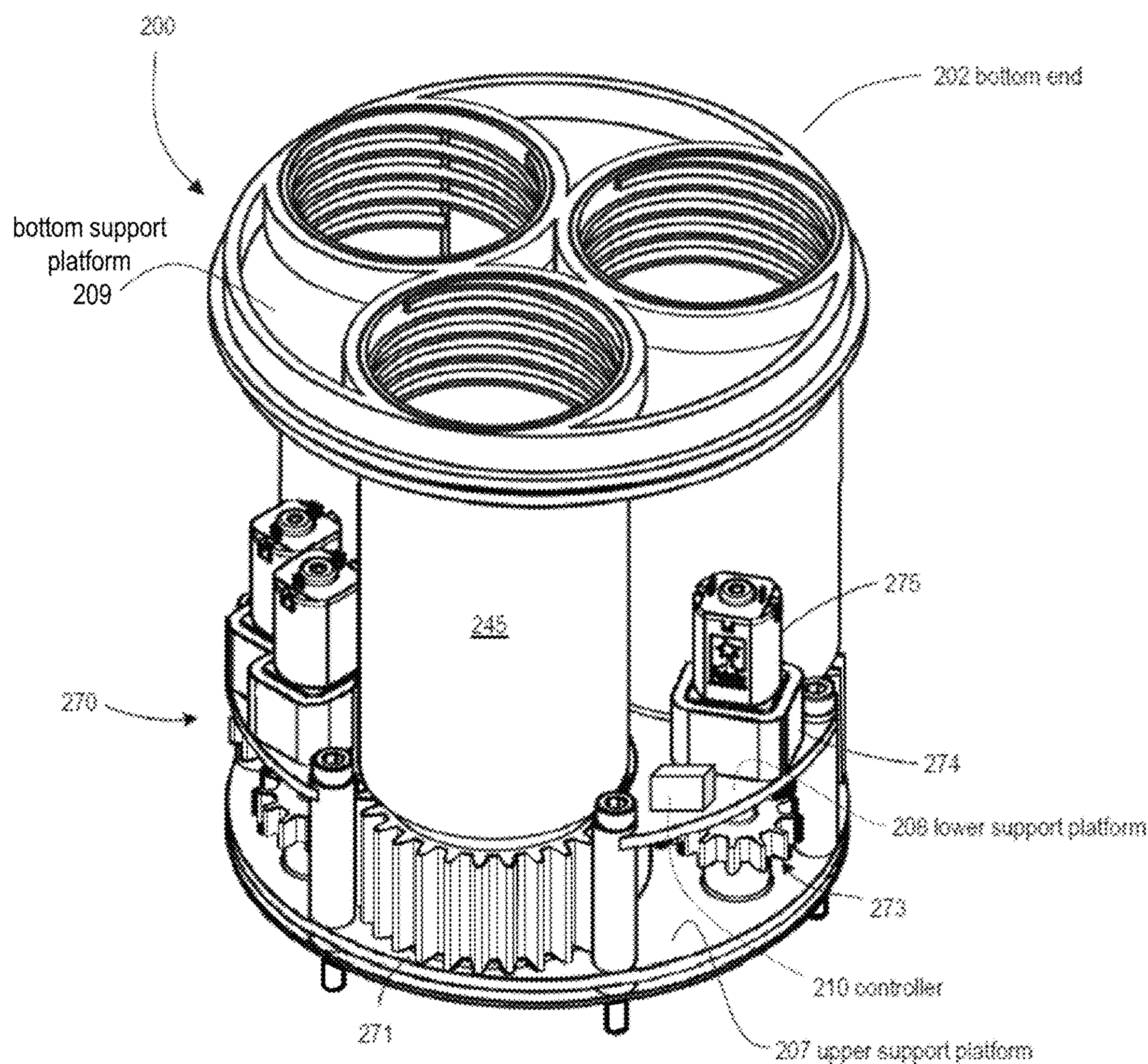
FIGS. 8A and 8B illustrate views of a drive mechanism for actuating a receptacle and associated piston of a pumping mechanism, according to principles of the disclosure.
Figure 8B:
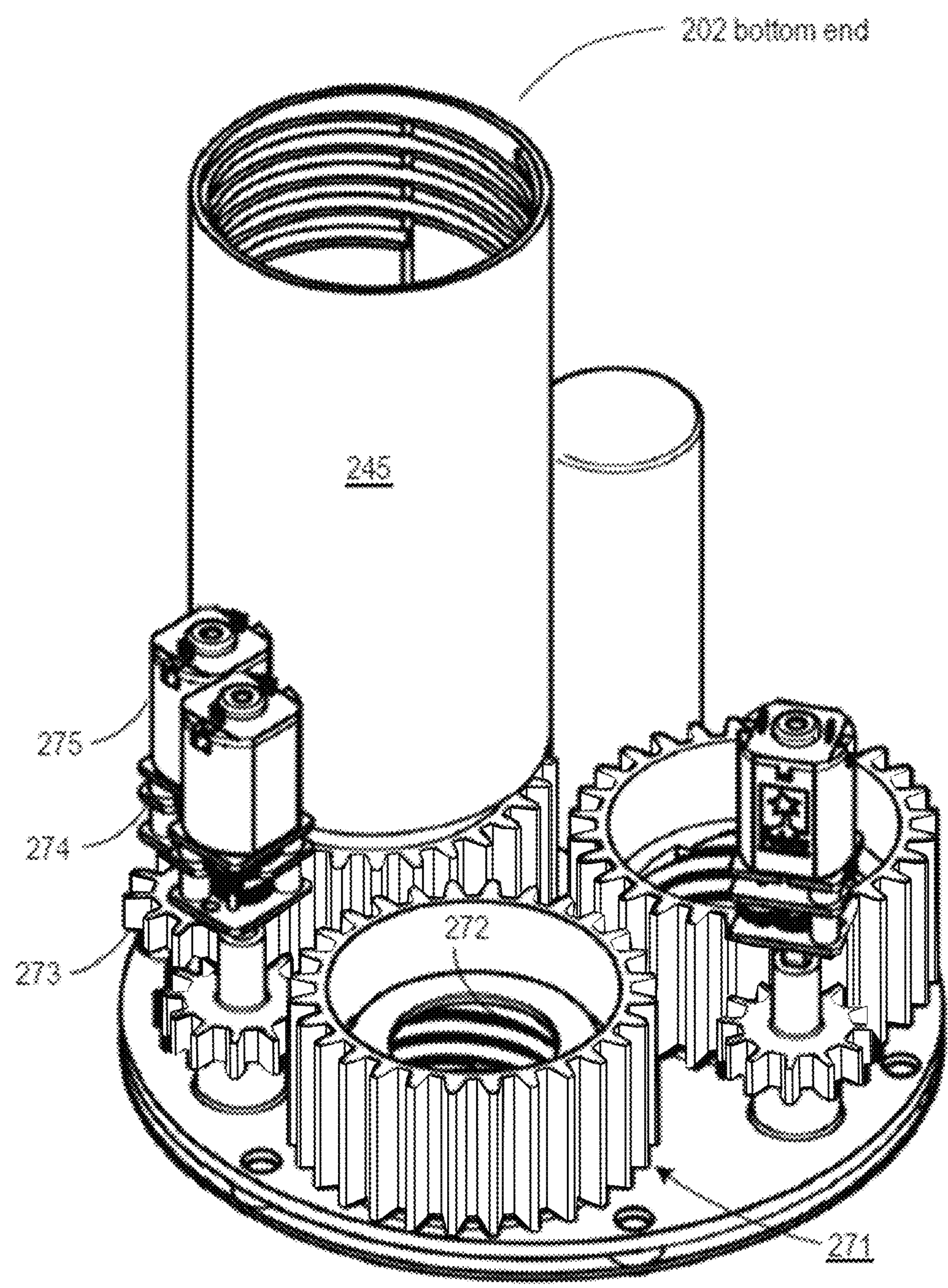

FIGS. 8A and 8B illustrate views of a drive mechanism 270 for actuating the receptacle 245 and associated piston 265 of the pumping mechanism 260. FIG. 8A illustrates an internal perspective view of the dispensing assembly 213 without an outer cover. FIG. 8B illustrates an additional internal perspective view of the dispensing assembly 213, with structure removed, to better illustrate certain aspects of the drive mechanism 270. As illustrated, each receptacle 245 and its associated piston 265 (not visible in FIGS. 8A-B) is moved down and up by an internally threaded toothed ring 271. A set of internal threads 272 on each internally threaded toothed ring 271 can engage with a threaded extension 276 (FIG. 9B) of the pump housing 264. Gears 271' on the outer diameter of each internally threaded toothed ring 271, can be driven by a gear 273, which in turn can be driven by an optional gearbox 274, which in turn is driven by an electric motor 275.

Figure 9A:
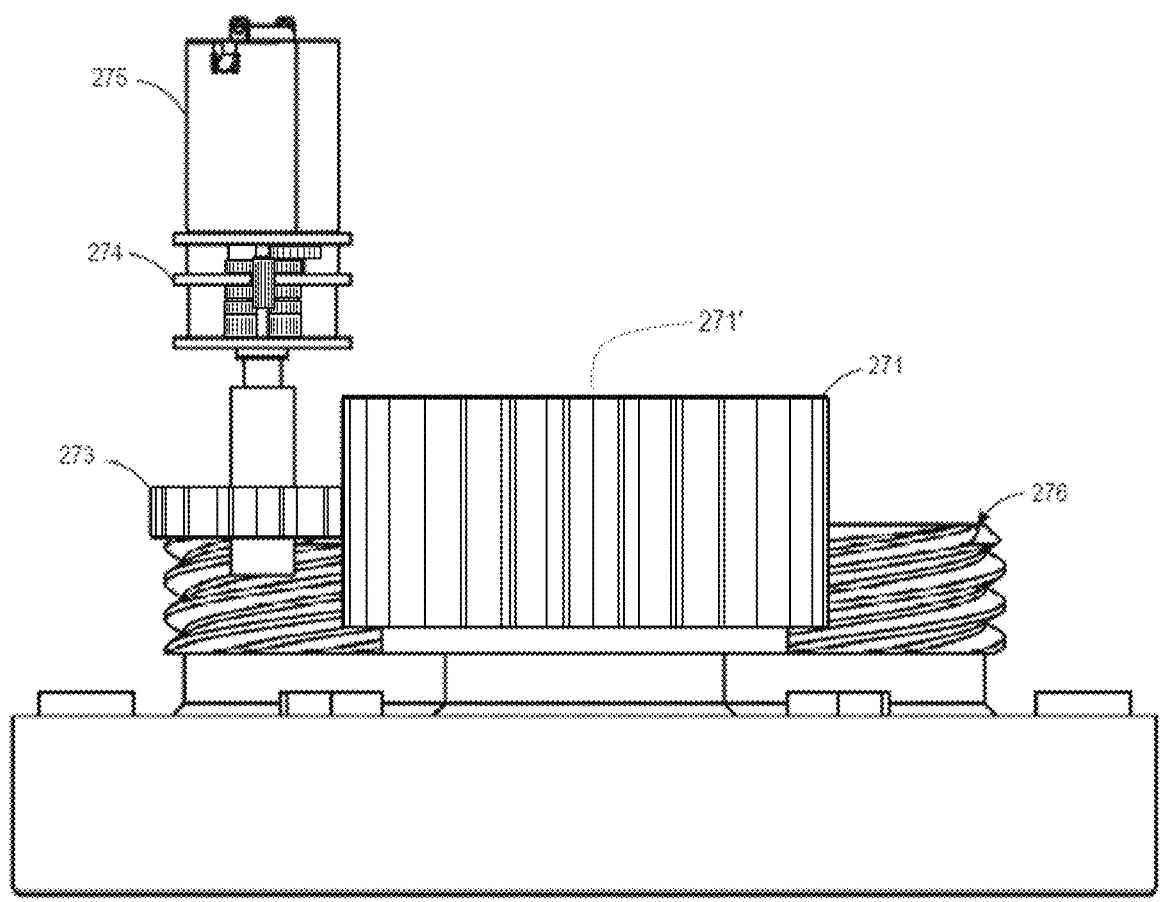
FIGS. 9A and 9B illustrate an elevation view of the drive mechanism with the receptacle in a starting position and in a withdrawn position, respectively, according to principles of the disclosure.
Figure 9B:
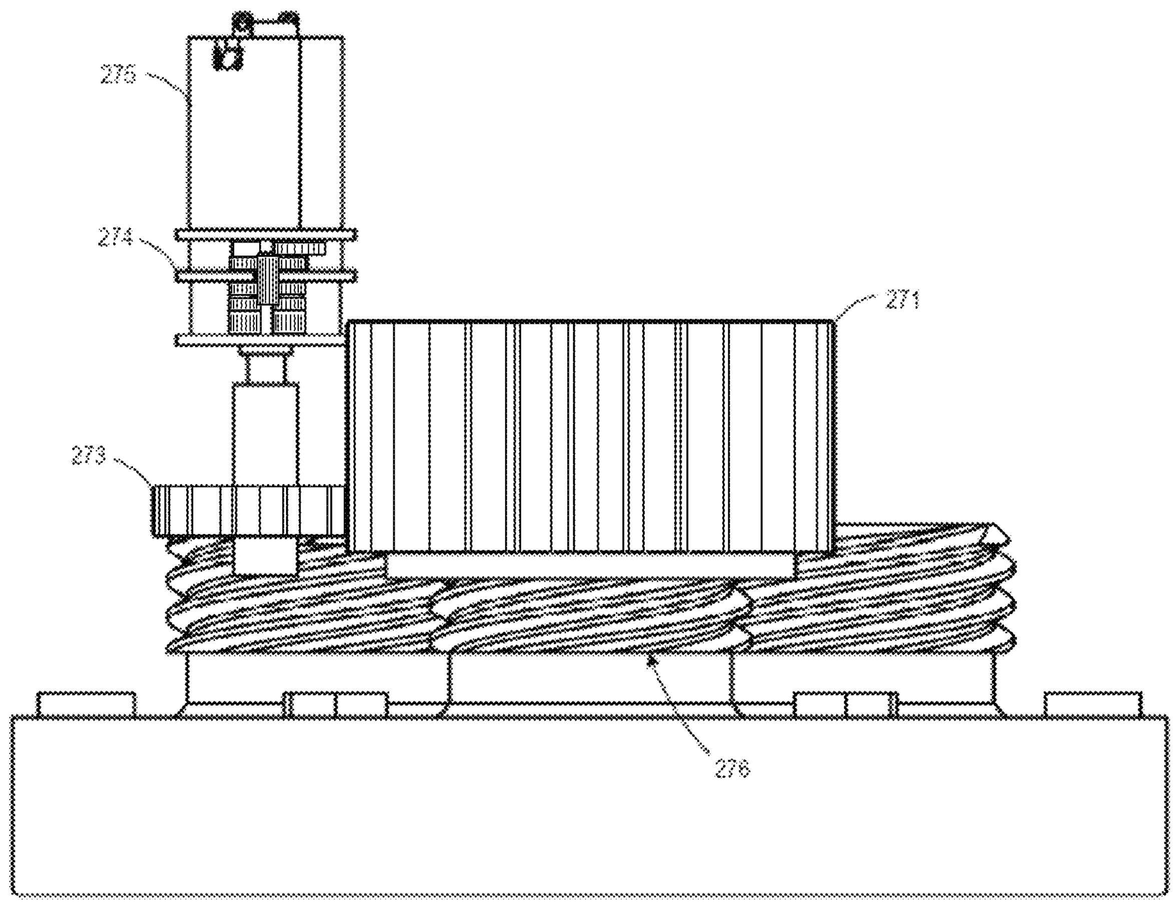
Figure 10:
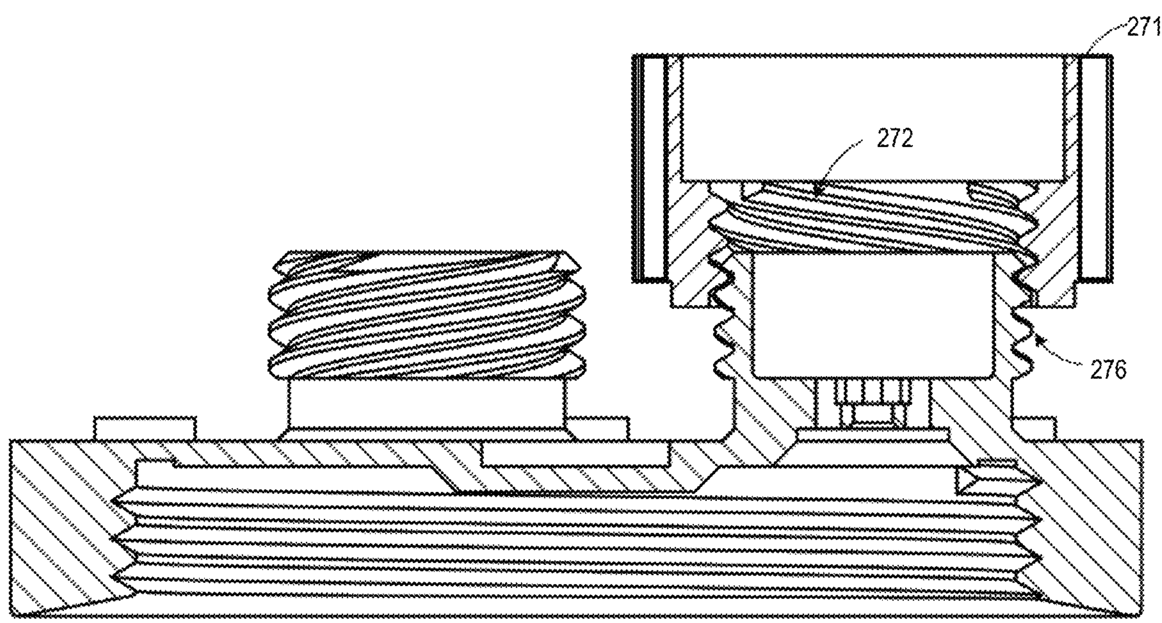
FIG. 10 illustrates a cross section of an internally threaded toothed ring engaged with a threaded extension of a pump housing, according to principles of the disclosure.

FIGS. 9A and 9B illustrate an elevation view of the drive mechanism with the receptacle in a starting position (9A) and in a withdrawn position (9B). As the toothed ring 271 rotates, the internal threads 272 cause the toothed ring to rise and fall on the threaded extension 276 of the pump housing 264. The receptacle 245, which can be snapped into or adhered to or integral with the toothed ring 271, also therefore rises and falls with the toothed ring, causing the piston 265 to move within the cylinder 262. In accordance with one embodiment, the threads on the toothed ring 271 and the threaded extension 276 can be a "fast" 4-start thread that cause the toothed ring 271 to travel to full linear extension with 180 degrees of rotation. The threads can be configured to have an ACME profile or similar. FIG. 10 illustrates a cross section of an internally threaded toothed ring 271 engaged with a threaded extension 276 (FIG. 9B) of the pump housing 264.

Figure 11A:
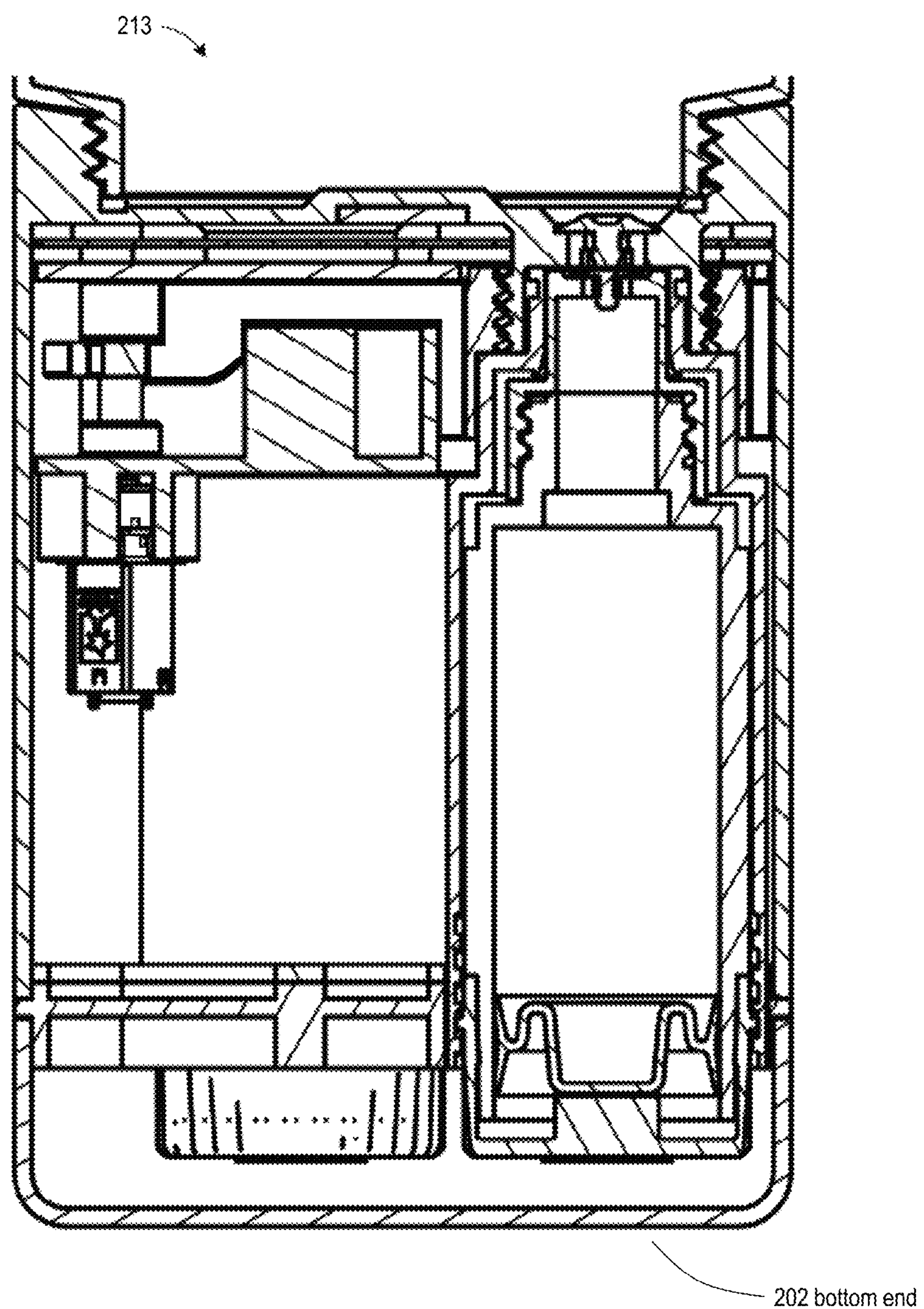
FIGS. 11A-11C illustrate three different cross-sectional cutaway views of the dispensing assembly 213, according to principles of the disclosure.
Figure 11B:
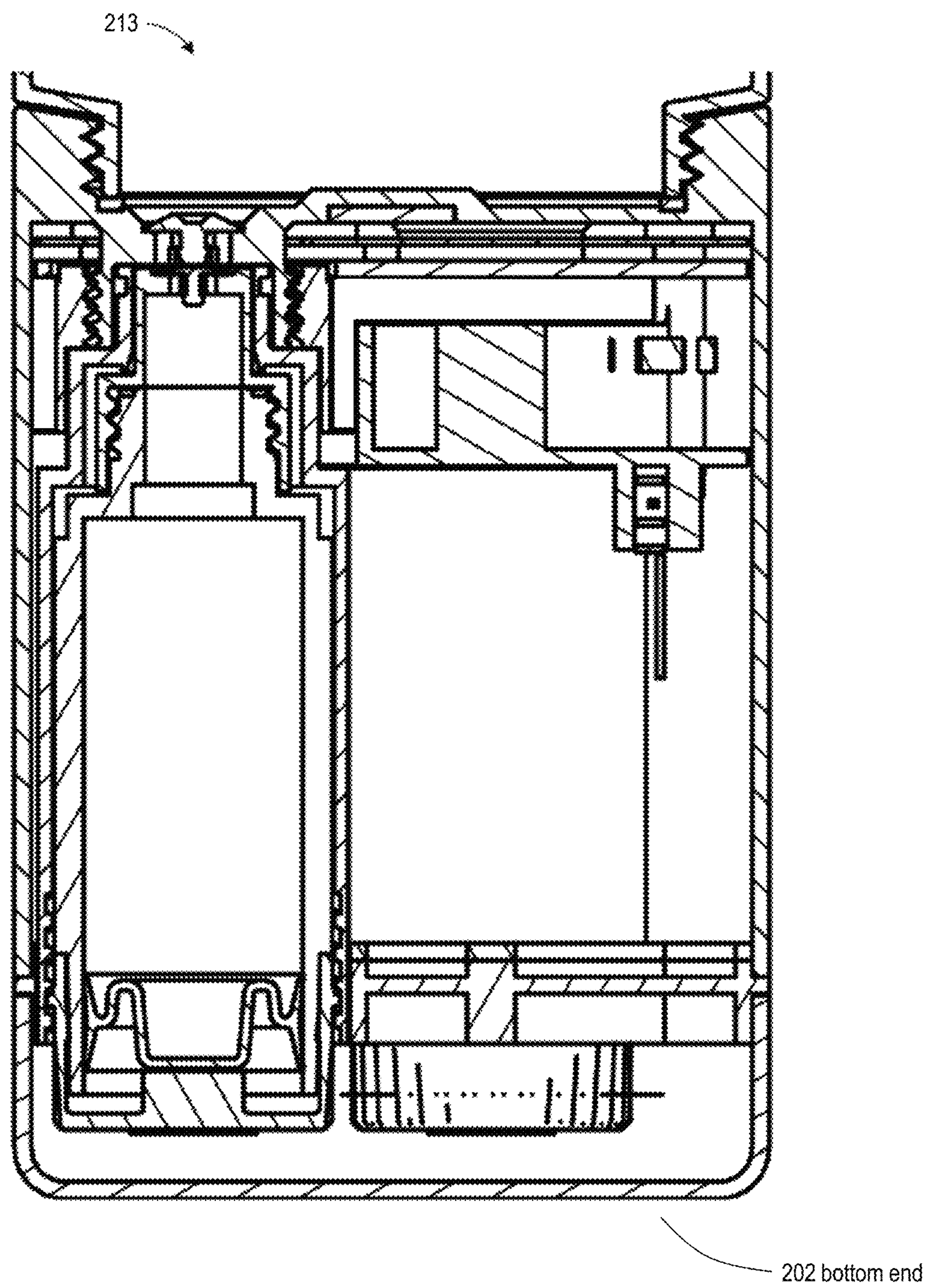
Figure 11C:
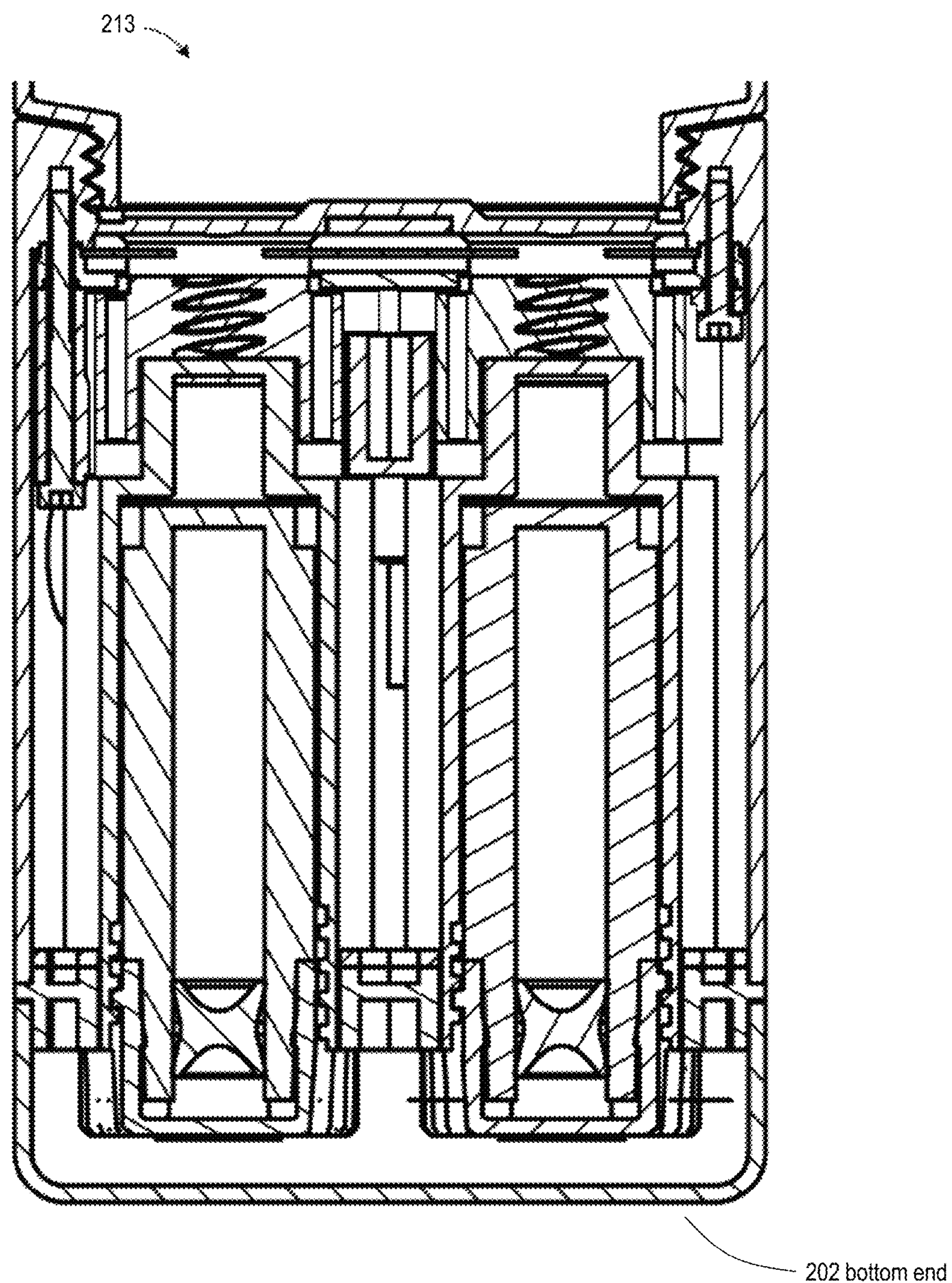
Figure 12A:
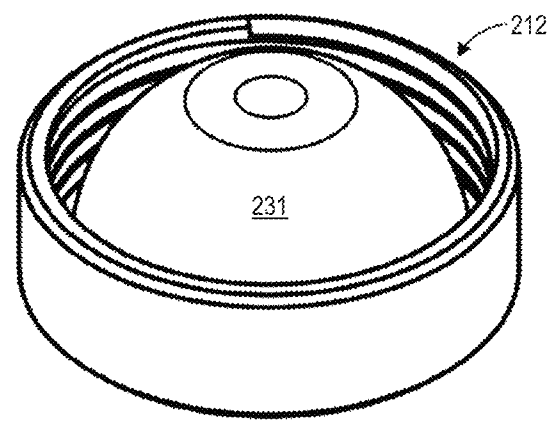
FIGS. 12A-12B illustrate isometric and cutaway views of a removable cap, according to principles of the disclosure.
Figure 12B:
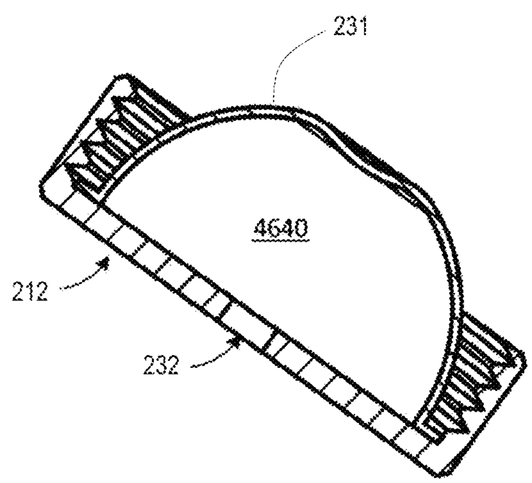

FIGS. 11A-11C illustrate three different cross sectional cutaway views of the dispensing assembly 213. FIGS. 12A and 12B illustrate isometric and cutaway views of the removable cap 212. As discussed above with reference to FIG. 2, in the illustrated embodiment, the cap 212 seals a top opening of the beverage chamber housing 214 to complete the chamber 230. The cap 212 can be configured to thread or snap onto a top end of the beverage chamber housing 214. The cap 212 includes a compressible bladder 231 formed of silicone or other suitable rubber, that allows for deformation of the bladder 231 so as to accommodate the addition of liquid additives (from the vessel 250) into the chamber 230 by the dispensing assembly 213. The cap 212 also includes an air passageway 232 to allow air to escape from behind the bladder 231 so that the bladder can compress to accommodate the addition of the liquid additives. As shown in FIGS. 12A-B, the bladder 231 can be configured with a dimpled dome shape that yields an approximately linear resistance to deformation.

Figure 13:
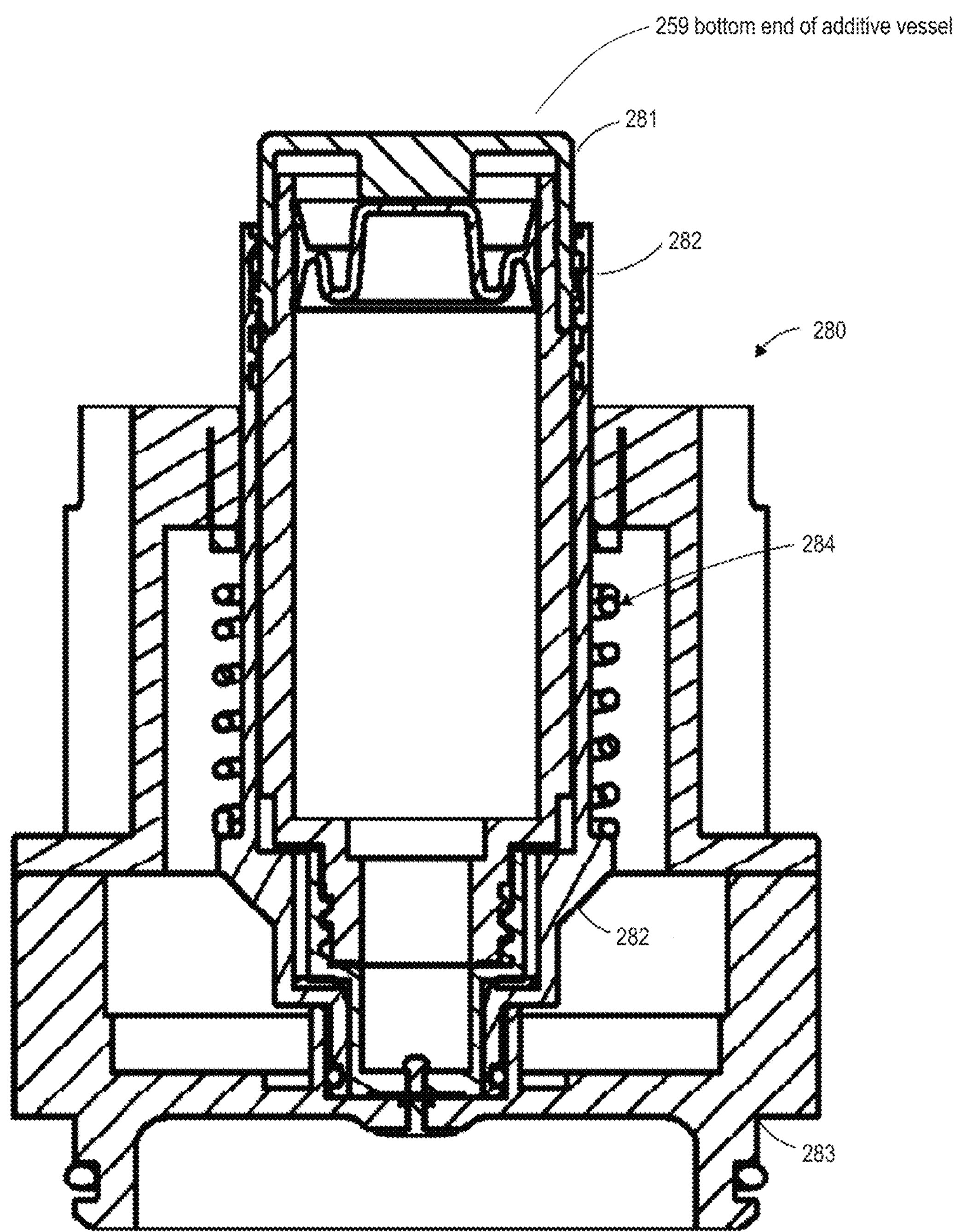
FIG. 13 illustrates a cutaway view of a pumping mechanism, according to principles of the disclosure.

FIG. 13 illustrates a cutaway view of a pumping mechanism 280 in accordance with one embodiment of the disclosure. Similar to the embodiments discussed above with reference to FIGS. 2-12, an additive vessel 281 is received into a receptacle 282, which engages within a pump housing 283. Two one-way valves similarly work together with a sliding piston and cylinder to pump additive liquid through a pumping chamber. In the embodiment illustrated in FIG. 13, however, the receptacle 282 can be actuated manually, by a user grasping and withdrawing the receptacle from the pump housing 283, or by another mechanical means. The receptacle 282 is withdrawn against pressure of a spring 284, which is biased to press the receptacle back to its start position, such that when the receptacle is released, any additive fluid drawn into the pumping chamber is then automatically ejected into the beverage chamber.

Figure 14A:
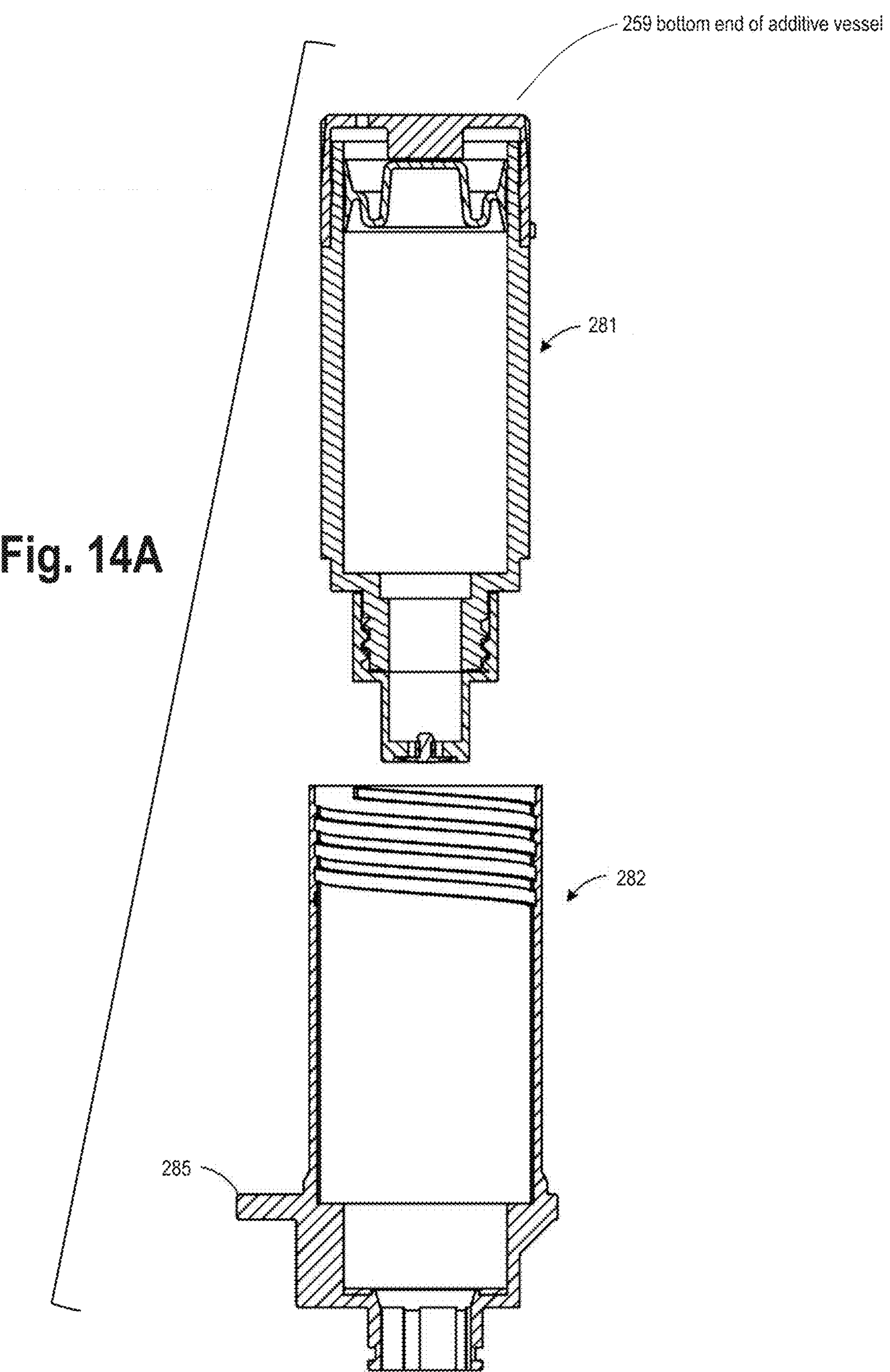
FIG. 14A illustrates a cutaway view of a receptacle of the embodiment of FIG. 13, but shown from a different perspective rotated 90 degrees around a vertical axis, according to principles of the disclosure.

FIG. 14A illustrates a cutaway view of the receptacle 282 of the embodiment of FIG. 13, but shown from a different perspective rotated 90 degrees around a vertical axis. The receptacle 282 includes a tab 285 that can be used either manually or actuated by a mechanism in order to withdraw the receptacle against the tension of the spring 284 from the pump housing 283. FIG. 14A also shows the additive vessel 281 removed from the receptacle 282.

Figure 14B:
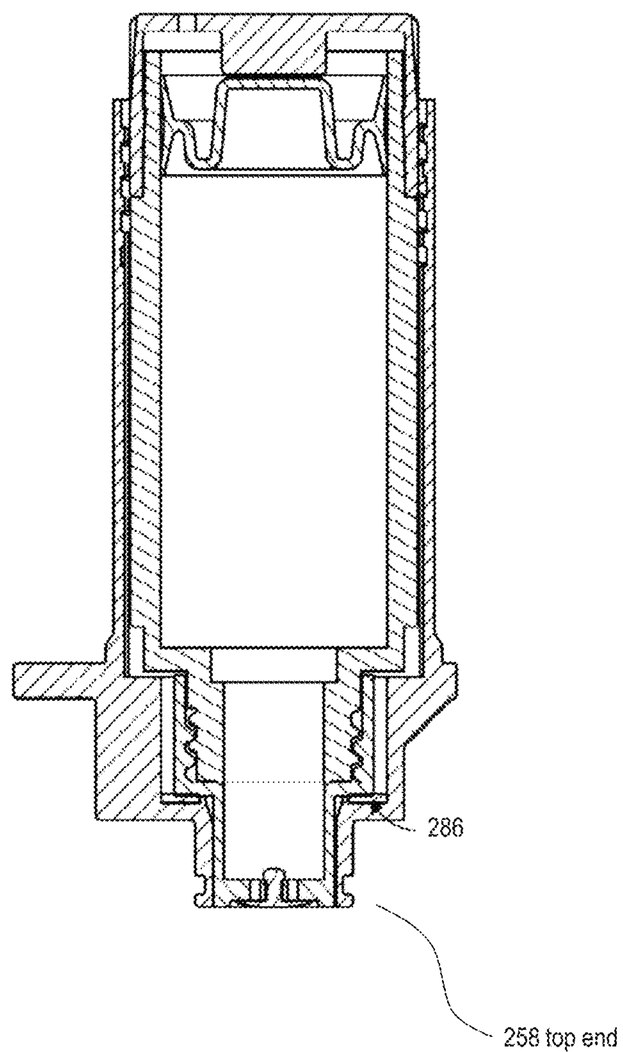
FIGS. 14B and 14C illustrate a seal placed in a shoulder portion of the receptacle that serves a vacuum breaker function as an additive container is withdrawn from the receptacle, according to principles of the disclosure.
Figure 14C:
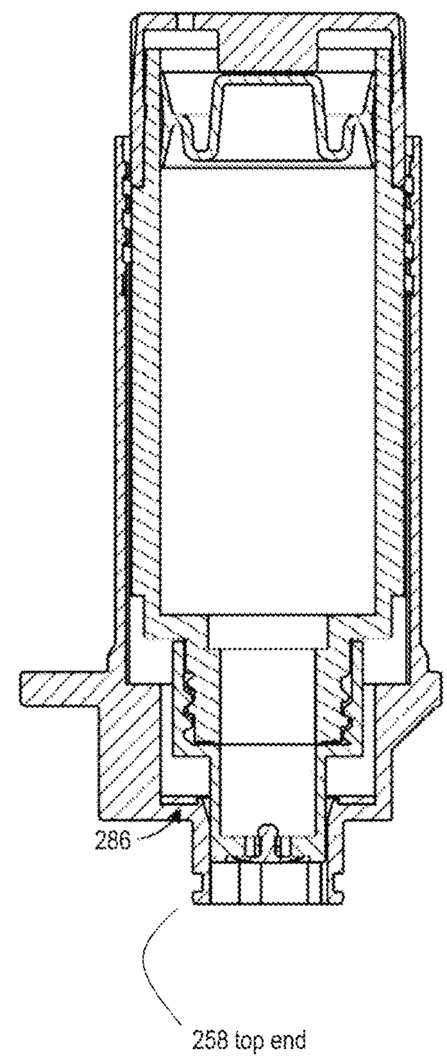
Figure 15A:
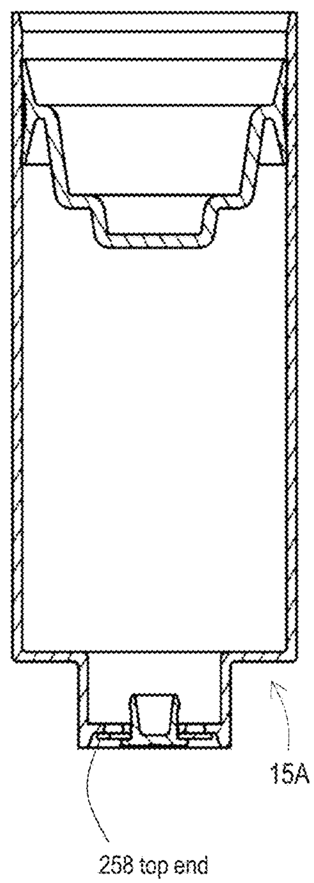
FIGS. 15A-15D illustrate different configurations of containers, vessels or pods for liquid additives that can be used in accordance with various embodiments.
Figure 15B:
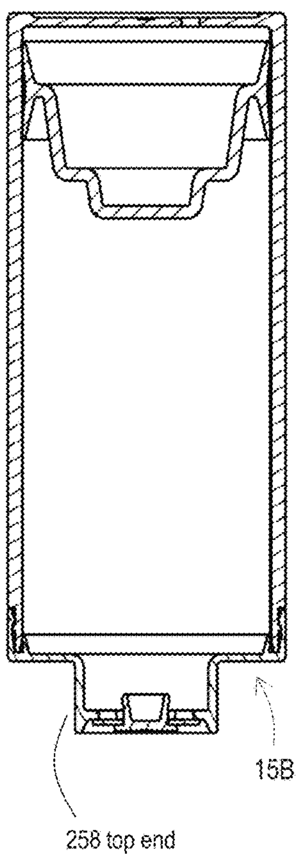
Figure 15C:
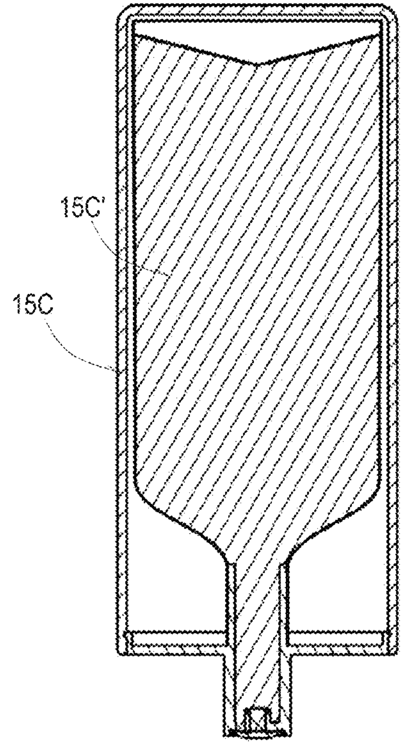
Figure 15D:
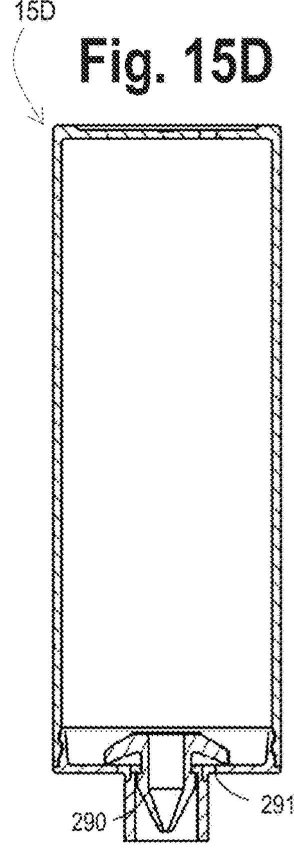

FIGS. 14B and 14C illustrate a seal 286 placed in a shoulder portion of the receptacle 282 that serves a vacuum breaker function as the additive vessel 281 is withdrawn from the receptacle, in an embodiment according to principles of the disclosure. Once the additive vessel 281 is withdrawn even a slightest amount, the vessel no longer contacts the seal 286 and therefore air is allowed to pass into the pumping chamber area as the vessel is withdrawn. If no air were allowed to pass into the pumping chamber, the action of withdrawing the vessel or additive vessel would create a vacuum that would suck additive fluid out of the vessel and into the now open pumping chamber. FIGS. 15A-D illustrate different configurations of additive vessels, containers or pods for liquid additives that can be used in accordance with various embodiments. FIG. 15A illustrates an airless or non-vented rear load vessel 15A with a rigid tubular side wall. The additive vessel of FIG. 15A is similar in function to the vessel 250 illustrated in FIGS. 5A-B, with a plunger 257 that moves to prevent air from entering the vessel. FIG. 15B illustrates an airless front load vessel 15B with a rigid tubular side wall. FIG. 15C illustrates a collapsible bag or sachet 15C enclosed within an outer container 15C'. The collapsible bag makes the plunger unnecessary, according to an embodiment of the disclosure. FIG. 15D illustrates a vented additive vessel 15D, which allows air to pass back into the vessel to take the place of pumped additive fluid. A two-way valve 290 allows additive fluid to pass out of the vessel through a center portion of the valve, while air is allowed to enter the vessel through ports 291 around the periphery of the valve and under an umbrella portion of the valve.

Figure 16:
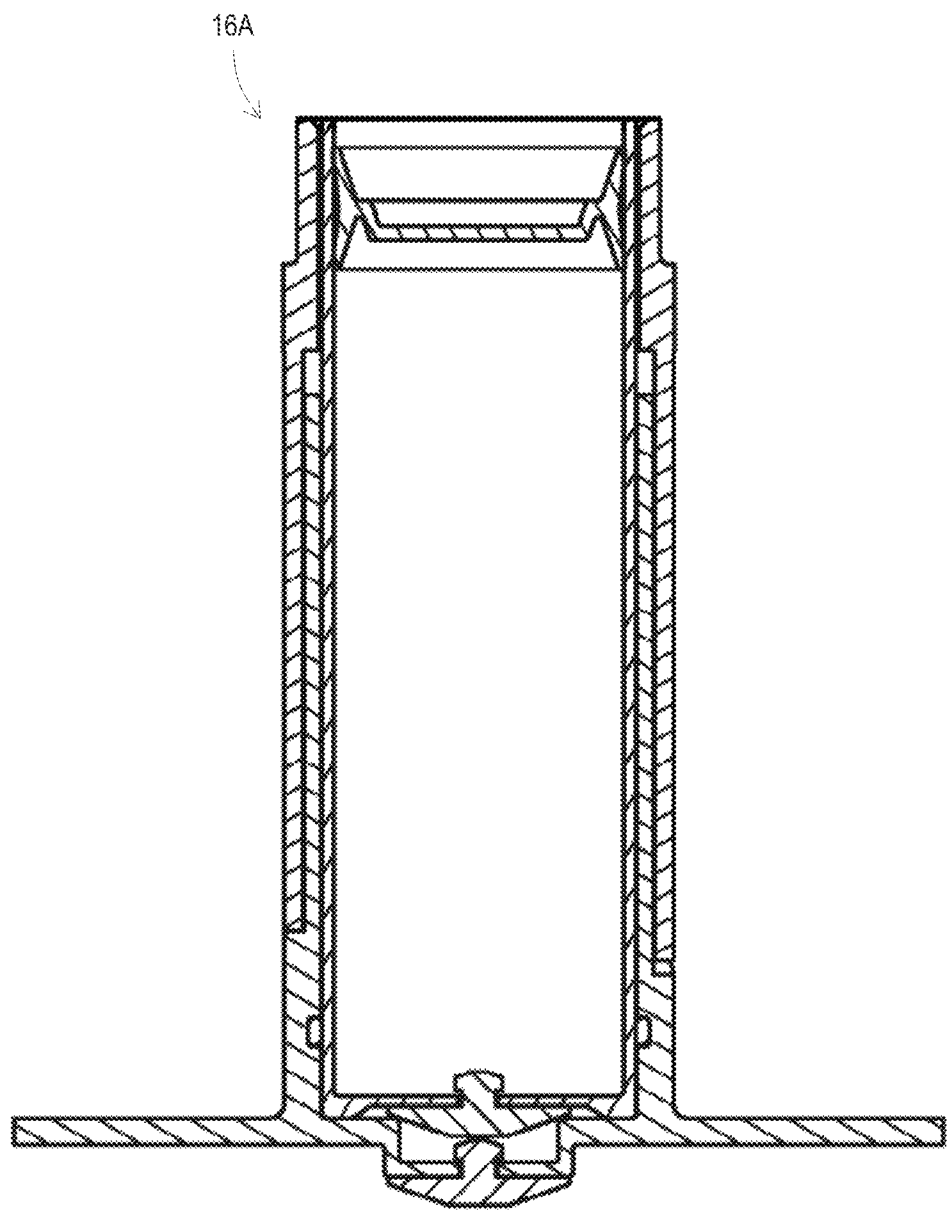
FIG. 16 illustrates a simplified positive displacement pumping mechanism that can be used with various actuation mechanisms, according to principles of the disclosure.

FIG. 16 illustrates a simplified positive displacement pumping mechanism 16A that can be used with various actuation mechanisms in accordance with various embodiments.

One benefit of the foregoing described positive displacement pump configurations is that when the additive vessel is withdrawn and when the beverage chamber housing is removed from the dispensing assembly all parts of the pumping mechanism become visible and accessible for cleaning. The pumping chamber is accessible through the receptacle and only a one-way umbrella valve, for example, sits in the port between the pumping chamber and the platform which is otherwise also accessible for cleaning. A one-way umbrella valve can be easily removed and cleaned or replaced.

As noted above, the various features and functionality of the embodiments described above with reference to FIG. 1, FIGS. 2-12, and further with respect to FIGS. 13-16, can be combined as desired. In general, various features and functionality of the embodiments described herein can be combined and used in conjunction with various features and functionality of other embodiments.

For example, the dispensing assembly 213 illustrated in FIG. 3 can be further configured with an attachment sensor that monitors whether the beverage chamber housing 214 is threaded onto the dispensing assembly 213 before a dispensing event occurs. An attachment sensor can replace or supplement a lid sensor and checks can be performed before initiating a dispensing event. Each additive vessel can be configured with an RFID tag. The RFID tag of each additive vessel, once in the beverage apparatus 200, can be associated with a respective RFID reader or transceiver that is mounted on the dispensing assembly 213 or on another portion of the beverage apparatus 200. In the various embodiments of FIGS. 2-16, each vessel can be configured with its own separate pumping mechanism 260.

As shown in FIG. 8A, for example, the beverage apparatus 200, as well as the other container assemblies described herein, can include various structural platforms, connectors, fasteners, support posts, and other structure. The beverage apparatus 200 can include an upper support platform 207 and a lower support platform 208. The lower support platform 208 can be positioned below or lower than the upper support platform 207 when the bottle is in an upright orientation. Additionally, the beverage apparatus 200 can include a bottom support platform 209. Each of the support platforms 207, 208, 209 can provide structural support and integrity to the beverage apparatus 200. For example, the lower support platform 208 can support the controller 210. For example, the bottom support platform 209 can support the controller 210. For example, the lower support platform 208 can support the controller 210. The support platforms 207, 208, 209 can be connected and/or adjoined by columns, flanges, or other support structure.

FIG. 17 shows a beverage apparatus 300, according to principles of the disclosure. The beverage apparatus 300 can be part of an ecosystem or system 10'. The beverage apparatus 300 can be similar in structure and functionality to the beverage apparatus 100 described herein. The beverage apparatus 300 can be similar in structure and functionality to the beverage apparatus 200 described herein. The beverage apparatus 300 can include any of the features of the beverage apparatus 100 and/or the beverage apparatus 200 as may be desired.

As shown in FIG. 17, the beverage apparatus 300 can include a beverage chamber housing 315, a base cover 317 and a dispensing assembly 318. The dispensing assembly 318 can be positioned between the beverage chamber housing 315 and base cover 317. The beverage chamber housing 315 can include an internal volume or chamber 316. The internal volume or chamber 316 can hold or contain the consumable liquid that is contained in the beverage apparatus 300.

The dispensing assembly 318 can be provided with a display or interface 310 that includes various user interface features, such as buttons or lights. The interface 310 and/or other user interface features can be provided anywhere on the beverage apparatus 300 as may be desired. Any number of user interface features can be provided so as to afford desired user control or functionality, so as to effectively control and monitor status of the beverage apparatus 300, and so as to provide interface between the beverage apparatus 300 and the user and/or user device 106. An additive button 313 can be provided on the beverage apparatus 300 and an illustrative function button 314 can be provided to afford functionality as described herein. In accordance with at least one embodiment of the disclosure, a user can press the additive button 313 so as to dispense additive, from a pod, additive vessel or vessel 400, into the consumable liquid contained in the beverage apparatus 300. The beverage apparatus 300 can include pod indicator lights 311. The pod indicator lights 311 can be provided to represent or show which pod is selected to dispense an additive and/or which pod is dispensing an additive. For example, each of the pod indicator lights 311 can be associated with a respective pod 400, i.e. additive vessel 400, in the beverage apparatus 300. When a user presses and/or holds the additive button 313, the selected pod 400 (as indicated by one of the pod indicator lights 311) can dispense the desired additive. The particular pod 400 (that the user wishes to select) can be selected, by the user, through a predetermined sequence of presses of the additive button 313, for example. It is appreciated that the disclosure is not limited to the buttons, lights, and/or other user interface devices shown in FIG. 17. Rather, other user interface arrangements, features or functionality may be utilized so as to control dispensing of additives from a pod and/or other operations of the beverage apparatus 300. The interface lights 312 can provide the user with various status information regarding the beverage apparatus 300. Functionality and/or operational control, for example, that is provided via the interface 310 can also be provided via a user device 106, such as a cell phone 106, for example. The user device 106 can communicate with the beverage apparatus 300 as otherwise described herein. As shown in FIG. 17, the beverage apparatus 300 can include an apparatus controller or controller 350. The apparatus controller 350 can include an apparatus computer processor (ACP) 360 (the ACP 360 may also be described as an apparatus processing portion (APP) 360) and an apparatus database portion (ADP) 370. The ACP 360 can include one or more processors. The apparatus database portion 370 can include various computer memory that includes various databases, data records, memory portions and other memory architecture. Accordingly, the apparatus database portion 370 can be provided with computer readable instructions that the ACP 360 can read according to principles of the disclosure. Based on such instructions and/or other data, the ACP 360 can perform various operations and/or provide functionality as described herein.

The apparatus controller 350, with the ACP 360 and the apparatus database portion 370, can control or provide for operations of the beverage apparatus 300 and can provide the various features and functionality described herein. Various wires, communication paths and/or other conductive paths (not shown) can be utilized so as to provide connectivity between the apparatus controller 350, various motors or other drive mechanisms of the beverage apparatus 300 and/or other components of the beverage apparatus 300. Such wires, communication paths or other conductive paths can be in the form of insulated wires and/or structurally embedded wires or electrical conduits that are routed between components. Such wires or other conductive paths can be integrated into one or more components of the beverage apparatus 300. Such wires or other conductive paths can provide for both communication between components and/or electrical power to (or between) components, for example.

The ACP 360 can be in communication with the user device 106 that is associated with the particular user of the beverage apparatus 300, other user devices 106, a cloud network or resource 108, and/or other systems and/or other networks. For example, the beverage apparatus 300 can be in communication with a cell phone 106, of the user, that is associated with the beverage apparatus 300. The apparatus database portion 370 can contain any of a wide variety of data utilized by or generated by the apparatus controller 350 and/or the ACP 360, such as described below.

The beverage apparatus 300, as shown in FIG. 17, can also include an external communication portion or communication portion 359 that provides communication between the beverage apparatus 300 and various other components of the system 10'. For example, the communication portion 359 can provide communication with a user device such as a user cell phone 106. The apparatus controller 350 and/or the ACP 360 can perform a wide variety of processing related to the dispensing of additives and other processing as otherwise described herein.

The controller or apparatus controller 350 can be fully provided within the beverage apparatus 300. Accordingly, the beverage apparatus 300 can operate fully independently, with all processing and data storage/retrieval performed onboard the beverage apparatus 300, without external input/output. On the other hand, processing and data storage/retrieval can be shared between the onboard apparatus controller 350 and external computing resources. Such external resources might include the ecosystem server or server 20. The server 20 can include processors and databases that can be utilized in conjunction with operation of the controller 350. The server 20 can interface with numerous other beverage apparatuses 300 and user devices 106 in the ecosystem 10'. Such numerous beverage apparatuses 300 and devices 106 may be in the thousands or millions. Additionally, the server 20 itself can be dispersed over a cloud architecture or dispersed over other architecture that includes numerous processing resources and numerous database resources.

As shown in FIG. 17, the beverage apparatus 300 can include the pod, additive vessel, or vessel 400. The vessel 400 can be removable, by the user in routine use, from the beverage apparatus 300 in accordance with one or more embodiments of the disclosure. The vessel 400 can be associated with or include a tag or RFID tag 410. The tag 410 can be mounted to or on a side of the vessel or mounted to some other location or position on the vessel 400. The tag 410 can be mounted on a lower or bottom surface 403 of the vessel 400. The vessel 400 and tag 410 can include and/or be combined with any of the features described above with reference to the beverage apparatus 100 and/or the beverage apparatus 200, for example. In manner described above, the vessel 400 is insertable into the beverage apparatus 300. The vessel 400 can dispense additive, which is contained in the vessel 400, in manner as described above.

Figure 18:
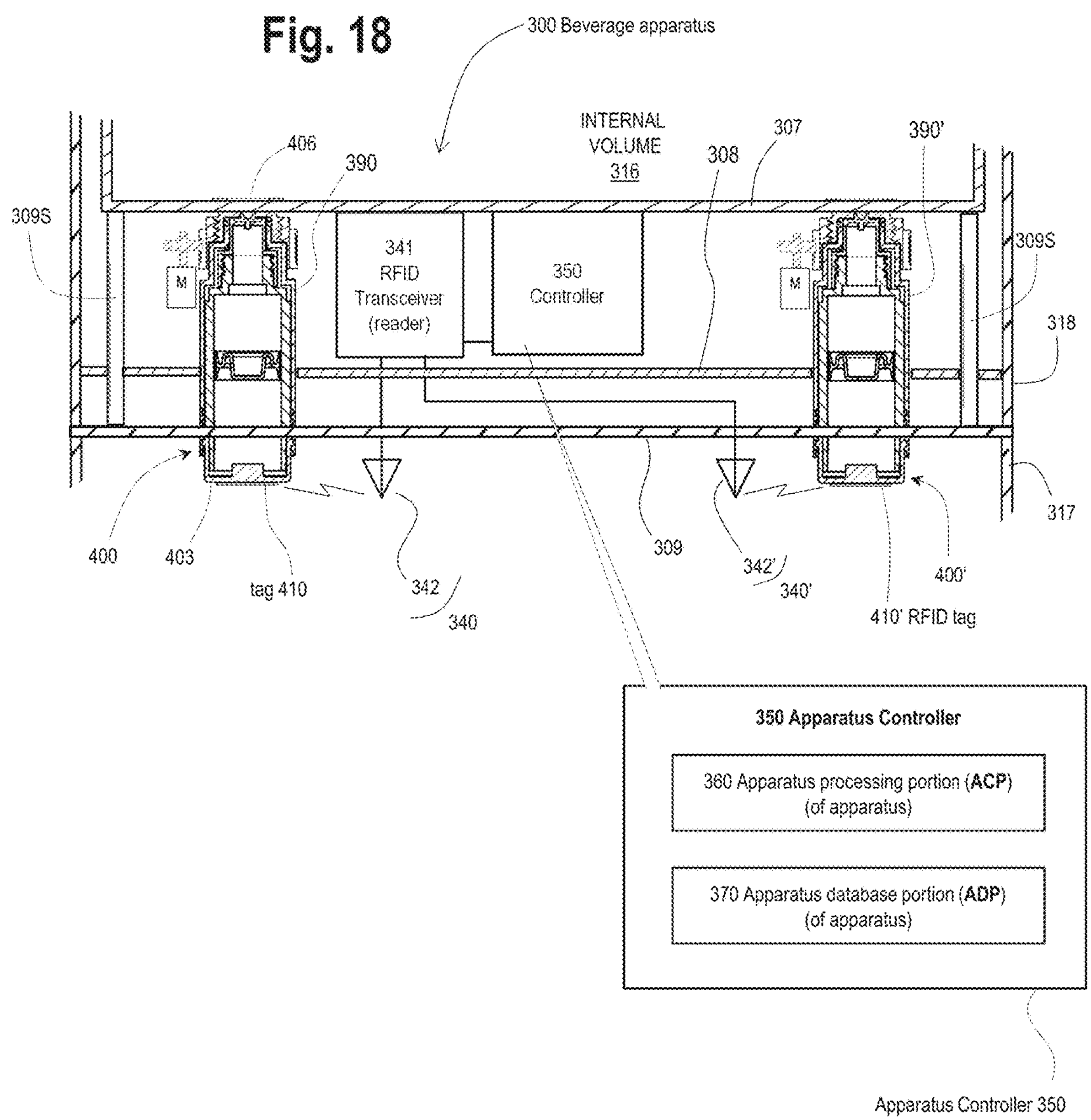
FIG. 18 is a schematic diagram showing further details of a beverage apparatus 300 in accordance with the principles of the disclosure.

FIG. 18 is a schematic diagram showing further details of a beverage apparatus 300 in accordance with the principles of the disclosure. The beverage apparatus 300 can include the dispensing assembly 318 and base cover 317 as described above. The dispensing assembly 318, in the beverage apparatus 300, can include an upper support platform 307. Beverage apparatus 300 can also include a lower support platform 308 and a bottom support platform 309. Supports 309S can extend between the lower support platform 308 and the upper support platform 307 and the bottom support platform 309. Accordingly, the upper support platform 307 can be structurally supported by the supports 309S. Various other structural supports, flanges, and/or connections between components can be provided. As shown in FIG. 18, the beverage apparatus 300 can include a pod aperture or vessel aperture 389 that is provided in a receptacle 390. The receptacle 390 may be described as a "bay" or as a "vessel bay". The vessel 400 can be slid into and disposed in the pod aperture 389 in the receptacle 390 in manner as described herein. The vessel 400 can include a piston head 405 and a port 406, which can be provided with a one-way valve 407 to allow additive to exit the vessel 400. The piston head 405 can be of same or similar structure—and function in same or similar manner—as the piston head 253 with port 255, as described above. The piston head 405 can be positioned under the upper support platform 307 of the beverage apparatus 300. Mechanical components within or of the beverage apparatus 300 can be the same or similar to the mechanical components described above to provide dispensing of additive from the vessel 400 into the internal volume 316 of the beverage apparatus. In manner described above, the internal volume or chamber 316 can contain a consumable liquid. As shown in FIG. 18, the vessel 400 can include the tag or RFID tag 410 that is provided on a bottom surface 403 of the vessel 400. For example, the RFID tag 410 can be adhesively attached the bottom surface 403.

Figure 20:
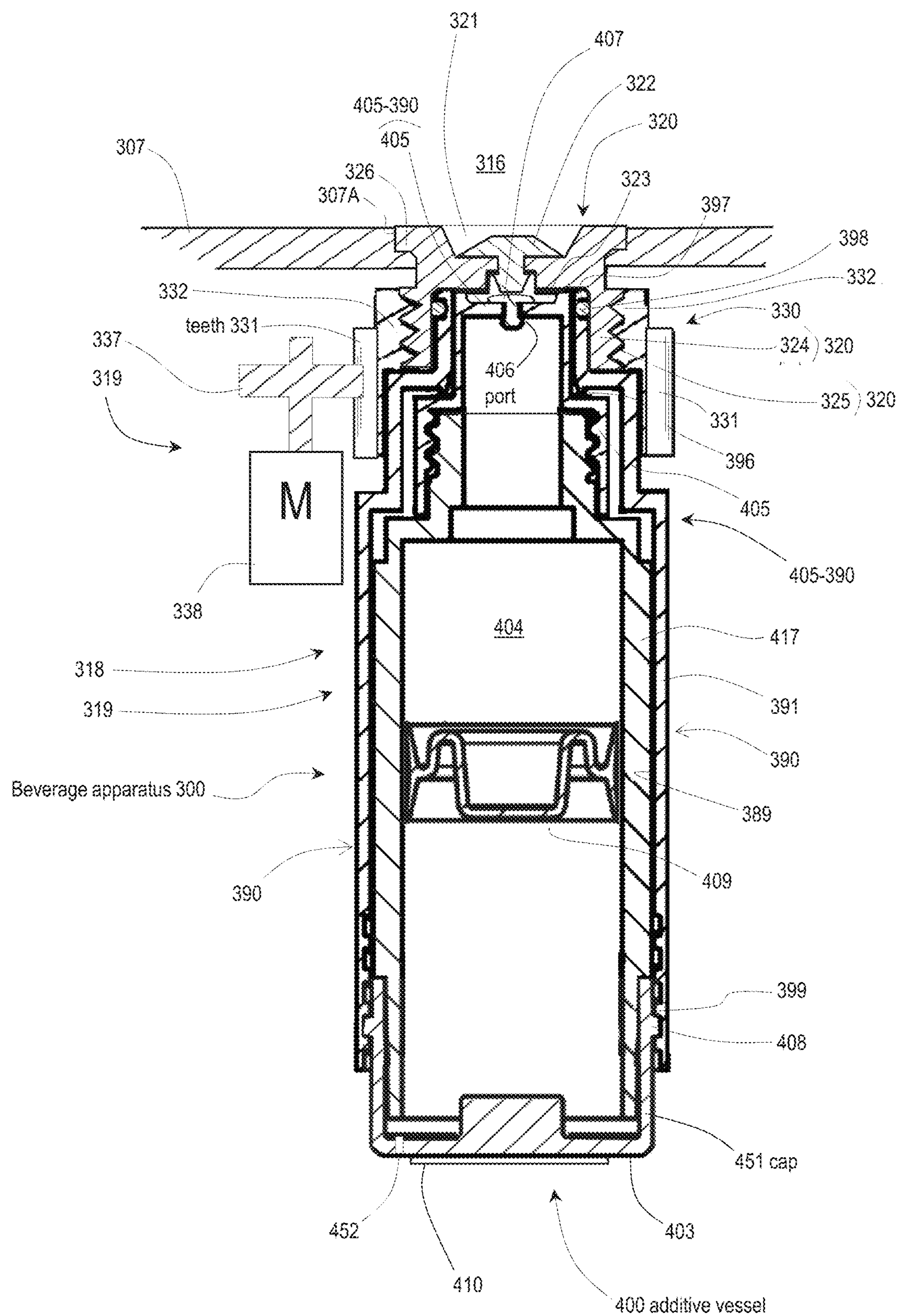
FIG. 20 is a cross-section schematic diagram showing a beverage apparatus, according to principles of the disclosure.
Figure 21:
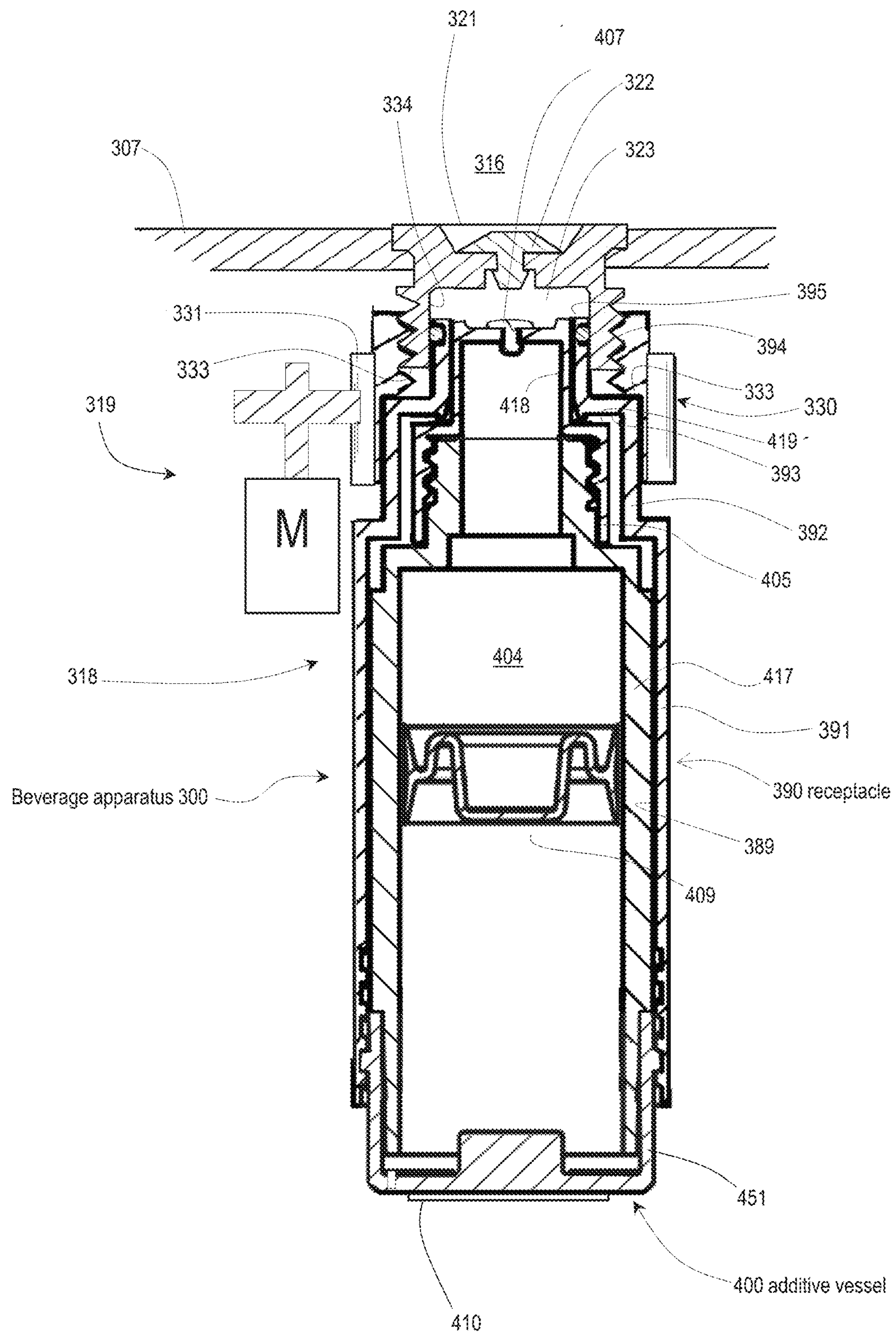
FIG. 21 is a cross-section schematic diagram showing a beverage apparatus the same as or similar to the beverage apparatus of FIG. 20, according to principles of the disclosure.

With reference to FIG. 20 and FIG. 21, the receptacle 390 can include a receptacle wall 391 that defines aperture 389. The receptacle wall 391 can include a first reduced neck portion 392. The receptacle wall 391 can also include a second reduced neck portion 394. An annular abutment shoulder 393, of the receptacle 390, can connect the reduced neck portions 392, 394. The receptacle 390 can include a top edge 395. The top edge 395 can constitute a part of the piston 405-390. With such arrangement, the piston 405-390 can be described as being "radially bisected". The receptacle 390 can include a seating engagement structure 396. The structure 396 can be in the form of an annular flange or shoulder that extends downwardly from the second reduced neck portion or portion 394, the annular abutment shoulder 393, and/or a junction of the elements 394, 393. The seating engagement structure 396 can engage with an annular abutment shoulder 419 of the vessel 400.

Relatedly, the vessel 400 can include a vessel body 417. The vessel 400 can include a neck 418. The neck 418 can be defined by the annular abutment shoulder 419. The neck 418 can be engaged with, i.e. slid into, the second reduced neck portion 394 of the receptacle 390. Such arrangement can provide securement of the vessel 400 within the receptacle 390.

As otherwise described herein, the receptacle 390/vessel 400 can reciprocate as a unit so as to provide a pumping arrangement or pumping mechanism. Relatedly, the second reduced neck portion 394 can be provided with an O-ring annular groove 397. An O-ring 398 can be disposed in the O-ring annular groove 397. The O-ring 398 can provide a seal between the receptacle 390 and a cylinder 324, i.e. while still providing or allowing reciprocating movement of the receptacle 390 within the cylinder 324. That is, the arrangement can provide a seal while still providing for pumping action.

As shown in FIG. 20, the vessel 400 can include a vessel cap or cap 451. As shown in FIG. 20, the vessel cap 451 can be provided with a hole 452. The hole 452 allows air to pass into the interior of the vessel 400 so as to allow advancement of a plunger 409, i.e. so as to not create an undesired vacuum within the interior of the vessel 400. The vessel cap 451 of the pod or vessel 400 can be a separate piece relative to the body 417 of the vessel 400. The vessel cap 451 can be integrally formed with body 417.

It is appreciated that the beverage apparatus 300 can accommodate multiple pods or vessels 400. Accordingly, the arrangement of FIG. 18 can also include vessel 400' with tag 410', i.e. a second tag 410' that is on the vessel 400', whereas a first tag 410 is on the first vessel 400. Beverage apparatus 300 can include functionality so as to engage with the second vessel 400' in similar or same manner as the beverage apparatus 300 engages with the vessel 400, i.e. the first vessel 400. A controller of the beverage apparatus can communicate with the second vessel 400' via antenna 342'.

As shown in FIG. 18, the beverage apparatus 300 can include a controller or apparatus controller 350. The apparatus controller 350 can control operations of the beverage apparatus 300. The apparatus controller 350 can include the apparatus computer processor (ACP) 360. The apparatus controller 350 can also include the apparatus database portion (ADP) 370. The apparatus controller 350 can be in the form of a physical machine or control unit that is physically attached to a suitable structural component of the beverage apparatus 300. For example, as shown in FIG. 18, the apparatus controller 350 can be attached to the upper support platform 307. The apparatus controller 350 can be in electronic communication with a reader, an RFID reader, RFID transceiver or transceiver, i.e. such as through wiring. The apparatus controller 350 can be in communication with an RFID transceiver 341, which can be or include an RFID reader. The RFID transceiver 341 can be in electronic communication with an antenna 342, i.e. such as through wiring. In some embodiments, such components can be integrated together. For example, the apparatus controller 350 can include the RFID reader 341 and the antenna 342. The antenna 342 can be disposed in the structure of the beverage apparatus 300 so as to be sufficiently proximate to the RFID tag 410, i.e. so as to effectively provide communications between the antenna 342 and the RFID tag 410 of the pod or vessel 400. For example, the antenna 342 can be integrated into or provided upon or affixed to the lower support platform 308 and/or the bottom support platform 309, as schematically illustrated in FIG. 18. The RFID transceiver 341 or reader 341 and the antenna 342 can collectively constitute an RFID transceiver assembly 340.

To accommodate a second vessel 400', the beverage apparatus 300 can also include a second antenna 342'. The second vessel 400' can be removably positioned in a further or second vessel receptacle 390', i.e. the receptacle 390 can be described as a first receptacle 390. Accordingly, it is appreciated that the beverage apparatus 300 can include one or more vessels 400, including vessel 401', that are received into the beverage apparatus 300. Each of such vessels 400 can include a tag or RFID tag 410. Each of the tags 410, affixed to a respective vessel 400, can be associated with a respective antenna 342 that are each in communication with the RFID reader or transceiver 341. In turn, the RFID transceiver 341 can be in communication with the apparatus controller 350. In some embodiments, the beverage apparatus 300 can include multiple readers. In such embodiment, each of such transceivers 341 can provide support, be connected and/or communicate with a respective antenna 342, 342' (for each tag/vessel 400, 400). In some embodiments, a single RFID transceiver 341 can provide support, be connected and/or communicate with a single antenna 342, and such single antenna 342 can communicate with one or the plurality of tags 410 (on respective vessels 400). The single RFID transceiver 341 can be rotatable, such as via a pivoting mechanism, so as to directed toward a particular pod/RFID tag of such pod.

Figure 19:
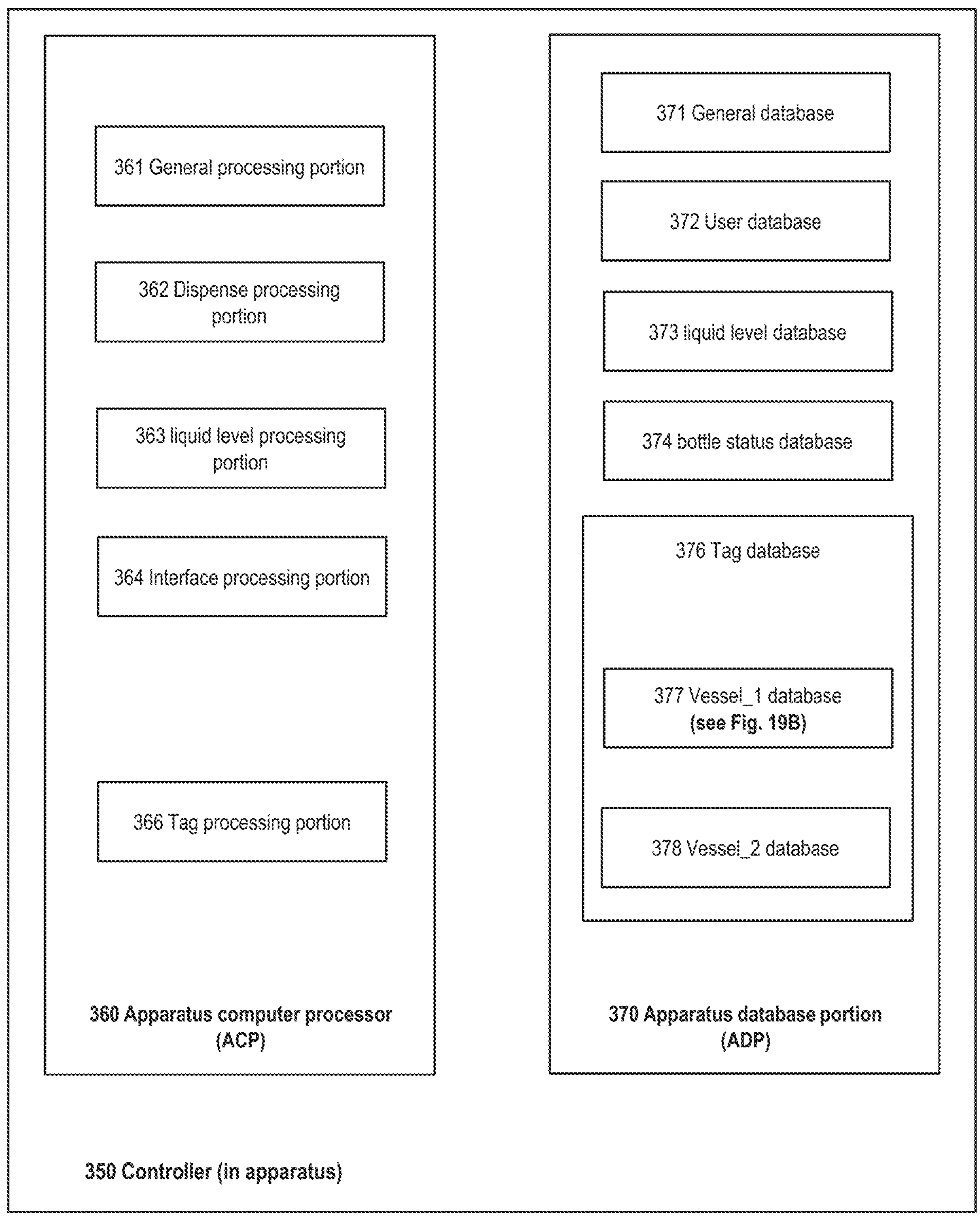
FIG. 19 is a block diagram showing in further detail the apparatus controller 350, including an apparatus computer processor (ACP) 360 and apparatus database portion (ADP) 370, according to principles of the disclosure.

FIG. 19 is a block diagram showing in further detail the apparatus controller 350, including the ACP 360 and apparatus database portion 370, that can be provided in the beverage apparatus 300, according to principles of the disclosure. The ACP 360 can include a general processing portion 361. The general processing portion 361 can handle a variety of processing performed by the beverage apparatus 300 that is not performed by other specialized processing portions as described herein. The general processing portion 361 can coordinate, orchestrate, and/or control more specialized processing that is performed by the specialized processing portions.

Various specialized processing portions can be provided in the ACP 360. The ACP 360 can include a dispense processing portion 362. The dispense processing portion 362 can perform a wide variety of operations associated with dispense of an additive from a vessel 400 that is disposed in the beverage apparatus 300. Such operations associated with dispense of an additive from a vessel 400 are described herein.

The ACP 360 can also include a liquid level processing portion 363. The liquid level processing portion 363 can perform a wide variety of operations associated with determining liquid level of the beverage apparatus. In general, it is appreciated that the various processing portions of the ACP 360 can perform with each other and/or complement each other so as to provide functionality of the beverage apparatus 300.

The ACP 360 can also include an interface processing portion 364. The interface processing portion 364 can perform various operations relating to interface functionality of the beverage apparatus 300. For example, the interface processing portion 364 can observe operations of the beverage apparatus 300 and output representative data to the user via the interface 310. In general, the interface processing portion 364 can input data from or via the display or interface 310, such as data generated from interface with a user, and control operations of the ACP 360 based on such input data. The interface processing portion 364 can observe operations of the beverage apparatus 300 and output data via the interface 310 so as to represent operations that are performed by the beverage apparatus 300. The interface processing portion 364 can provide similar functionality between the beverage apparatus 300 and a user via a user device 106. Accordingly, the interface processing portion 364 can output data to the device 106 so as to represent operations of the beverage apparatus 300. The interface processing portion 364 can input data from the user device 106 that results from interface with the user. Such input data, from the user device 106, can dictate or control operations of the beverage apparatus 300. As otherwise described herein, the ACP 360 and the controller 350 in general can be disposed fully within the beverage apparatus 300. Portions of the ACP 360/controller 350 can be disposed external to the beverage apparatus 300. That is, it is appreciated that some processing performed might be performed by a server 20, the user device 106 and/or other processing resource, for example, in communication with the ACP 360 and/or controller 350.

As shown in FIG. 19 and FIG. 18, the controller 350 can also include the apparatus database portion 370. The apparatus database portion 370 can include a general database 371. The general database 371 can store a wide variety of data that is used by or generated by the ACP 360. The apparatus database portion 370 can also include a user database 372. The user database 372 can include a wide variety of data regarding the particular user of the beverage apparatus 300 and data regarding other users that are associated with the beverage apparatus 300 in some manner. The user database 372 can include user preference information, user history information, use pattern information, use trend information, as well as other data regarding use of the beverage apparatus 300 by a user (or users). The user database 372 can include data regarding the user device 106 and communication particulars of the user device 106 such as communication credentials, for example.

As described herein, information and data have been utilized herein interchangeably, unless otherwise provided by the particular context.

The apparatus data portion 370 can also include a liquid level database 373. The liquid level database 373 can store various data utilized by or generated by the liquid level processing portion 363. Operations of the liquid level processing portion 363 are further described below.

As described above, FIG. 20 is a cross-section schematic diagram showing details of a beverage apparatus 300. The beverage apparatus 300 can include a dispensing assembly 318 that can include structure similar to the structure (of the dispensing assembly 213) described above with reference to FIGS. 6 and 7A-C, for example. The dispensing assembly 318 can be provided between the beverage chamber housing 315 and the base cover 317. In some embodiments of the disclosure, the dispensing assembly 318 can include the base cover 317. FIG. 21 is a cross-section schematic diagram showing details of a beverage apparatus or bottle 300 the same as or similar to the beverage apparatus of FIG. 20. In FIG. 21, the receptacle 390, with vessel 400 therein, has been lowered so as to be withdrawn from the outlet port 321. Accordingly, the volume of the pumping chamber 323 is increased.

In manner similar to that described above, the dispensing assembly 318 can include a dispense mechanism or pumping mechanism 319—to dispense additive from the additive vessel 400. The pumping mechanism 319 can include a pump housing 320, a toothed ring assembly or toothed ring 330, and a receptacle 390, in accordance with at least some embodiments of the disclosure.

The additive vessel 400 can include an internal volume or volume 404. FIG. 20 shows the receptacle or vessel 400 in what might be described as a "starting" position with no or little liquid in a pumping chamber or chamber 323. The vessel 400 can include the plunger 409. The plunger 409 as shown in FIG. 20 (in contrast to an initial position illustrated in FIG. 7A) is about half-way into the vessel 400, i.e. showing that about half of the additive has already been dispensed from the internal volume 404 (of the vessel 400) shown in FIG. 20. The arrangement, including the position of the plunger 409 shown in FIG. 20, could follow a dispense event, or in the example of FIG. 20, likely a series of dispense events.

As illustrated in FIG. 20, the receptacle 390 can include or define aperture 389. The vessel 400 can be threaded and positioned into the receptacle 390 such that piston head 405 of the vessel 400 is positioned in and/or forms a part of pumping chamber 323. The piston head 405 can provide, at least in part, a piston 405-390. Such "piston" 405-390, in accordance with at least one embodiment of the disclosure, can include the piston head 405 (of the vessel 400) and an upper end or top edge 395 of the receptacle 390. The receptacle 390 can support the vessel 400 via threads 399 (of the receptacle 390) engaging threads 408 (of vessel 400). As the receptacle 390 moves up and down (by operation as described herein), so does the vessel 400. Accordingly, the receptacle 390 movably supports the vessel 400. The "piston" 405-390 can slide back and forth (i.e. up and down as shown in FIG. 20) within the pumping chamber 323. The pumping chamber 323 can be formed in part by a cylinder 324 of pump housing 320. As described above, the piston head 405 (of the vessel) can include a one-way valve 407. The one-way valve 407 permits flow of liquid from the vessel 400 into the pumping chamber 323. At a top end of the chamber 323 (above the piston head 405) is the further or second one-way valve, i.e. the one-way valve 322 associated with the pump housing 320. The one-way valve 322 permits liquid additive to flow from the pumping chamber 323 into the chamber 316 as the piston 405-390 moves upward (from the position shown in FIG. 21 to the position shown in FIG. 20) in the cylinder 324.

The pump housing 320 can be supported within or on the upper support platform 307, as shown in FIG. 18. For example, the pump housing 320 can include or be a round or circular insert that includes an annular seating flange 326. Such annular seating flange 326, of the pump housing 320, can be adhesively bonded or heat bonded into a mating aperture 307A in the upper support platform 307. The annular seating flange 326 can be frictionally fit into the mating aperture 307A such that the pump housing 320 might be "switched out" if desired, i.e. switched with a replacement housing 320.

As shown in FIG. 20 and FIG. 21, the piston 405-390 and vessel 400 can be drawn down—while the one-way valve 322 (at the outlet port 321) blocks fluid flow from coming into the pumping chamber 323 from the chamber 316. As a result, a vacuum is created that draws fluid from the additive vessel 400 through the one-way valve 407 into the pumping chamber 323. Accordingly, such manipulation provides for additive to be passed into the pumping chamber 323—and such additive "queued" to be dispensed into the beverage chamber 316. Such arrangement of the beverage apparatus 300 is similar to the arrangement shown in FIG. 7B.

Then, the piston 405-390 can be driven back to its starting position (FIG. 20) so as to compress or force the fluid, in the chamber 323, through the one-way valve 322 at the outlet port 321 and into the beverage chamber 316. The one-way valve 407 (of the vessel 400) blocks the flow of fluid/additive from returning into the vessel 400. Positive pressure, accordingly, is produced in what can be described as a "compression stroke". Such compression stroke results in dispensing the contents of the pump chamber or pumping chamber through the outlet port 321 into the beverage chamber 316. Such process can be described as a "single piston stroke."

The volume dispensed from the pumping chamber 323 during such a single piston stroke can be modulated linearly by modifying the piston stroke length, i.e. how much the piston moves up and down in the arrangement of FIG. 20 and FIG. 21. Multiple piston strokes can be used to dispense larger quantities. By design, the volume of the pumping chamber 323 can be configured to be as small as practically possible when the piston 405-390 is in the starting position, as shown in FIG. 20, to avoid wasting additive liquid when a depleted additive vessel 400 is withdrawn from the receptacle.

FIG. 20 also shows a dispense mechanism or pumping mechanism 319 for actuating the receptacle 390 with associated piston 405-390 of the pumping mechanism 319. As illustrated, the receptacle 390 and its associated piston 405-390 can be moved down and up by operation of the toothed ring assembly 330. Such arrangement is the same or similar to arrangements described above.

That is, the dispense mechanism 319 can include a pump housing 320. The pump housing 320 can include a cylinder 324 and a threaded extension 325. The toothed ring assembly 330 can include a set of internal threads 332. The internal threads 332 can engage with the threaded extension 325 of the pump housing 320. The threaded extension 325 can be in the form of threads on an outer diameter of the cylinder 324 of the pump housing 320, in accordance with at least some embodiments of the disclosure. The toothed ring assembly can include an annular abutment shoulder 333. The annular abutment shoulder 333 can engage with the receptacle 390 as the receptacle 390 is moved upward as shown in FIG. 21 so as to limit upward movement, in an embodiment.

The toothed ring assembly 330 can include teeth 331 on an outer diameter (OD) of the toothed ring assembly 330. As shown in FIG. 20, the teeth 331 can be vertically oriented or aligned. Each toothed ring assembly 330, can be driven by a gear 337 (shown in cross section in FIG. 20). That is, the teeth 331 can be driven by the gear 337. The gear 337 can be driven by a motor 338. Other gears and/or a gearbox can be interposed between the gear 337 and the motor 338 (and/or between the gear 337 and the toothed ring assembly 330) so as to provide a desired gear ratio. The position of the vessel 400 shown in FIG. 20 can be described as a starting position. By operation of the dispense mechanism or pumping mechanism 319, the vessel 400 can be displaced downward, as shown in FIG. 21, into a withdrawn position.

The motor 338 and gear 337 can rotate the toothed ring assembly 330. As the toothed ring assembly 330 rotates, the internal threads 332 cause the toothed ring assembly 330 to rise and fall on the threaded extension 325 of the pump housing 320. The receptacle 390, which can be snapped into or adhered to or integral with the toothed ring assembly 330, also therefore rises and falls with the toothed ring assembly 330, causing the piston 405-390 to move within the cylinder 324. More specifically, the piston 405-390 can move within an inner diameter surface (i.e. a receptacle engagement sleeve portion) 334 of the cylinder 324. In accordance with one embodiment, the threads 332 on the toothed ring assembly 330 and the threaded extension 325 can be a "fast" 4-start thread that cause the toothed ring assembly 330 to travel to full linear extension with 180 degrees of rotation. The threads can be configured to have an ACME profile or similar profile.

In accordance with at least some embodiments of the disclosure, the receptacle 390 can be frictionally secured within the toothed ring assembly 330. Accordingly, as the toothed ring assembly 330 reciprocates, as a result of being driven by the teeth 331, the receptacle 390 reciprocates with the toothed ring assembly 330. The vessel 400 can be threaded onto or into the receptacle 390. Accordingly the vessel 400 can reciprocate with the receptacle 390. In accordance with at least some embodiments of the disclosure, the toothed ring assembly 330, the receptacle 390, and the vessel 400 can reciprocate as a unit, i.e. reciprocate so as to move or oscillate between the start position and a withdrawn position as a unit. In at least some embodiments, the receptacle 390, or structure connected thereto, can be asymmetrical in shape. Such asymmetry in shape can be provided so as to preclude rotation of the receptacle or pod as the pod is being reciprocated, such as between the positions shown in FIG. 20 and FIG. 21. For example, the receptacle can be provided with ridges or fins that run along the length of the receptacle—and that engage with matching grooves or slots in a structure of the beverage apparatus that is static, i.e. that does not reciprocate. Accordingly, the reciprocation between the positions of FIG. 20 and FIG. 21 can be provided for, while preventing rotation of the vessel or pod. In other embodiments, the pod 400 and receptacle 390 may be allowed to rotate in conjunction with reciprocation of the pod.

In manner similar to that described above, as shown in FIG. 20, the vessel 400 can be provided with threads 408. The receptacle 390 can be provided with threads 399. The threads 408 can be provided on any portion or outer surface of the vessel so as to secure the vessel 400 into the receptacle 390—so long as such threads 408 are provided to match or mate with threads on the receptacle 390. The threads 399 can be provided on any portion or inner surface of the receptacle 390 so as to secure the vessel 400 into the receptacle 390—so long as such threads 399 (of the receptacle) are provided to match with threads on the vessel 400.

The vessel 400 can be attached to the receptacle 390 in other manners as compared to the particulars shown in FIG. 20. For example, the vessel 400 can include threads around the top of the vessel 400, such as on neck 418, that engage with threads on an inner diameter of the second reduced neck portion 394 of the receptacle 390. For example, the vessel 400 can include threads around the top of the vessel 400 that engage with threads on an inner diameter of the first reduced neck portion 392 of the receptacle 390. Other thread arrangements can be provided. Hereinafter, various features relating to level sensing will be described according to principles of the disclosure. As described above, a beverage apparatus can contain a consumable liquid that contains an additive. The consumable liquid can be contained in a chamber of the beverage apparatus. A controller of the beverage apparatus can control dispensing of the additive, by a dispensing assembly, so as to maintain a targeted concentration of the additive in the consumable liquid and/or so as to attain a desired concentration of the additive in the consumable liquid. The controller can utilize a variety of data in the dispensing of the additive. Such data can be input from a variety of sources. One type of data that may be input and utilized by the controller can include data that relates to a level or liquid level of the consumable liquid in the beverage apparatus or bottle.

For example, a fluid sensor or fluid level sensor may be in the form of an ultrasonic device or ultrasonic sensor. The fluid level sensor can emit a sound wave. A portion of the sound wave can be returned as a result of encountering a top surface of the consumable liquid in the chamber. Accordingly, the fluid level sensor can use “round trip time” for the reflected sound wave or waves to measure the height of a fluid or water column within the chamber. Based on the height of the fluid column within the chamber, the controller can be provided with known data so as to determine, i.e. calculate based on diameter or shape for example, the fill volume of the chamber. According to principles of the disclosure, a function or lookup table can be used to match or “map” the observed height of the liquid in the beverage apparatus, i.e. the bottle, to the particular volume that corresponds to such liquid height. As described below, various arrangements and processes can be used to sense level of liquid in a beverage apparatus/bottle of the disclosure.

Hereinafter, various features relating to level sensing, i.e. liquid level sensing, will be further described. The liquid level sensing described herein can be performed in the environment of any of the beverage apparatuses as described herein, as may be desired. For example, liquid level sensing can be performed in the environment of the beverage apparatus 300 shown, for example, in FIGS. 20 and 21. For purposes of illustration of level sensing, FIG. 22 is a schematic diagram of a beverage apparatus 300 the same as or similar to the beverage apparatus 300 of FIGS. 20 and 21.

Figure 22:
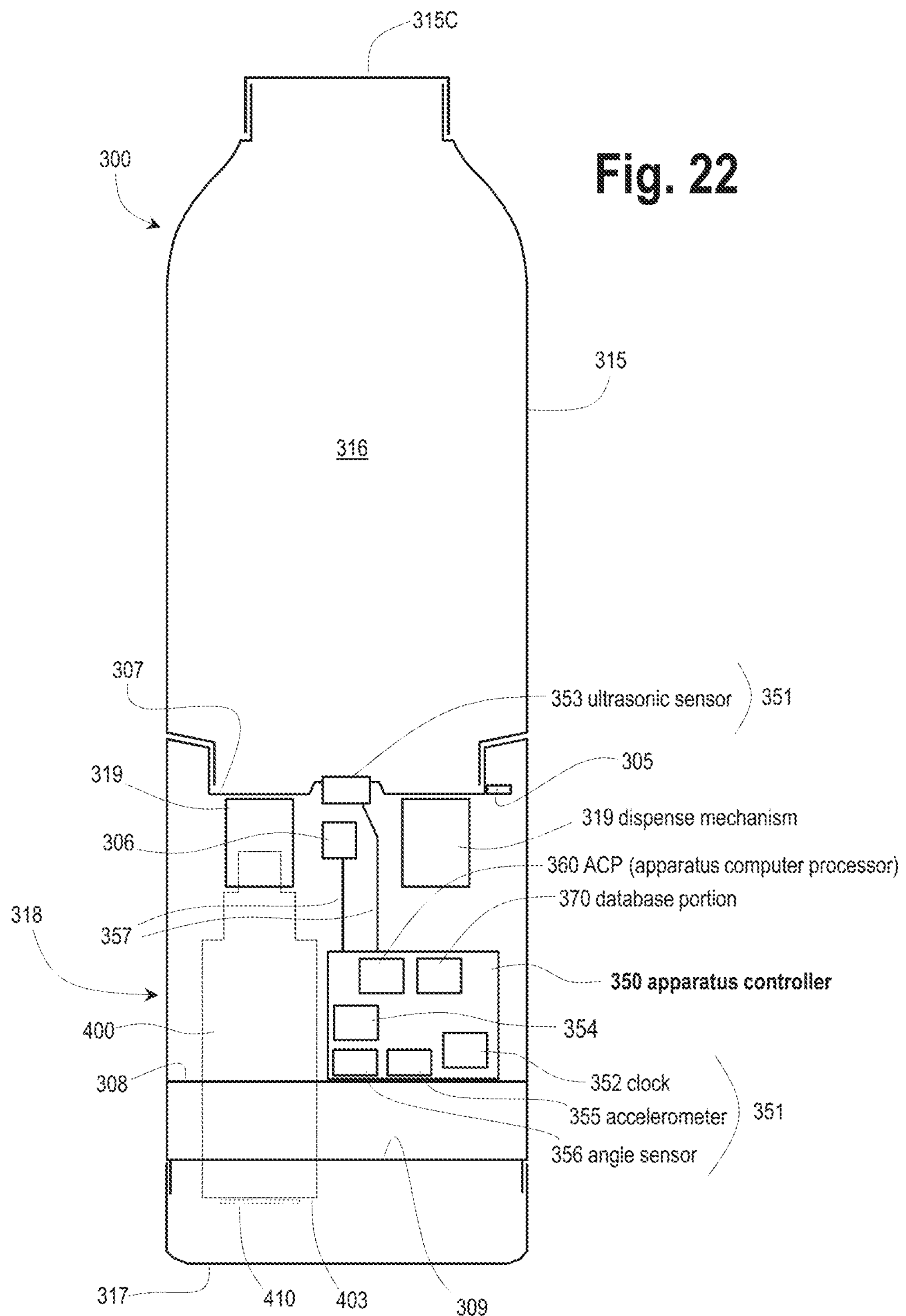
FIG. 22 is a schematic diagram of a beverage apparatus the same as the beverage apparatus or similar to the beverage apparatus of FIG. 21, according to principles of the disclosure.

As shown in FIG. 22, the beverage apparatus 300 can include a beverage chamber housing 315. The beverage chamber housing 315 can include an internal volume or chamber 316. A consumable liquid with additive can be contained in the chamber 316. The beverage apparatus 300 can include a removable cap 315C. A user can remove the removable cap 315C so as to fill the beverage apparatus 300 with liquid. The beverage apparatus 300 can also include a base cover or base cap 317. The base cover 317 can be removed by a user so as to switch out or insert a vessel or pod 400 into the dispense mechanism 319. In accordance with at least some embodiments, a dispensing assembly 318 can be described as including the dispense mechanism 319 and the vessel 400. As shown in FIG. 22, the vessel 400 can include a lower or bottom surface 403. A tag, RFID tag, or electronic tag 410 can be mounted on the bottom surface 403. The vessel 400 can be of same or similar structure, and can be manipulated in similar manner, to that described above with reference to FIGS. 20 and 21, for example.

The beverage apparatus 300 as shown in FIG. 22 can also include various structural features including those described above. The beverage apparatus 300 can include an upper support platform 307, a lower support platform 308, and a bottom support platform 309. The support platforms 307, 308, 309, as described herein, can serve to provide structural integrity to the beverage apparatus 300 and to support various components of the beverage apparatus. As described herein, the upper support platform 307 can support, at least in part, the dispense mechanism 319. As shown in FIG. 22, the lower support platform 308 can serve to support an apparatus controller 350. However, it should be appreciated that the controller 350 can also be supported by the upper support platform 307 or by some other support structure within the beverage apparatus.

The controller 350 can include the apparatus computer processor (ACP) 360 of FIG. 19. The controller 350 can include an apparatus database portion (ADP) 370. The ACP 360 and the ADP 370 can include various features as described herein. The ADP 370 can control the various operations of the beverage apparatus 300. The ADP 370 can store data that is utilized by the ACP 360 and/or data that is generated by the ACP 360. Accordingly, the ADP 370 can store various instructions that are utilized by the ACP 360 in performing the various operations described herein. With regard to level sensing, the apparatus controller 350 can also contain and/or be in communication with various sensors, mechanisms, devices, gadgets, systems, and/or apparatus, which can collectively be described as “elements” 351. One element 351 can be an ultrasonic sensor 353, i.e. an ultrasonic device 353, as shown in FIG. 22. The ultrasonic sensor 353 can be connected to the controller 350 utilizing a suitable communication pathway 357. The ultrasonic device or ultrasonic sensor can be provided with its own computer processing portion or processor. The communication pathway 357 can be in the form of a wire, cable, wireless link, embedded wire that is embedded in structure of the beverage apparatus 300, embedded cable, laminated cable, laminated wire, laminated conductive pathway, or other communication pathway. The communication pathway(s) 357 can be provided between any of the elements described herein and/or the controller 350 and can provide communications so as to provide control of a particular element and/or can provide power to a particular element. The beverage apparatus or bottle can include one or more power sources, such as one or more batteries 354, that can power the various components of the beverage apparatus.

The beverage apparatus 300 can also include other elements 351. The other elements 351 can include a clock 352. The clock 352 can perform various operations associated with the passage of time. The clock 352 can, in a routine manner, track time including days, hours, minutes, seconds, milliseconds, etc. The clock 352 can also perform various related functions including stopwatch operations, determining a duration of time, determining when a particular time has been attained, determining a differential between two observed times, and other operations. In at least some embodiments of the disclosure, the controller 350 can also perform such operations. That is, in some embodiments, the clock 352 can be limited to simply outputting time values to the controller 350—and the controller 350 performing various operations based on such output time values. For example, a time value that is output by the clock 352 might be 09102019day101521 hour to denote Sep. 10, 2019 at 10:15:21 AM. It should be appreciated that the content, nature, and format of such data can be varied as desired. The clock 352 can be in the controller 350 and/or be a part of the controller 352. As shown in FIG. 22, the controller 350 can also include one or more batteries or other power source 354. For example, the battery 354 can be a rechargeable battery that can be recharged by attaching the battery 354 to an external power source. The battery 354 can power the various components of the beverage apparatus.

The elements 351 can include an accelerometer 355. The accelerometer 355 can monitor acceleration of the beverage apparatus 300 in the x-y-z space and output representative data to the controller 350. The elements 351 can also include an angle sensor 356. The angle sensor 356 can monitor an angle at which the beverage apparatus 300 is positioned. Each of the elements 351 can perform processing of data that is then output to the controller 350 and/or the elements 351 can output unprocessed or raw data to the controller 350. In the latter case, the controller 350 can process such raw data so as to generate requisite information. For example, the angle sensor 356 can, itself, perform processing to output an angle such as 51°. On the other hand, the angle sensor 356 can output raw data and the controller 350 determine the angle based on the raw data. According to at least one embodiment of the disclosure, the accelerometer can sense or determine angle of the beverage apparatus 300. In accordance with at least some embodiments, the angle sensor 356 can be or include the accelerometer 355. The accelerometer 355 can be or include an angle sensor 356.

Additionally, the elements 351 provided in the beverage apparatus 300 can include one or more temperature sensors. The temperature sensors can include a liquid temperature sensor 305 and an apparatus temperature sensor 306. The liquid temperature sensor 305 can be provided in or adjacent to the chamber 316 so as to be exposed to the consumable liquid in the beverage apparatus 300. Accordingly, a temperature of the consumable liquid in the beverage apparatus 300 can be determined by the liquid temperature sensor 305. The apparatus temperature sensor 306 can be provided within structure of the beverage apparatus 300 so as to measure an operating temperature of the beverage apparatus. The apparatus temperature sensor 306 can be provided on or exposed to an exterior wall of the beverage apparatus 300 so as to input an ambient temperature in which the beverage apparatus 300 is disposed.

Multiple temperature sensors can be utilized so as to input both internal operating temperature of the beverage apparatus as well as ambient temperature of the beverage apparatus. Such various temperature sensing can be utilized in operation of the beverage apparatus as described herein.

Hereinafter, further features of disclosure will be described with reference to FIG. 18. As shown in FIG. 18, the beverage apparatus 300 can include a vessel, pod, or additive vessel 400. The vessel 400 can include a tag 410. The tag 410 can be an RFID tag. The tag 410 can be in communication with the transceiver 341 (of the beverage apparatus) via an antenna 342. The beverage apparatus 300 can include one or more vessels 400. The vessels 400 can include a second vessel 400'. The second vessel 400' can include a second tag or second RFID tag 410' The beverage apparatus 300 can also include one or more antennas 342. The antennas 342 can include a second antenna 342'. The second antenna 342' can provide communication between the second tag 410' (of the second pod) and the transceiver 341.

The second vessel 400' can be removably positioned in a second vessel receptacle 390'. Accordingly, it is appreciated that the beverage apparatus 300 can include one or more vessels 400, including vessel 401', that are received into the beverage apparatus 300. Each of such vessels 400 can include a tag or RFID tag 410. Each of the tags 410, 410' affixed to a respective vessel 400, can be associated with a respective antenna 342, 342' that are each in communication with the RFID reader or transceiver 341. In turn, the reader or transceiver 341 can be in communication with the apparatus controller 350. In some embodiments, the beverage apparatus 300 can include multiple transceivers 341. In such embodiment, each of such transceivers 341 can provide support, be connected and/or communicate with a respective antenna 342, 342' (for each tag/vessel 400). In some embodiments, a single transceiver 341 can provide support, be connected and/or communicate with a single antenna 342, and such single antenna 342 can communicate with the plurality of tags 410 (on respective vessels 400).

Figure 23:
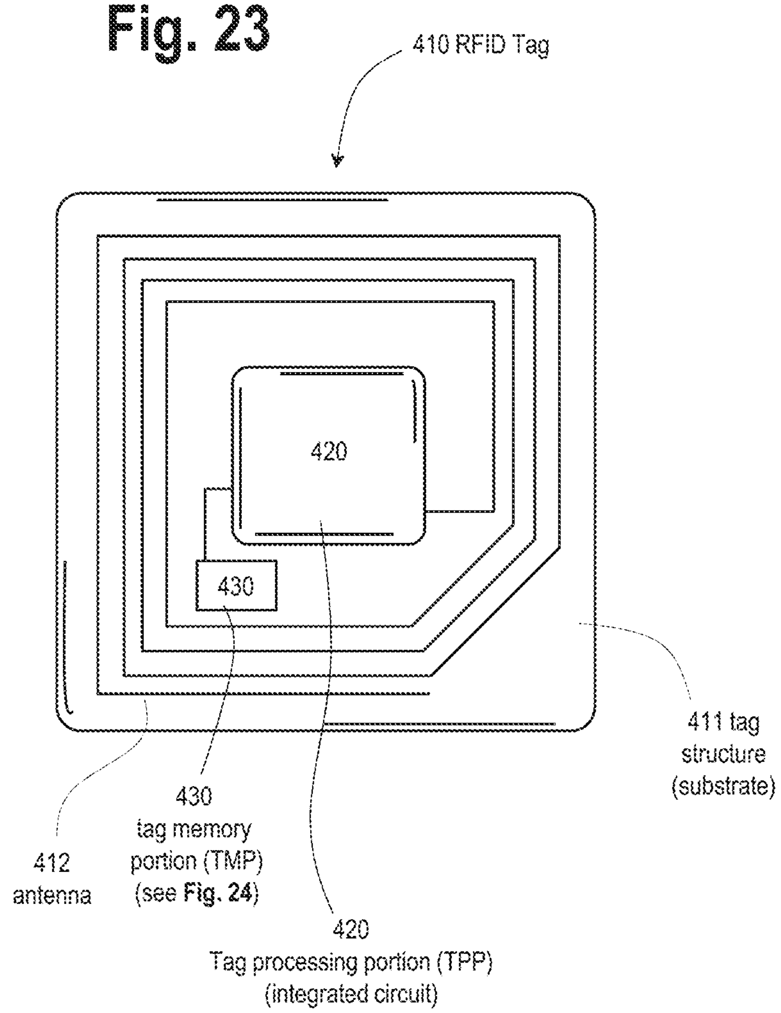
FIG. 23 is a schematic diagram showing an RFID tag or tag 410 in accord with the principles of the disclosure.

As shown in FIG. 18 and described above, the beverage apparatus 300 can include vessel 400 with RFID tag or tag 410. Relatedly, FIG. 23 is a schematic diagram showing an RFID tag 410 in accord with the principles of the disclosure. As shown, the RFID tag 410 can include a tag processing portion (TPP) 420 and a tag memory portion (TMP) 430. The tag processing portion 420 can be in the form of or include an integrated circuit and/or other processing component. The TMP 430 can be in the form of or include a computer readable medium. The tag 410 can also include a suitable substrate or tag structure 411. For example, the tag structure 411 can be a plastic plate, filament, sheet, or other structure that can be provided to support the various components of the RFID tag 410. The tag 410 can include an antenna 412. The tag 410 can be an RFID tag. In some embodiments, components of the electronic tag 410 can be integrated into the vessel 400 or pod 400. In such arrangement, structure of the vessel or pod 400 would provide or constitute the tag structure or substrate 411. Additionally, it is appreciated that components of the tag 410 can be distributed on different parts or portions of the vessel 400. For example, the antenna 412, of the tag 410, might be provided on a bottom or lower surface of the vessel 400. A memory portion 430, i.e. TMP 430, of the tag 410 might be provided on a first side of the vessel 400, and the tag processing portion 420 might be provided on an opposing second side of the vessel 400. For example, the tag processing portion 420 and/or TMP 430 can be provided proximate to or at a halfway point between the top of the vessel 400 and the bottom of the vessel 400 as shown in FIG. 17. Such components might be switched out, exchanged in position, and changed in position as may be desired.

Accordingly, the principles of the disclosure are not limited to the particular arrangement as shown in FIG. 23 or FIG. 18. The antenna 412 is illustratively shown in a spiral configuration running outwardly from the tag processing portion 420 to an outer periphery of the tag structure 411. However, various other antenna structure can be utilized as dependent on various factors, such as the particular arrangement of the respective antenna 342 (of the beverage apparatus 300) that interfaces with the tag antenna 412.

As described above, FIG. 19 is a block diagram showing in further detail the apparatus controller 350, including the ACP 360 (apparatus computer processor 360) and apparatus database portion 370, that can be provided in the beverage apparatus 300, according to principles of the disclosure. In addition to the components described above, the ACP 360 can also include an RFID processing portion 366 or a tag processing portion 366. The tag processing portion 366 can perform a wide variety of operations associated with outputting data to the tag 410, inputting data from the tag 410, processing based on data from the tag 410, and various related processing. The tag processing portion 366 can perform operations and provide functionality in conjunction with the operation of the dispense processing portion 362. In general, it is appreciated that the various processing portions of the ACP 360 can perform with each other and/or complement each other so as to provide functionality of the beverage apparatus 300 as described herein.

As shown in FIG. 19, the controller 350 can include an apparatus database portion 370, as described above. The apparatus data portion 370 can also include a tag database 376 or RFID database 376. The tag database 376 can contain data used by or generated by the tag processing portion 366. The tag database 376 can store various data utilized by or generated by the beverage apparatus 300. For example, the tag database 376 can store data regarding communication protocols, security data, encryption data, and other data relating to communication between one or more vessels 400 and the controller 350.

The tag database 376 can also include a vessel_1 database 377—to support and hold data regarding a first pod or first vessel 400 that is disposed in the beverage apparatus. The vessel_1 database 377 can store various information related to the first vessel that has been inserted into the beverage apparatus 300, i.e., so as to dispense additives contained therein into the internal volume or chamber 316. For example, the vessel_1 database 377 can contain data regarding the vessel 400 described herein. The tag database 376 can also include a vessel_2 database 378. The vessel_2 database 378 can contain data regarding a further vessel 400' that has been placed into the beverage apparatus 300. Illustratively, such further vessel is illustrated in FIG. 18 as the vessel 400'. Other databases and/or memory sections can be provided in an arrangement in which the beverage apparatus 300 is structured to retain more than the two vessels 400, 400'.

Figure 19B:
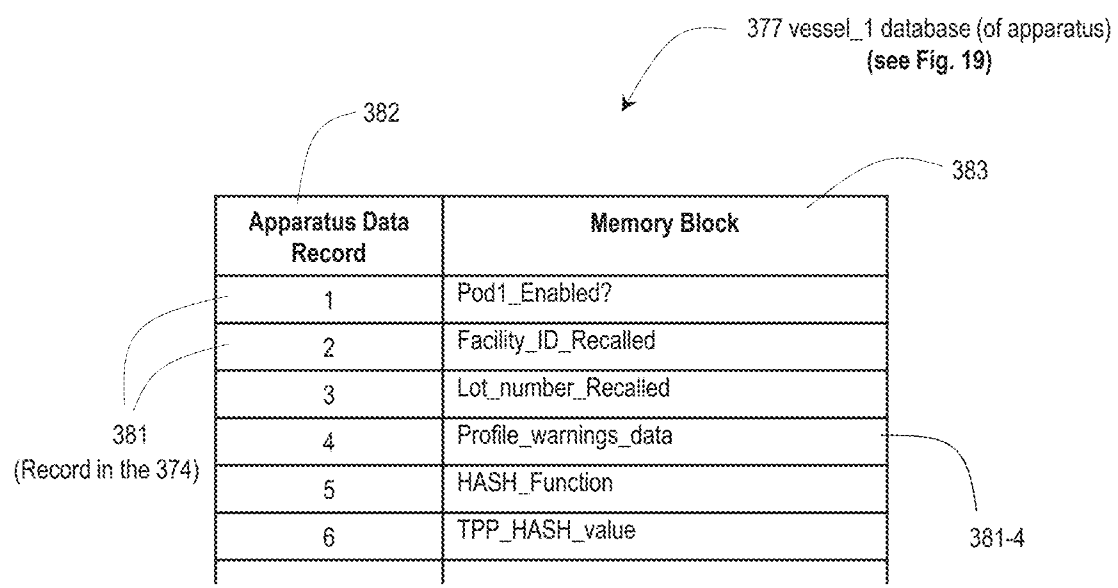
FIG. 19B is a diagram showing further details of a vessel database 374 shown in FIG. 19, according to principles of the disclosure.

FIG. 19B is a diagram showing further details of the vessel_1 database 377 shown in FIG. 19, according to principles of the disclosure. It should be appreciated that the vessel_1 database 377 can be part of and/or integrated into a larger database, such as the apparatus database portion 370, using a relational database architecture or other arrangement. As shown, the vessel_1 database 377 (in the tag database 376) can include a plurality of tag data records 381. The tag data records 381 can be associated with other data in the apparatus database portion 370 utilizing any suitable architecture, such as relational database architecture. Each of the tag data records 381 can include a record identifier field 382 and a content field 383. For purposes of illustration, the record identifier field 382 contains simple numerical indicia. However, it should be appreciated that the record identifier field 382 can include more complex numerical and/or alphanumerical indicia so as to be associated with other data in the apparatus database portion 370 and so as to assist in reading and writing data from the vessel_1 database 377. The various data illustrated in FIG. 19B, provided in the vessel_1 database 377, will be described in further detail in the processing described below.

FIG. 24 is a diagram showing further details of the tag memory portion (TMP) 430 described above. The TMP 430 can be provided on or in the vessel 400. The TMP 430 can include a plurality of tag data records 431. The tag data records or data records of an RFID tag (or other electronic tag) that is mounted on or in a pod/vessel can be described as functional data records—since such data records can provide a variety of functionality as described herein. The tag data records 431 can each include a record identifier field 432 and a content field 433. For purposes of illustration, the record identifier field 432 contains simple numerical indicia. However, it should be appreciated that the record identifier field 432 can include more complex numerical and/or alphanumerical indicia so as to be associated with other data in the tag data record 431 and so as to assist in reading and writing data from the tag memory portion 430. Various data is illustratively shown in the TMP 430. Such data in the TMP 430 can relate to various attributes of the particular vessel 400 to which the tag 410 is attached. Such data in the TMP 430 can include manufacturer information of the particular vessel, additive information, historical information, use information, content information, and security information, as well as various other information as shown, for example. In particular, the TMP 430 can include data regarding the state of the vessel 400. Further details regarding the data stored in the TMP 430 are described below in the context of processing of the beverage apparatus 300, according to principles of the disclosure.

The beverage apparatus 300 can perform a wide variety of processing so as to provide a beverage, with desired additives and of desired composition, to the user. As described above, such processing can include the control of dispensing from one or more vessels 400 into a liquid in the internal volume or chamber 316 of the beverage apparatus 300. Relatedly, the beverage apparatus 300 can perform various processing relating to the data stored in the beverage apparatus 300 and data stored in the vessel 400. Such processing can include the reading and writing of data from and to the tag 410 of the vessel 400.

FIG. 25 is a high-level flowchart showing details of "data record (DR) processing" step 500 that is performed by the beverage apparatus 300 and/or the vessel 400, according to principles of the disclosure. In particular, such processing can include processing performed by apparatus controller 350 that includes the ACP 360.

As illustratively shown in FIG. 25, the processing can begin in step 500 and pass to step 501 and/or step 511. In step 501, the apparatus controller 350 (AC) performs processing to determine if a new vessel has been inserted into the beverage apparatus 300. For example, such processing can include a button or other mechanism that might be released when a vessel 400 is removed from the pod aperture 389 and that is again depressed when a new vessel 400 is inserted into the vessel aperture 321. Other techniques can be utilized to determine if a new vessel 400 has been inserted into (or removed from) the beverage apparatus 300. For example, the apparatus controller 350 may electronically detect a new electronic signature or other characteristic or attribute of a different tag 410 that has been inserted (on the different vessel 400). For example, an antenna on either an RFID tag (on a pod) or an antenna integrated with the receptacle can sense or detect a disruption in an observed electronic field. The disruption may be a variance in observed inductance, for example. An antenna on the bottle may identify a disruption in observed inductance as a result of the RFID tag and/or the RFID antenna (of a pod) being disposed in the receptacle. As shown in FIG. 25, once the apparatus controller 350 detects that a new vessel 400 has been inserted, i.e. yes in step 501, the process passes to step 502. In step 502, various processes can be called upon or invoked by the apparatus controller 350. The processes of step 502 can include processes to identify various attributes of the vessel 400 that has been inserted, for example. Step 502 can be characterized as "additive vessel interface processing" or "pod interface processing".

In accordance with embodiments of the disclosure, various other mechanisms or techniques can be used to identify or determine if a pod (be it a new pod or a previously used pod) has been inserted into the beverage apparatus 300.

For example, a photo sensor or light sensor can be used to detect the presence of a pod in the beverage apparatus 300. The light sensor can detect a change in observed light as a result of a pod being removed from the beverage apparatus or as a result of a pod being inserted into the beverage apparatus. The light sensor can detect the differential in light caused by such change in pod disposition—and communicate such disposition to the apparatus controller 350. For example, a receptacle 390 can be provided with the light sensor on one side of the receptacle and a light source on an opposing side of the receptacle. Insertion of a pod into the receptacle can result in variance in intensity of light received by the light sensor from the light source, i.e. as a result of the presence of the pod between the light source and the light sensor. Based on this observation that is communicated to the apparatus controller 350—the apparatus controller 350 can assume that such variance is attributable to a pod being inserted into the particular receptacle. Processing can then be performed based on such observation.

The controller and associated transceiver, of a beverage apparatus, may communicate with or interrogate an electronic tag of a pod, such as an RFID tag of a pod, in a periodicity or manner as desired. The controller/transceiver may interrogate a pod on an ongoing basis, such as every one second, every two seconds or at some other periodicity or pattern, e.g., as may be desired. The controller/transceiver may interrogate a pod only upon a predetermined event(s) being observed—such as the insertion of a pod, a dispense event, a fill event, or some other event. Further, interrogation can include a combination of interrogating based on a certain periodicity/pattern and interrogating based on observing a particular event. Interrogation might be performed in a certain periodicity after a particular event is observed.

Further, a beverage apparatus of the disclosure can include one or more sensors to detect relative position of components of the beverage apparatus. For example, a Hall effect sensor in conjunction with one or more magnets can be used to detect whether or not the base cover 317 (see FIG. 22) is on the dispensing assembly 318. That is, a magnet may be provided in the base cover 317 and a Hall effect sensor provided in the dispensing assembly 318, so as to sense proximity of the base cover 317. In an embodiment, a pod might be provided with a magnet and a sensor (e.g. a Hall effect sensor) detect presence or non-presence of the magnet in the pod. A Hall effect sensor can be used in such arrangements. The Hall effect sensor can include a device that can measure a magnetic field. That is, an output or observed voltage or current of the Hall effect sensor can be proportional to a magnetic field or magnetic field strength passing through the Hall effect sensor. A magnet proximate to the Hall effect sensor can vary the magnetic field or magnetic field strength, which is observed by the Hall effect sensor. Thus, the Hall effect sensor can detect the presence of the magnet. Such arrangement can be utilized to determine proximity or connection of any of the components of the beverage apparatus as described herein, as may be desired. A Hall effect sensor 890 is illustratively shown in FIG. 38. Such Hall effect sensor can interact with a magnet on or in base cover 317, for example. For example, a user might be required to open a door to insert a pod into the beverage apparatus, and such door can be provided with a magnet. Such magnet can interact with a Hall effect sensor on an adjacent portion of the beverage apparatus. The Hall effect sensor can be positioned so as to vary in distance from the magnet depending on whether the door is opened or closed. Thus, the Hall effect sensor/controller can detect whether the door has been opened/closed, which is indicative of a new pod being inserted via the door. The processing illustrated in step 502, is not limited to the particular situation in which a vessel 400 has been inserted into the beverage apparatus 300. Rather, other scenarios can result in the apparatus controller 350 invoking the processing of step 502. For example, such other scenarios can include the beverage apparatus 300 being disconnected from power, a sudden acceleration or deceleration, as detected by an accelerometer, such as from a drop of the beverage apparatus 300, a malfunction of the tag 410 and/or upon the depletion or complete depletion of additive in the vessel 400. As shown in FIG. 25, the apparatus controller 350 can perform RFID based warnings processing, as illustrated by step 503. The apparatus controller 350 can perform expiry processing as illustrated by step 504. The apparatus controller 350 can perform product information processing as illustrated by step 505. The apparatus controller 350 can perform product color processing as illustrated by step 506. The apparatus controller 350 can perform product recall processing as illustrated by step 507.

In accord with embodiments of the disclosure, the various processing described in step 502 can be performed in a different order as compared to that illustrated in FIG. 25. The various processing described in step 502 can be performed in a parallel manner to each other. The various processing described in step 502 can be performed in a serial manner, in an order as desired. Each of such respective processes illustrated in step 502, can be performed by respective subroutines as described in detail below. In some embodiments, settings of the beverage apparatus 300 (i.e. the apparatus controller 350) can be configured to perform all of the processes of step 502 upon a vessel 400 being inserted into the beverage apparatus 300. On the other hand, settings of the beverage apparatus 300 can be configured so as to only perform some of the processes of step 502 upon a vessel 400 being inserted into the beverage apparatus 300.

Relatedly, FIG. 25 shows step 511. In step 511, the ACP 360 performs processing so as to determine if a dispense has been requested by the user. For example, step 511 can monitor for input from the user that is indicative of a dispense having been requested, which might include a button of the beverage apparatus or bottle 300 being depressed. Additionally, the processing of step 511 can include or utilize one or more "triggers" that are tied to or associated with a dispense. As shown, upon the ACP 360 determining that a dispense has been requested by the user, the process passes from step 511 to step 512. Step 512, as well as step 502, can be characterized as additive vessel interface processing or pod interface processing. In step 512, the apparatus controller 350 can perform any of the processing as described above with reference to step 502. That is, is appreciated that a scenario of a new vessel 400 being inserted may warrant same or similar processing as a situation in which a dispense has been requested by the user. In addition to such processing, the apparatus controller 350 can also perform dispense processing as illustrated by step 513 of FIG. 25, i.e. in response to a request from the user to perform a dispense. Details of such processing of step 513 are described below with reference to FIG. 35 and the processing of subroutine 710. As in step 502, the processing of step 512 is not limited or constrained by the particular order illustrated. The various processing of step 512 can be performed in parallel fashion and/or in serial fashion as may be desired and in the order as desired. Such particulars of order can be based on predetermined settings and/or configurations of the apparatus controller 350.

FIG. 26 is a flowchart showing in further detail the apparatus controller 350 performs RFID "warnings" processing step 520, as called upon from FIG. 25, according to principles of the disclosure. The processing of step 520 relates to a situation where data has been collected by the apparatus controller 350 relating to intake or dietary constraints of the user of the beverage apparatus 300. Such data may be characterized collectively as "profile warnings data" that can be stored in record 4 in the vessel_1 database 377 (FIG. 19*b*). For example, the profile warnings data might include data indicating that the user is allergic to peanuts. Accordingly, the processing of the disclosure provides for data in the vessel_1 database 377 to be compared with data in the tag memory portion (TMP) 430. More specifically, profile warnings data 381-4 in the vessel_1 database 377 can be compared to "tag warnings data" 431-13 that is stored in record 13 of the TMP 430. As reflected at 520', in FIG. 26, profile warnings data 381-4 from the vessel_1 database 377 can be in the form of data records and/or data that has been generated by the ACP 360 to be compared to the tag warnings data. For example, the profile warnings data 381-4 stored in the data record 4 (in the vessel_1 database 377) can be input through the beverage apparatus 300 interface 310 from the user. Also, the profile warnings data 381-4 in the vessel_1 database 377 can be downloaded from the server 20 or other data source. Other methodologies and/or data sources can be utilized so as to populate the profile warnings data 381-4 in the vessel_1 database 377.

As shown in FIG. 26, the process starts in step 520 and passes to step 521. In step 521, the ACP 360 retrieves tag warnings data 431-13 from the tag 410 on the vessel or pod 400. For example, the tag warnings data may include suitable indicia so as to represent attributes of the particular additive that is stored in the vessel 400. For example, as reflected at 521", the tag warnings data include "peanut". It should be appreciated that such is a simplified example and that data utilized to represent such information can be more complex in form and/or representation. The tag warnings data can be retrieved from tag warnings data 431-13.

Specific methodologies and processes can be utilized so as to exchange data between the apparatus controller 350 and the tag 410. As reflected at 521', in FIG. 26, subroutines 530 and/or 560 can be invoked so as to (1) output a communication from the apparatus controller 350 to the tag 410, and (2) input a communication from the tag 410 to the apparatus controller 350. Further details of such processing or described below with reference to FIG. 27 and FIG. 28.

After the tag warnings data 431-13 is retrieved from the tag 410 in step 521, the processing passes on to step 522. In step 522, the ACP 360 retrieves profile warnings data 381-4 from the vessel_1 database 377. As reflected at 522', for example, the tag warnings data 431-13 may include the data "peanut". After step 522, the processing passes to step 523.

In step 523, the ACP 360 performs comparison processing and determines if there is a match between the profile warnings data 381-4 and the tag warnings data 431-13. In performing such comparison, various processing can be utilized so as to compare the various data in the tag warnings data 431-13 with the profile warnings data 381-4 so as to determine if there are any matches. For example, based on the content (of the additive) in the vessel 400, the tag warnings data 431-13 may contain the data: "peanuts" and "whey". Such indicia reflects contents of the vessel 400. Such data will be compared with the profile warnings data 381-4.

If the processor determines that there is a match in step 523, the process passes from step 523 to step 525. In step 525, the ACP 360 outputs a communication to the TMP 430 to reflect that the particular vessel 400 should be disabled. Specifically, the ACP 360 writes to the vessel enabled data record 24 in the TMP 430. For example, the data written to the data record 24 could be "no" so as to toggle the particular vessel 400 from an enabled disposition to a disabled disposition. Data can also be stored in the beverage apparatus 300 so as to reflect that the particular vessel 400 has been disabled. After step 525, the process passes to step 526.

In step 526, the ACP 360 maps the "match" that was identified into an appropriate message to the user. For example, the ACP 360 outputs the "mapped to" message to the user interface of the beverage apparatus 300 and/or outputs the message to a user device, such as a cell phone.

Then, the process passes to step 527 of FIG. 26. In step 527, processing passes back to FIG. 25 and specifically passes back to step 502.

On the other hand, the ACP 360 may have not identified a match in step 523, i.e. "no" in step 523. Accordingly, the process passes from step 523 to step 524. In step 524, the ACP 360 outputs a communication to the TMP 430 so as to reflect that the particular vessel 400 should be enabled or should continue to be enabled. Specifically, the ACP 360 writes to the vessel enabled data record 24 in the TMP 430. For example, the data written to the data record 24 could be "yes" so as to toggle or maintain the particular vessel 400 in an enabled disposition. Alternatively, the ACP 360 can simply not write data to the data record 24, in the TMP 430, so as to simply maintain the vessel 400 in an enabled disposition. Data can also be stored in the beverage apparatus 300 so as to reflect the particular vessel 400 is indeed enabled. Accordingly, as reflected at 524', if the processing of FIG. 26 was triggered by a dispense request, that the requested dispense can continue, i.e. as requested by the user.

Then, process passes to step 527 as shown in FIG. 26. As described above, in step 527, processing passes back to FIG. 25 and specifically to back step 502.

In the processing of FIG. 26, it should be appreciated that the ACP 360 can provide for different levels of warning. For example, data in the profile warnings data 381-4 might reflect that the particular user does not like "peanuts" (or prefers not to intake peanuts) but not necessarily that the particular user is allergic to peanuts. Accordingly, if "peanuts" indicia is identified in the tag warnings data 431-13 associated with a particular vessel 400, then the ACP 360 might not disable the particular vessel 400, but might rather just send a communication to the user so as to warn or convey to the user the particular content of the vessel 400. Other levels, degrees, or variance in warnings can be provided. Additionally, the inclusion of a particular ingredient in a vessel 400 can be processed by the ACP 360 so as to limit the intake of such ingredient by the user, i.e. as opposed to precluding the intake of such ingredient by the user.

Figure 27:
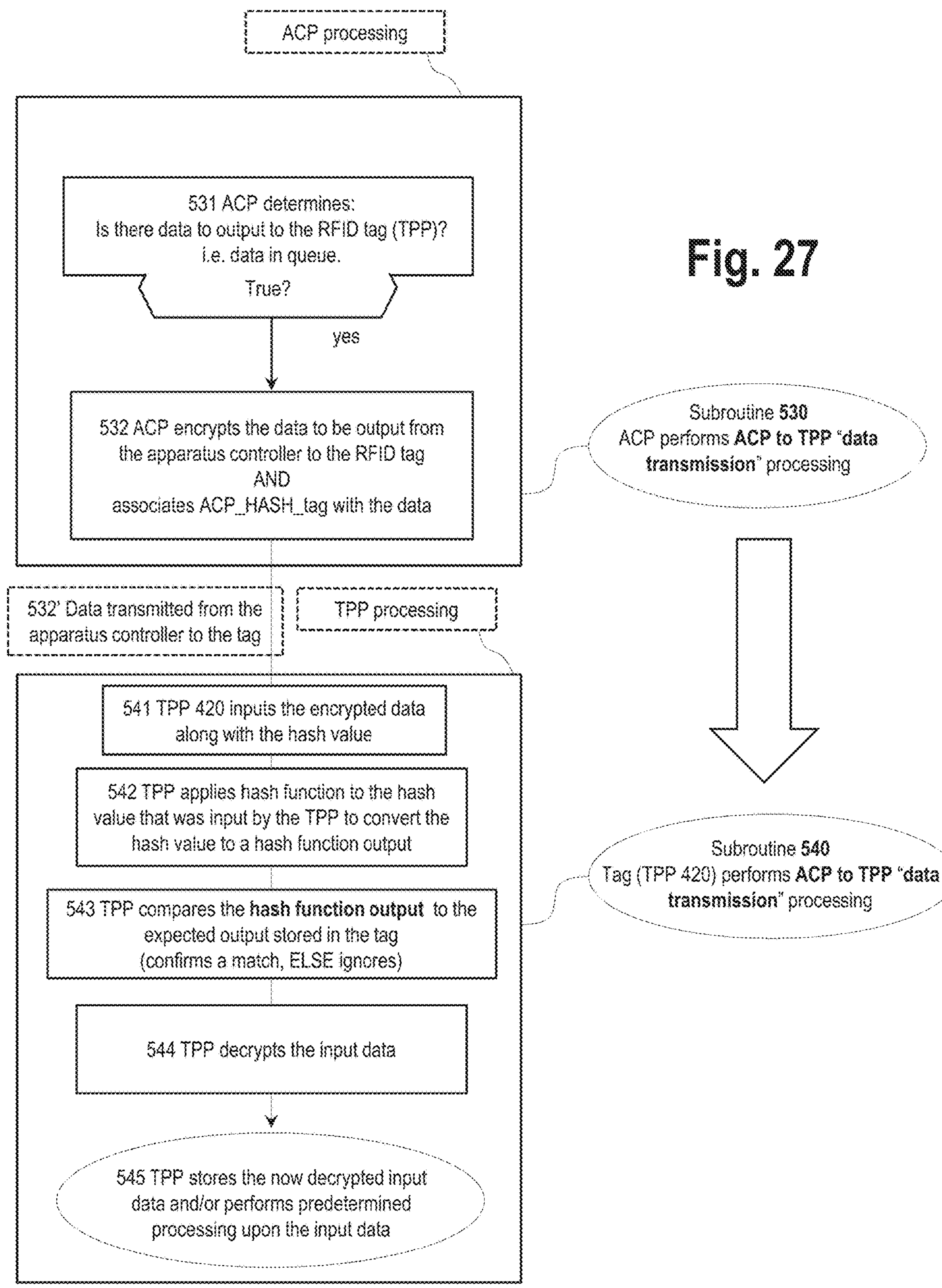
FIG. 27 is a flowchart showing processing associated with output of data from the apparatus controller 350 to the TMP 430, according to principles of the disclosure.

FIG. 27 is a flowchart showing processing associated with output of data from the apparatus controller 350 to the TMP 430, according to principles of the disclosure. More specifically, the processing of FIG. 27 can be invoked or enabled in conjunction with the ACP 360 identifying a requested output of data from the ACP 360 to the TMP 430.

Processing of FIG. 27 can include subroutine 530 and subroutine 540. In the subroutine 530, the ACP 360 performs "ACP to TPP" data transmission processing. That is, processing is performed to transfer data from the apparatus controller 350 to the tag processing portion 420. In the subroutine 540, the tag processing portion 420 performs "ACP to TPP" data transmission processing—from the processing perspective of the tag processing portion 420. As shown in FIG. 27, the process starts in step 531. In step 531, the 560 performs decisioning so as to determine if there is data to output to the tag or RFID tag 410. For example, a queue can be utilized in the apparatus controller 350. Upon the ACP 360 identifying that there is data in the particular queue, processing can be initiated so as to output or push out such data to the tag 410. Accordingly, if a yes determination is identified in the processing of step 531, processing passes to step 532.

In step 532, the ACP 360 encrypts the data to be output from the apparatus controller 350 to the TMP 430 in the tag 410. Additionally, the ACP 360 can associate a hashtag with the data. The tag 410 can have been previously provided with the hashtag. As reflected at 532', the ACP 360 then controls the transmission of data from the apparatus controller 350 to the tag 410.

FIG. 27 also shows the processing performed by the tag 410, i.e., upon input of the data that has been transmitted from the apparatus controller 350. In step 541, the tag processing portion 420 (TPP) inputs the encrypted data along with the hash value. Then, the process passes to step 542. In step 542, the tag processing portion 420 applies a hash function (that can be stored in record 20 in the TMP 430) to the hash value that was input by the tag processing portion 420. Accordingly, the tag processing portion 420 converts the hash value to a hash function output. Then, the process passes to step 543.

In step 543, the tag processing portion 420 compares the hash function output to the expected output stored in the TMP 430. For example, the expected output can be stored in the data record 21 in the TMP 430. The tag processing portion 420 confirms a "match"—indicating that the received data is indeed appropriately from beverage apparatus 300. If the tag processing portion 420 identifies that there is not a match, then the data, which was input, is ignored. Then, the process passes from step 543 to step 544.

In step 544, the tag processing portion 420 decrypts the data that was input from the apparatus controller 350. Then, the processing passes to step 545. In step 545, the tag processing portion 420 stores the now decrypted input data and/or performs predetermined processing upon the input data. For example, such predetermined processing could include the tag processing portion 420 placing the received data in predetermined tag data records 431 in the tag 410.

FIG. 28 is a flowchart showing processing associated with output of data from the TMP 430 to the apparatus controller 350, i.e. from the tag to the beverage apparatus 300, according to principles of the disclosure. The processing of FIG. 28 can be invoked or enabled in conjunction with the tag processing portion 420 identifying a requested output of data from the tag 410 to the apparatus controller 350.

The processing of FIG. 28 can include subroutine 550 and subroutine 560. In the subroutine 550, the tag processing portion 420 performs "TPP to ACP" data transmission processing. That is, processing is performed, by the tag 410, to transfer data from the TMP 430 to the apparatus controller 350. In the subroutine 560, the ACP 360 performs "TPP to ACP" data transmission processing. Such processing is performed by the apparatus controller 350 upon receipt of data from the tag 410. As shown in FIG. 28, the process starts in step 551. In step 551, the tag processing portion 420 performs decisioning so as to determine if there is data to output from the tag 410 to the apparatus controller 350. For example, a queue can be utilized in the tag 410. Upon the tag processing portion 420 identifying that there is data in the particular queue, the processing can be initiated so as to output or push out such data from the tag 410 to the apparatus controller 350. Accordingly, if a "yes" determination is identified in the processing of step 551, processing passes to step 552.

In step 552, the tag processing portion 420 encrypts the data to be output from the tag 410 to the apparatus controller 350. Additionally, the tag processing portion 420 can associate a hashtag with the data. The apparatus controller 350 can have been previously provided with the hashtag. As reflected at 552', the tag processing portion 420 controls the transmission of data from the tag 410 to the apparatus controller 350.

FIG. 28 also shows the processing performed by the apparatus controller 350, i.e. upon input of the data, which has been transmitted from the tag 410 to the apparatus controller 350.

In step 561, the ACP 360 inputs the encrypted data along with the hash value. In step 562, the ACP 360 applies a hash function (that can be stored in record 5 in the vessel_1 database 377) to the hash value that was input by the ACP 360. Accordingly, the ACP 360 converts the input hash value to a hash function output. Then, the process passes to step 563. In step 563, the ACP 360 compares the hash function output to the expected output stored in the controller. For example, the expected output can be stored in the data record 6 in the vessel_1 database 377. The ACP 360 confirms a "match"—indicating that the received data is indeed appropriately from the tag 410 as expected. If the ACP 360 determines that there is not a match, then the data, which was input, is ignored. Then, the process passes from step 563 to step 564.

In step 564, the ACP 360 decrypts the data that was input from the tag 410. Then, processing passes to step 565. In step 565, the ACP 360 stores the now decrypted data, which was input, and/or performs predetermined processing upon the input data. For example, such predetermined processing could include the ACP 360 placing the received data in predetermined memory destinations in the apparatus database portion 370.

Figure 29:
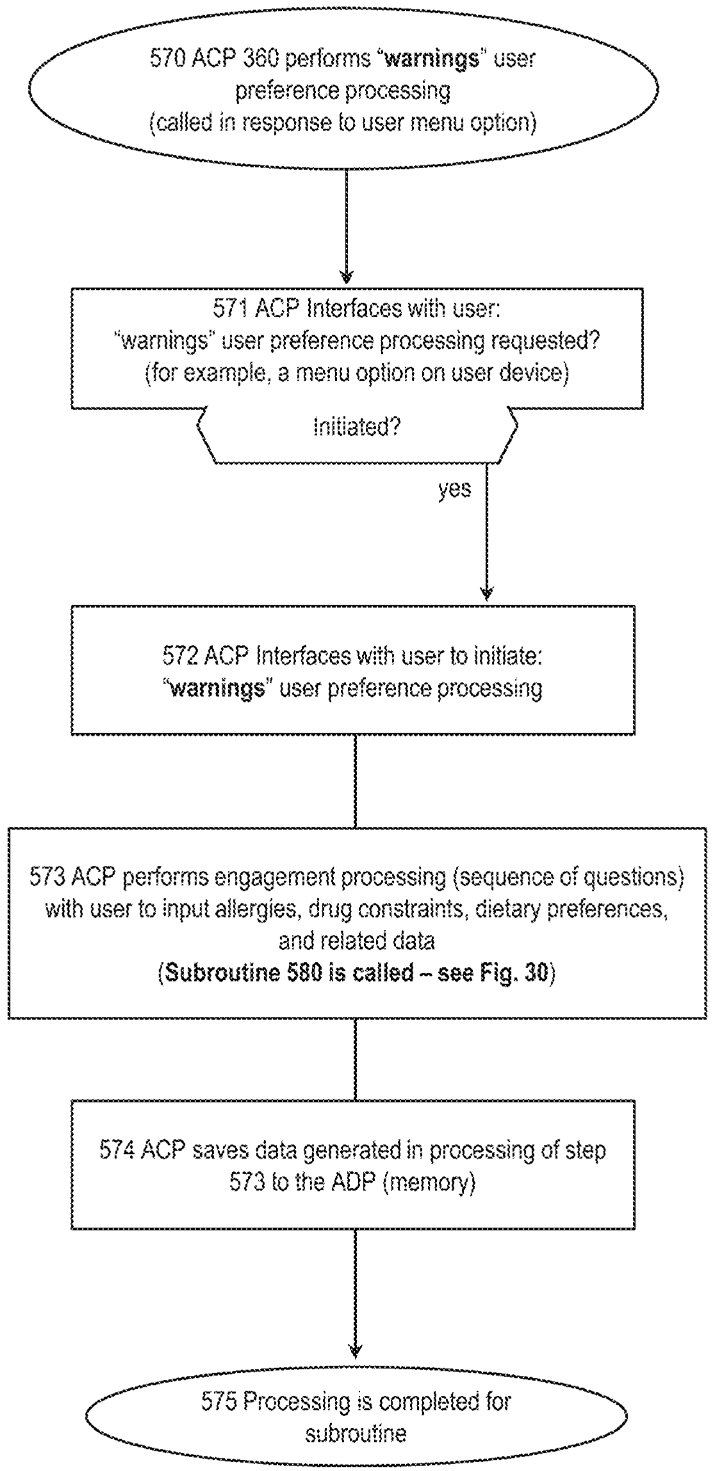
FIG. 29 is a flowchart showing details of user preference processing, according to principles of the disclosure.

FIG. 29 is a flowchart showing details of user preference processing, according to principles of the disclosure. Specifically, FIG. 29 shows details of the "ACP 360 performs warnings user preference processing" step 570, in accordance with at least one embodiment of the disclosure. For example, the processing of step 570 can be called in response to a user selection of a menu item, in a GUI. The GUI might be presented to the user via the interface 310 or a user device associated with the beverage apparatus 300. The process starts in step 570, and passes to step 571. In step 571, the ACP 360 determines if "warnings" user preference processing has been initiated. If yes in step 571, the process passes to step 572. In step 572, the ACP 360 interfaces with the user to initiate such "warnings" user preference processing. Then, the process passes to step 573.

In step 573, the ACP 360 performs engagement processing with the user to input allergies, drug constraints, dietary preferences, and related data. For example, such interface can be in the form of a sequence of questions presented to the user via a GUI. To perform such processing, the ACP 360 calls subroutine 580. Details of such subroutine 580 are set forth in FIG. 30 and described below. After the processing of step 573, the process passes to step 574. In step 574, ACP 360 saves data generated in processing of step 573 to the apparatus database portion 370. Then, the process passes to step 575. In step 575, the processing terminates.

Further details with the processing of subroutine 580 are described with reference to FIG. 30. In FIG. 30, the ACP 360 interfaces with the user to pose a first question which might be characterized as "question #1. The question can relate to allergies, drug constraints, dietary preferences, and/or other dietary or intake considerations or preferences (that can collectively be characterized as "intake data") that the user wants to input into (and be known by) the beverage apparatus 300. As reflected in step 581, of FIG. 30, the processing can include generation of a question or use of other inquiry technique, input of response from the user, and population of the user profile based on the response. The user profile can be stored in the apparatus database portion 370.

As shown in FIG. 30, steps 581, 582, 583 represent that numerous questions can be presented to the user so as to input the desired intake data. Such questions can be presented in hierarchical manner so as to "drill down" into areas that are identified (by the user) as relevant to the user—in conjunction with quickly eliminating areas that are not of relevance to the particular user. Further details of the processing of the third question, in FIG. 30, is illustrated. As reflected at 583A' in FIG. 30, the apparatus database portion 370 can include one or more data records that associate a particular question with a "flag" term or code, i.e. indicia. For example, the question might be: "Are you allergic to peanut based foods?" and the flag term might be the indicia "peanuts". Such question can be presented to the user in step 583A. Then, the processing passes to step 583B. In step S803B, the ACP 360 determines if input from the user was "yes". If the determination in the processing of step 583B is "no" then the process passes to step 583D.

In step 583D, the ACP 360 terminates processing for the particular question. Then, in step 583F, processing advances to the next question. Such next question might be question #4 as reflected in step 584 of FIG. 30. After step 584, the process passes to step 586. In step 586, the process passes back to FIG. 27.

On the other hand, the decision processing of step 583B may determine "yes". Accordingly, the processing passes from step 583B to step 583C. In step 583C, the ACP 360 populates the user profile to include the flag term "peanut". The ACP 360 than terminates processing for the particular question. Then, as described above, the processing passes to step 583F. In step 583F, the ACP 360 interfaces with the user to present the next question. Accordingly, as reflected in FIG. 30, the user profile can be populated with specific, predetermined terms that reflect "intake data" that is associated with the user. Such intake data can be standardized with corresponding intake data that is stored on the TMP 430 of the tag 410. Accordingly, such processing allows the ACP 360 to determine if there is a match between the profile warnings data 381-4 (in the apparatus database portion 370) and the tag warnings data 431-13 (in the TMP 430). If a match is determined, suitable processing can be performed. Such suitable processing can include the disabling and/or constraining of dispense of the additive in the particular vessel 400.

Figure 31:
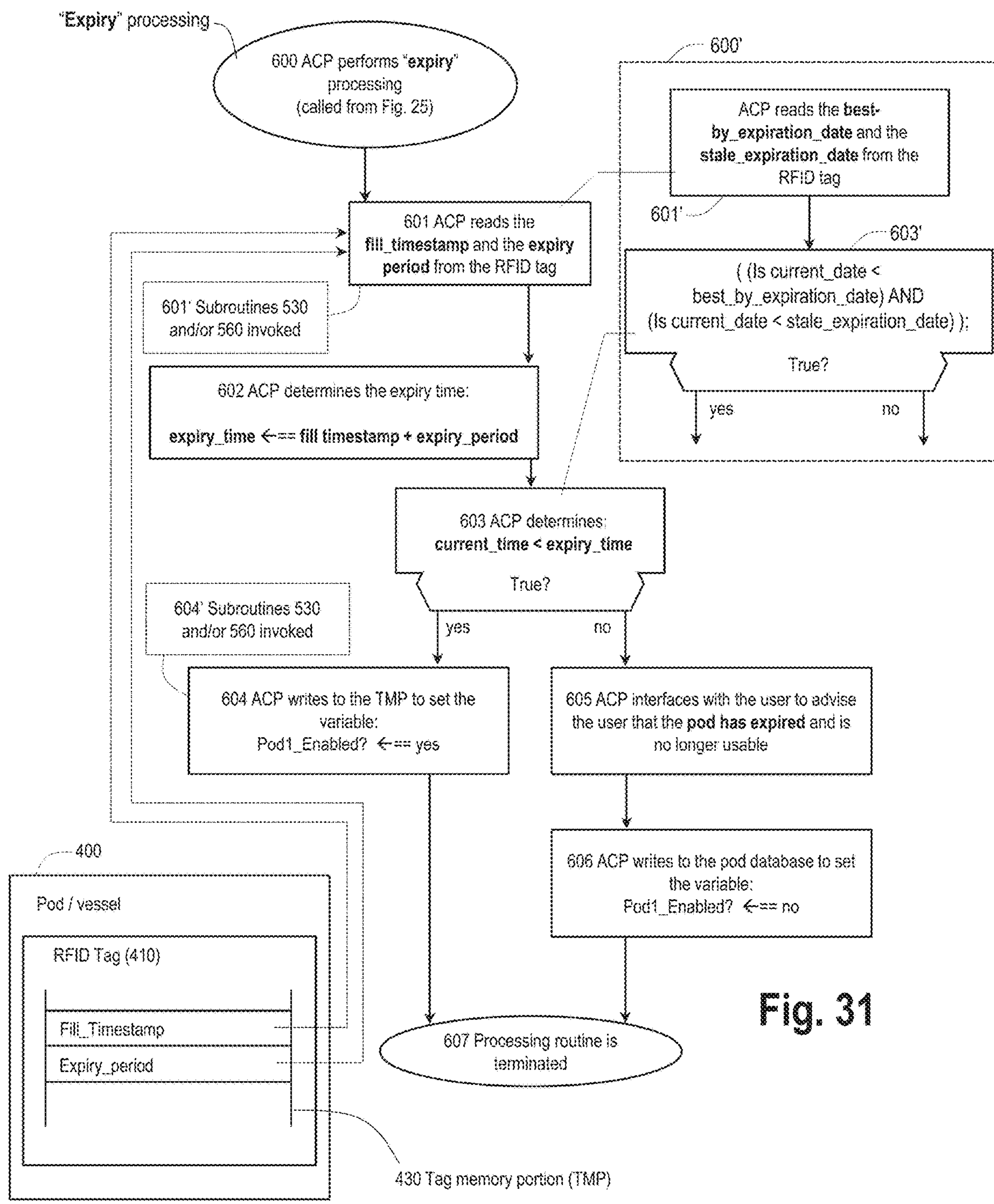
FIG. 31 is a flowchart showing in further detail the apparatus computer processor (ACP) 360 performs "expiry" processing step 600, as called on from FIG. 23, in accordance with the principles of the disclosure.

FIG. 31 is a flowchart showing in further detail the ACP 360 performs "expiry" processing step 600, as called on from FIG. 25, in accordance with the principles of the disclosure. As shown, the processing starts in step 600 and passes to step 601. In step 601, the ACP 360 reads particular data from the tag memory portion (TMP) 430. Specifically, the ACP 360 reads the fill timestamp data from the tag data record 5 (of the TMP 430) and an expiry period from the tag data record 14 (of the TMP 430). In FIG. 24, such data is illustratively shown in the TMP 430, which is disposed on the RFID tag 410, which is a part of or attached onto the pod or vessel 400. It is appreciated that the organization, architecture, and specific positioning of data in the TMP 430 (FIG. 24) can be varied as desired. As reflected at 601' (FIG. 31), the subroutines 530 and/or 560 can be invoked so as to output data (from the apparatus controller 350) to the tag 410 and to input data from the tag 410.

After step 601, processing passes from step 601 to step 602. In step 602, the ACP 360 determines the expiry time. Specifically, the ACP 360 adds the fill timestamp on to the expiry period, so as to yield the expiry time. For example, a fill date of Oct. 1, 2019 plus an expiry period of 2 months would yield a expiry_time of Dec. 1, 2019. In some embodiments of the disclosure, the tag data record can include an expiration date, i.e. rather than calculating the expiration date as determined in step 602.

In step 603, the ACP 360 determines if the expiry time has not been attained, i.e. is the current date/time less than the expiry date/time. If no in step 603, the processing passes to step 605. In step 605, the ACP 360 outputs a communication to the user that the particular pod, i.e. vessel, has expired and cannot be used. Then, in step 606, the ACP 360 outputs a communication to the tag so as to overwrite record 24 in the TMP 430 so as to represent that the vessel is disabled. As a result, the particular vessel will be disabled. It should be appreciated that in processing in response to a dispense request, the ACP 360 can interface with the tag 410 so as to determine whether or not the particular vessel 400 is enabled. If the vessel is not enabled, i.e. as in the processing of step 606 in FIG. 31, then the dispense request will not be completed by the ACP 360.

In other embodiments, in the situation that the vessel has expired, the ACP 360 may not disable the particular pod or vessel 400. Rather, the ACP 360 may just send a communication to the user indicating that the pod 400 has expired. After step 606, of FIG. 31, the process passes to step 607. In step 607, the processing routine is terminated. On the other hand, in step 603, the ACP 360 may determine that the expiry time has not been attained. Accordingly, the decisioning in step 603 yields a "yes" determination. As a result, the process passes to step 604. In step 604, the ACP 360 writes to the TMP 430 to set the pod enabled variable (in the data record 24 in the TMP 430) to "yes". In other embodiments, the ACP 360 may not write new data to the TMP 430, but rather may simply leave the tag data record 24, in the TMP 430, in the enabled state.

In accordance with at least some embodiments of the disclosure, expiration or expiry related processing can be varied from the processing as shown in steps 601, 602 and 603 of FIG. 31. In an embodiment, there can be multiple stages of expiration or shelf life of a pod/additive vessel. There can be one expiration date by which a pod, i.e. contents of a pod, should be used subsequent to production of the pod. Such first expiration date might be described as a "best-by expiration date". A second expiration date can be initiated by initial use of a pod/additive vessel. Such might be described as a "stale expiration date"—in that content of the pod 250 may go stale after a certain time period, e.g. 21 days, of being "opened". To explain, a pod or vessel 250 as shown in FIG. 5B can include a vessel cap or cap 248. The cap 248 can be positioned over the piston head 253 and port 255. The cap 248 can be secured onto the end of the pod via threads, snaps or other arrangement. The cap 248 can including a sealing surface 249 and/or other structure that seals the pod 250, which contains additive or concentrate. The cap 248 can prevent evaporation of additive in the pod 250. The cap 248 can prevent contaminates from entering the pod 250 and maintain additive, in the pod, in an isolated state from the ambient environment. The pod 400, as shown in FIG. 17 for example, can include a same or similar cap to cover the piston head 405 and one-way valve 407. In use, a user can remove the cap 248, with reference to FIG. 5B, before inserting the pod 250 into a receptacle of the beverage apparatus 200. Such removal of the cap 248 can be equated to "opening" of the pod. Once the cap 248 is removed, the second expiration date can start to run or accrue. For example, the second expiration date (i.e. the "stale expiration date") can run for 21 days from when the pod 250 is first inserted into the receptacle of the beverage apparatus and the particular pod is detected by a processor of the beverage apparatus. Insertion of the pod into the beverage apparatus is indicative that the cap 248 has been removed, i.e. that the pod has been opened. The best-by_expiration_date might be 2 months from production date. The expiration dates may vary based on the particular additive.

To further explain, alternative processing 600' can be performed as illustrated by process steps 601' and 603' of FIG. 31. Step 601' can be performed in lieu of step 601, and step 603' can be performed in lieu of step 603. In step 601' the ACP reads the best-by_expiration_date and the stale_expiration_date from the RFID tag. For example, the best-by_expiration_date can be written to the RFID tag in production and the stale_expiration_date can be written to the tag by the beverage apparatus upon insertion of the RFID tag into the beverage apparatus. Then, in step 603', the ACP determines if (Is current_date<best_by_expiration_date) AND (Is current_date<stale_expiration_date)). In such illustrative logic, it can be understood that a later date possesses a greater value. If yes in step 603', then processing can proceed to step 604 and the pod is enabled. If no in step 603', then the process passes to step 605 and the pod is not enabled. Other options can be provided. For example, even though the best-by_expiration_date and/or the stale_expiration_date have been attained—the pod can still be enabled, but a suitable communication can be output to the user. The suitable communication can advise the user of the disposition of the pod.

FIG. 32 is a flowchart showing details of the "ACP 360 performs product information processing" step 610 that is called from FIG. 25, according to principles of the disclosure. The processing FIG. 32 relates to inputting information, into the beverage apparatus 300, from the tag 410, and displaying such information as well as performing other manipulation of such information. For example, product information can be retrieved from tag 410 and displayed either on the beverage apparatus 300 and/or on a user device, for example. As shown in FIG. 32, the process starts in step 610 passes to step 611.

In step 611, the ACP 360 determines if settings and/or operational mode dictates to display product information regarding the pods or vessels 400 that are in use. If yes, then the process passes from step 611 to step 612. In step 612, the ACP 360 determines the particular product information that is dictated (by the settings and/or operational mode, for example) that should be displayed. Additionally, the ACP 360 can determine the particular channel upon which to display such information. For example, as reflected at 612', the ACP 360 determines that product name is the product information to be displayed on the user device or beverage apparatus 300. The processing passes from step 612 to step 613. In step 613, the ACP 360 outputs a request to the tag processing portion 420 to retrieve the requested information, product name, from the tag processing portion 420. As reflected at 613', subroutine 530 can be invoked so as to output such request to the tag processing portion 420. The request from the ACP 360 can instruct the tag processing portion 420 to access data in data record 3 in the TMP 430, as shown in FIG. 24. Such data in the data record 3 can simply include the product name. Alternatively, such data in the data record 3 can include a code that is utilized by the ACP 360 so as to "look up" the name of the product. For example, such lookup data may be downloaded by the beverage apparatus 300 from the ecosystem server 20.

After step 613, the processing passes to step 614. In step 614, the ACP 360 inputs requested information, i.e. the product name, from the tag processing portion 420. As reflected at 614' in FIG. 32, subroutine 560 can be invoked as described above. After step 614, the process passes to step 615.

In step 615, the ACP 360 outputs the data (product name) to the user device for display on the user device. For example, the user device might be a cell phone 106. Additionally, the ACP 360 can output the data, for display, to the interface 310 for display.

After step 615, the processing passes to step 616. In step 616, the processing routine is completed and is terminated.

FIG. 33 is a flowchart showing details of the "ACP 360 performs apparatus color processing" step 620 is called from FIG. 25. The processing of FIG. 33 relates to a situation in which data is pulled from the TMP 430 so as to control color display provided in or on the beverage apparatus 300. For example, the dispense of a particular vessel or pod 400 can be accompanied by the display of a particular color. For example, the display of the particular color can be provided by a colored LED in the beverage apparatus 300. The LED can be provided in the internal volume or chamber 316 in the beverage chamber housing 315. As shown in FIG. 33, the process starts in step 620 and passes to step 621.

In step 621, the ACP 360 determines if a dispense is to be performed and that settings and/or operational mode dictate to display light in conjunction with the dispense. If no, then the processing passes from step 621 to step 625. In step 625, the processing routine is completed and is terminated. On the other hand, the decisioning of step 621 may determine that the "if" statement of 621 is true. Accordingly, processing passes from step 621 to step 622.

In step 622, the ACP 360 outputs a request to the tag processing portion 420 to retrieve the requested information regarding color from TMP 430. For example, as reflected at 622', subroutine 530 can be invoked. The request from the ACP 360 can include particulars so as to dictate (to the tag processing portion 420) to retrieve color data from tag data record 15 in the TMP 430. The RGB color scheme is used herein for illustrative purposes. However, it should be appreciated that other color schemes and/or other color values can be utilized in the practice of the disclosure. After step 622, process passes to step 623.

In step 623, the ACP 360 inputs the requested information (the RGB_pod1) data from the TMP 430. As reflected at 623' of FIG. 33, subroutine 560 can be invoked as described above. After step 623, the processing passes to step 624. In step 624, the ACP 360 enables apparatus color (light) processing during dispense—so that light will be generated during dispense from the pod or vessel 400. Data regarding when and how to provide particular light or illumination to the beverage apparatus 300 can be included in the tag data record 15 in the TMP 430. For example, such data may dictate for the beverage apparatus 300 to provide illumination in other dispensing scenarios of the beverage apparatus 300. For example, an LED unit or assembly can be provided, in the bottle 300, that includes different colored bulbs, such as a red, green and blue bulb. The different colored bulbs can be selectively lit or not lit. The data record 15 can include data based on which the bottle controls which bulbs to light or not light. Accordingly, the emitted color can be controlled.

After step 624, the processing passes to step 625. In step 625, the processing routine is completed and is thus terminated.

FIG. 34 is a flowchart showing in further detail the ACP 360 "performs product recall processing" step 630 as called from FIG. 25, according to principles of the disclosure. Such processing relates to the identification of a recalled vessel 400 that is inserted into the beverage apparatus 300. However, the processing of FIG. 34 can also be applied to other attributes and/or characteristics of a vessel in the beverage apparatus 300.

As shown, the process starts in step 630 and passes to step 631. In step 631, the ACP 360 reads attribute information from the TMP 430. In particular, the ACP 360 can read the facility ID data in tag data record 8 of the TMP 430. The ACP 360 can read the lot number data in tag data record 7 in the TMP 430. Then, the process passes to step 631. In step 631, the ACP 360 retrieves product recall data from a server or other backend system. For example, the ACP 360 can retrieve the product recall data from the ecosystem server 20 as shown in FIG. 17. This data is then stored in the apparatus database portion 370. Such product recall data might be represented by a facility identification (ID) and/or lot number identification. Other tracking data can be used so as to identify a recalled vessel or group of vessels. Then, the process passes to step 633.

In step 633, the ACP 360 determines if there is a match between data input from the TMP 430 of the vessel 400 vis-à-vis the data input in step 631. If there is not a match, then the processing passes to step 634. In step 634, the ACP 360 writes to the TMP 430 to enable the particular vessel. Specifically, the ACP 360 writes to the data record 24 so as to enable the particular vessel 400. Then, processing passes to step 637. In step 637, processing routine is terminated.

On the other hand, it may be determined in step 633 that there was indeed a match between data retrieved from the vessel 400 vis-à-vis data input from the ecosystem server 20 in step 631. Accordingly, if yes in step 633, the process passes from step 633 to step 635.

In step 635, the ACP 360 interfaces with the user to advise the user that the vessel or pod 400 is subject to a recall and is not usable and/or is subject to some other restriction or constraint. As reflected at 635', processing can also include communicating further information to the user regarding the recalled pod. For example, such information might include logistics in securing replacement parts or replacement for the recalled pod.

After step 635, the process passes to step 636. In step 636, the ACP 360 writes to the pod database so as to disable the particular pod or vessel 400. For example, the ACP 360 writes "no" to the data record 24 in the TMP 430. As reflected in 336' in FIG. 34, subroutine 530 can be invoked in such writing of data to the TMP 430. After step 636, the processing passes to step 637. In step 637, processing routine is terminated.

The process shown in FIG. 34 can be applied to other scenarios or circumstances other than a recall scenario. The process can be applied in any of a wide variety of situations in which identifying data can be stored on the TMP 430 and matched with data stored on the beverage apparatus 300, input from the ecosystem server 20, input from some other third party, and/or input from some other resource. The matching of data and/or a determination that the data does not match can be utilized to determine the state of the particular vessel 400, particular processing that should be applied to the particular vessel 400, particular communications that should be output to the user in conjunction with use of the particular vessel 400 and/or other processing. In general, the beverage apparatus 300 can input and write data to the tag 410 so as to determine state of a particular vessel 400, particular processing that should be applied to the particular vessel 400, particular communications that should be output to the user in conjunction with use of the particular vessel 400 and/or other processing.

FIG. 35 is a flowchart showing details of the ACP 360 "performs dispense or dispensing processing" step or subroutine 710 as called from in the processing of FIG. 25, according to principles of the disclosure. The processing of FIG. 35 relates to a situation where a dispense is requested by the user and various processing is performed in conjunction with such requested dispense. As shown, the process starts in step 710 and passes to step 711. In step 711, the ACP 360 performs "warning processing". In such processing, subroutine 520 of FIG. 26 can be called upon by the ACP 360. After step 711, the process passes to step 712.

In step 712, the ACP 360 determines if a dispense has been requested by the user. The ACP 360 also determines that the pod or vessel 400 is enabled. If a yes determination is determined in step 712, the process passes to step 713. In step 713, the ACP 360 determines if a taste preference feature is enabled. As described below, such taste preference feature allows a user to vary a default or predetermined dose amount stored in the pod 400.

If no in step 713, taste preference feature is not enabled, the processing passes to step 715. In step 715, ACP 360 retrieves default dose data, i.e. dispense volume data, from the tag regarding how much additive is to be dispensed. For example, such data can be the number of milliliters to be dispensed. Such data can be stored in data record 10 in the TMP 430. After step 715, the processing passes to step 716.

On the other hand, it may be determined that a taste preference feature has been enabled, i.e. yes in step 713. Accordingly, the processing passes from step 713 to step 714. In step 714, the ACP 360 performs taste preference processing. In particular, subroutine 730 of FIG. 36 is called upon or invoked. After such processing is performed in step 714, the processing passes to step 716. As reflected at 714', in FIG. 35, subsequent to performing the subroutine 730 (step 714), a dispense volume is in memory so as to be used for further processing as described below. Accordingly, processing coming into step 716 has generated or retrieved a dispense amount. In step 716, the ACP 360 reads fill level data from a predetermined data field of the RFID tag 14. Such fill level data represents a specific state of the vessel 400 at a particular point in time. As time advances and use of the vessel is incurred, such state of the vessel 400 will vary over time. The processing of FIG. 35 is performed to provide reactive or responsive processing, by the ACP 360, to address the change in state experienced by the vessel 400. The fill level data that is read in step 716 can be stored in data record 23 in the TMP 430, as shown in FIG. 24. After step 716, processing passes to step 720.

In step 720, the processing determines if the dispense volume requested by the user can be satisfied by the amount of additive remaining in the vessel 400. In other words, the processing determines if the dispense volume is less than the fill level of the vessel 400. If yes, then the processing passes from step 720 to step 724. In step 724, the ACP 360 controls the dispensing assembly to dispense the requested amount of additive from the pod into the liquid in the beverage apparatus 300. That is, such liquid in the beverage apparatus 300 is contained in the apparatus cavity, internal volume, or chamber 315 as described above. As reflected at 723' in FIG. 35, the dispense processing can include apparatus color or light processing as illustrated in FIG. 33. After step 724 as shown in FIG. 35, the processing passes to step 725.

In step 725, the ACP 360 generates updated fill level field to reflect the dispense that just occurred. The updated value is written back to the tag, i.e. so as to update the fill level data field. Such value can be constituted by the ACP 360 decrementing fill level by the dispense volume that has just been dispensed. Such updated value can be written over the previous value stored in data record 23 in the TMP 430. Accordingly, the ACP 360 updates the tag or RFID tag 410 so as to reflect the current status of the vessel 400.

After step 725, the process passes to step 726. In step 726, ACP 360 outputs a communication to the user that the requested dispense has been performed. Then, in step 727, the ACP 360 stores data regarding the dispense event in the apparatus database portion 370. Then, the processing passes to step 728. In step 728, the processing routine is terminated.

On the other hand, it may be determined in step 720 that the fill level is not greater than the dispense volume, i.e. no in step 720. Accordingly, the processing passes from step 720 to step 721. In step 721, the ACP 360 outputs a communication to the user that the requested dispense cannot be performed. The ACP 360 can provide details to the user. Then, in step 722, ACP 360 stores data regarding the dispense event, or in such situation the attempted dispense event. Then the processing passes to step 723. In step 723, the processing routine is terminated.

FIG. 36 is a flowchart showing in further detail the ACP 360 performs taste preference processing as called upon from FIG. 35, according to principles of the disclosure. As shown, the process starts in step 730 and passes to step 731. In step 731, the ACP 360 determines if there is a "taste preference coefficient" (TPC) in memory. As described below, the TPC can be utilized so as to vary a standard or default dose value stored in the TMP 430.

If no in step 731, then the process passes to step 732. In step 732, ACP 360 interfaces with the user to input a new or updated TPC value. Then, the processing passes to step 733.

On the other hand, a determination may be made, by the ACP 360 in step 731, that a TPC is indeed in memory. Accordingly, a yes determination is determined in step 731. Accordingly, the process passes from step 731 to step 733. As reflected at 731' of FIG. 36, a user setting can be utilized to dictate other order processing or processing. For example, a user may be provided functionality to interface with the system upon each dispense so as to adjust the dispense amount. Other variations can be provided. Also, a setting can be provided to the user such that taste preference processing may not be enabled.

With further reference to FIG. 36, in step 733, the ACP 360 retrieves dispense volume data, which may be retrieved in the form of a default dose from the tag data record 10 of the TMP 430. Such dispense volume dictates how much additive has been requested to be dispensed. Then, the process passes from step 733 to step 734.

In step 734, the ACP 360 adjusts the dispense volume based on the TPC to generate a modified dispense volume. In accordance with at least one embodiment of the disclosure, the dispense volume can be multiplied by the TPC so as to generate a modified dispense volume. Such modification of the dispense volume can increase the dispense volume or decrease the dispense volume based on the value of the TPC. Other adjustment mechanism can be used. After step 734, the processing passes to step 750.

In step 750, the ACP 360 determines if the modified value is less than the maximum dose of the additive. Such maximum dose of the additive can be retrieved by the ACP 360 from the data record 12 in the TMP 430. Such maximum dose can be based on a variety of considerations including dietary considerations.

It may be determined in step 750 that the modified value is not less than the maximum dose. Accordingly, the modified dose exceeds the maximum dose. Accordingly, a no determination is determined in step 750. As a result, the processing passes from step 750 to step 751. In step 751, the ACP 360 interfaces with the user to advise the user of the situation and to input acknowledgment of the situation from the user. For example, the processing requests the user to click "OK". Then, the process passes from step 751 back to step 732. In step 732, the ACP 360 interfaces with the user to input a new or updated TPC value.

On the other hand, a yes determination may be determined in step 750. Accordingly, the processing passes from step 750 to step 752. In step 752, the ACP 360 determines if the modified value is more than a minimum dose of the additive. Such minimum dose of the additive can be retrieved from the data record 11 in the TMP 430, in the tag 410 of the vessel 400.

If no in step 753, then the ACP 360 interfaces with the user to advise the user that the modified dose is below the lower limit for the additive. Processing is then performed to request acknowledgement from the user, in step 753. On the other hand, a yes determination may be rendered in step 752. Accordingly, the process passes from step 752 to step 754. In step 754, the ACP 360 forms processing to confirm that any other applicable thresholds or constraints are satisfied by the dispense requested. For example, capacity constraints of the internal volume or chamber 315 can be taken into account. Then, in step 755, a value of the dispense volume is assigned (or "gets") the modified dispense volume. Then, the process passes to step 756. In step 756, the processing passes back to FIG. 35 in step 716. Processing then continues as described above.

The processing in accordance with the principles of the disclosure allow a physical state of the beverage apparatus 300 and/or a vessel 400, which is disposed in the beverage apparatus 300, to be monitored. Additionally, operation of the beverage apparatus can be performed so as to control a physical state of the vessel 400. Operation of the beverage apparatus can be performed so as to attain a desired physical state of the vessel 400. In such functionality, data can be retrieved from the tag 410 (affixed to the vessel 400) and data can be written to the tag 410. Additionally, a state or event experienced by the beverage apparatus 300 and/or the vessel 400 can be written to the tag 410. For example, such event might be the sudden acceleration or deceleration of the beverage apparatus 300, such as from a drop. Such data can be written to the tag 410, represented in data form, so as to control future operations of the beverage apparatus 300 relative to the particular vessel 400.

As described above and shown in FIG. 18, the beverage apparatus 300 can include a vessel 400. The vessel 400 can include a tag 410. The tag 410 can be an RFID tag. The tag 410 can be in communication with the transceiver 341 (of the beverage apparatus) via an antenna 342. The transceiver 341 can be in communication with the controller 350. As described above with reference to FIG. 23, the RFID tag 410 can include a tag processing portion (TPP) 420 and a tag memory portion (TMP) 430.

Figure 37:
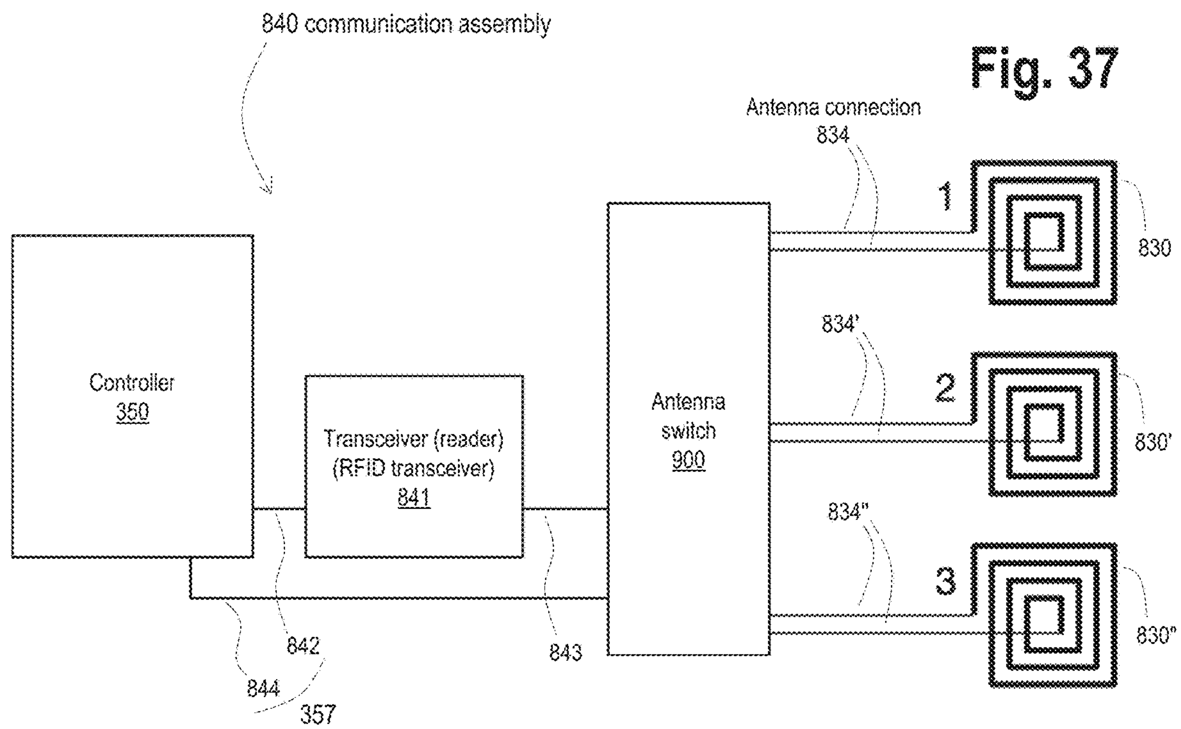
FIG. 37 is a schematic diagram showing a communication assembly 840 according to principles of the disclosure.

Hereinafter, further features will be described relating to tags or RFID tags of the beverage apparatus and related structure and processing, in accordance with the present disclosure. FIG. 37 is a schematic diagram showing a communication assembly 840 in accordance with at least one embodiment. The communication assembly 840 can be provided in the bottle 300 of FIG. 22 or in a similar bottle. The communication assembly 840 can include a controller 350. The communication assembly 840 can be a separate assembly vis-à-vis a main or central controller or other controller of the beverage apparatus. The communication assembly 840 can also include a transceiver or RFID transceiver 841, as well as one or more antennas 830. The antennas 830 can include a first antenna, second antenna 830' and a third antenna 830". The antennas 830 can be of similar structure.

As shown in FIG. 37, the transceiver 841 can be connected to the antennas 830 via an antenna switch 900. More specifically, the controller 350 can be in communication with the antenna switch 900 via a cable or control cable 844. The cable 844 can provide communication between the controller 350 and the antenna switch 900 and provide power to the antenna switch 900. The cable 844 can be part of the communication pathway 357 described above. A cable 842 can provide communication between the controller 350 and the transceiver 841, as well as providing power to the transceiver 841. A cable 843 can provide communication between the transceiver 841 and the antenna switch 900. The cable 843 can also provide power to the antenna switch 900. The various cables, wires, or other communication pathways of FIG. 37 can be included in or part of a communication pathway 357 of the beverage apparatus 300.

The antenna switch 900 can be connected to each of the three antennas 830. The three antennas 830 can be used to communicate, respectively, with the three vessels disposed in respective receptacles of the beverage apparatus, such as receptacles 390 described above. The antenna switch 900 can be connected to the antenna 830 via an antenna connection cable 834. The antenna switch 900 can be connected to the second antenna 830' via a second connection cable 834'. The antenna switch 900 can be connected to the third antenna 830" via a third connection cable 834". In accordance with principles of the disclosure, the antenna switch 900 can control which antenna 830 is in communication with the transceiver 841 via control of the antenna switch 900. Details of the manner in which the antenna switch 900 is controlled and the manner in which the antenna switch 900 controls connection between the antennas 830 and the transceiver 841 are described below.

In an alternative embodiment, the transceiver 841 can be physically in data communication with each of the antennas (830, 803', . . . ) simultaneously. In such arrangement, only one of the antennas may be or is energized so as to communicate with a respective RFID tag (of a pod) through such energized antenna. The antenna(s) that are not energized will not afford communication to a respective RFID.

Figure 37A:
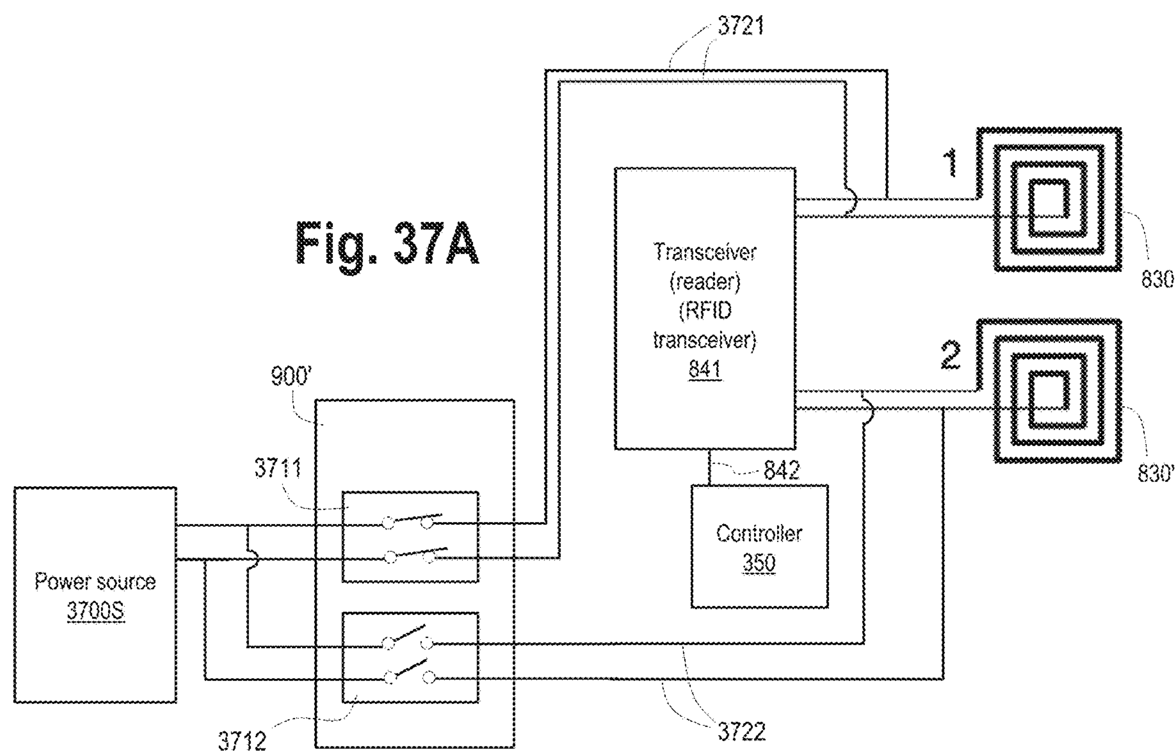
FIG. 37A is a further schematic diagram showing a communication assembly according to principles of the disclosure.

That is for example, in the alternative arrangement shown in FIG. 37A, antenna 830 can be powered, as controlled by the antenna switch 900'. Accordingly, only the powered antenna 830 will provide data communication between the transceiver 841 and a respective RFID tag (of a pod). Then, when the controller needs to communicate with another pod (that is associated with antenna 830'), the antenna switch can power-down the antenna 830 (by turning "off" switch 3711) and power-up the antenna 830' (by turning "on" switch 3712). Once powered up, the antenna 830' will then communicate with its respective RFID/pod so as to transfer data between such further pod and the transceiver 841. The antenna switch 900' can be controlled by the controller 350. Thus, data communication lines/wires can be separate vis-à-vis power communication lines/wires. For example, with reference to FIG. 37A, a data line from the transceiver 841 to the antenna 830 can be shared (or in a common communication circuit) with a data line from the transceiver 841 to the antenna 830'. This can be possible since only the antenna that is energized will convey data between such antenna's pod and the transceiver 841. That is, the antenna that is not energized will not transmit data, in accord with this embodiment.

Figure 38:
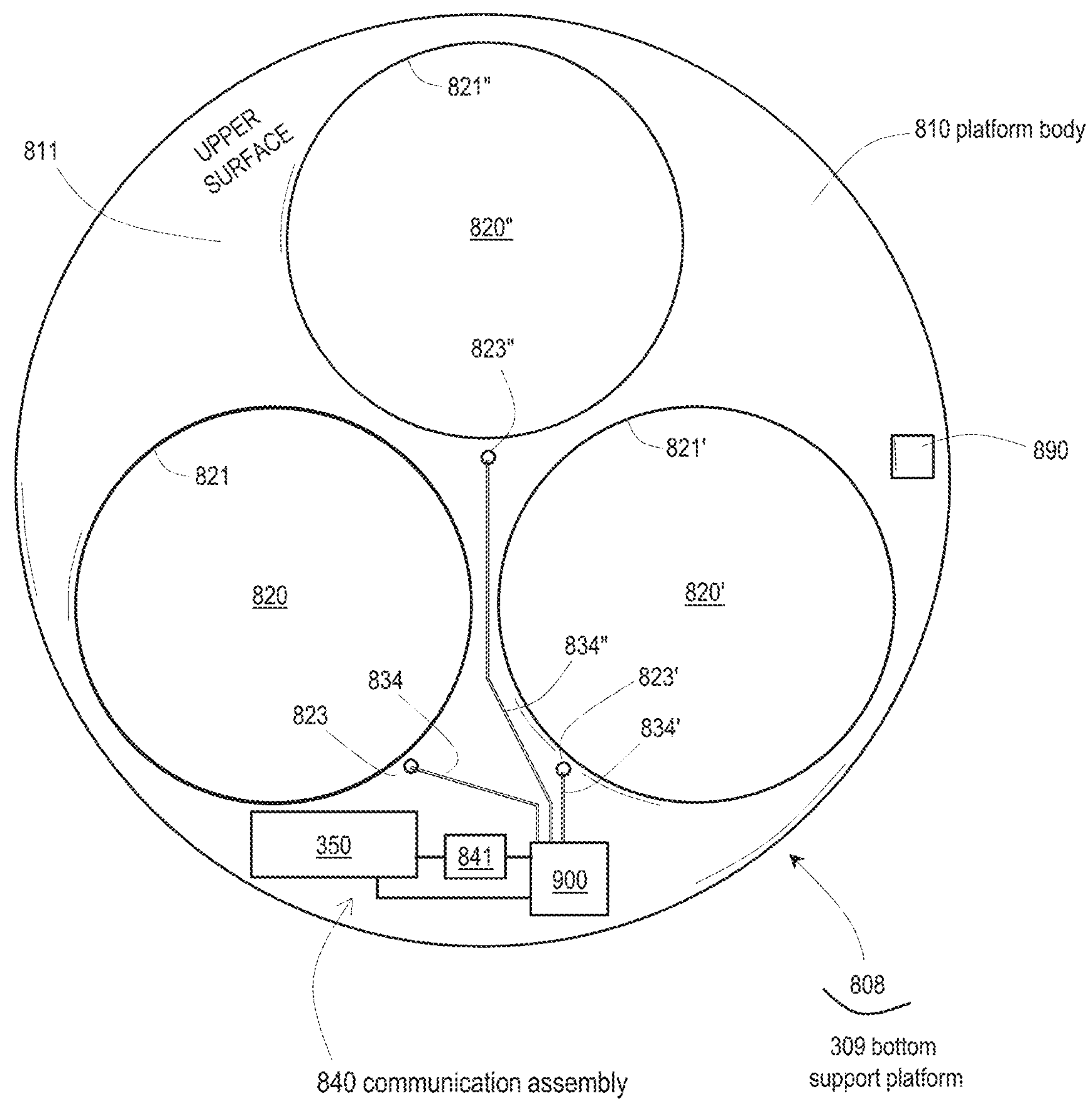
FIG. 38 is a schematic diagram showing further details of the communication assembly 840 mounted on a support platform 808, according to principles of the disclosure.

Accordingly, in an arrangement, a first antenna 830 and a second antenna 830' can be in communication with a transceiver 841. The first antenna can be associated with a first power supply 3721. The second antenna can be associated with a second power supply 3722. The antenna switch 900', i.e. a selection portion, can be controlled, by the controller 350/ACP 360, to selectively energize the antenna 830 with the first power supply 3721 OR energize the antenna 830' with the second power supply 3722. A single power supply or originating power supply or source 3700S can be used—and the antenna switch 900' can control which antenna (830 or 830) is powered by the single power supply 3700S. The antenna (830, 830) that is energized will provide data communication with its RFID, of a pod—whereas the antenna(s) that is not energized will not provide data communication with its RFID/POD. FIG. 38 is a schematic diagram showing further details of the communication assembly 840 mounted on a support platform 808. For example, the support platform 808 might be constituted by the bottom support platform 309 of the beverage apparatus 300. The support platform 808 can be constructed of plastic, metal, or other suitable material. The support platform 808 can be part of the structure of the beverage apparatus 300. The support platform 808 can include a platform body 810. The platform body 810 can include an upper surface 811, as illustrated in FIG. 38.

Various components of the communication assembly 840 can be mounted to the platform body 810, and specifically to the upper surface 811 of the platform body 810. The controller 350, the transceiver 841, and the antenna switch 900 can be mounted to the upper surface 811. Various wires, cables, communication pathways, or other communication elements—including elements 842, 843, 844, 834—can be mounted to or integrated into the platform body 810. As shown in FIG. 38, the connection cable or antenna connection cable 834 can extend between the antenna switch 900 and the antenna 830.

The platform body 810 can include antenna cable holes 823, which can include a first antenna cable hole. The antenna cable holes 823 can also include a second antenna cable hole 823' and a third antenna cable hole 823". The antenna cable holes 823 provide for passage, respectively, of each of the antenna connection cables 834, i.e. so as to extend from the upper surface 811 to each of the antennas 830. The construct of the antenna cable holes 823 can be varied depending on the particular construct of the antenna 830 within the platform body 810. For example, the antenna 830 might be provided on a lower surface 812 of the support platform 808. With such arrangement, the antenna cable holes 823 may be in the form of through apertures that extend through the platform body 810. However, it may be the case that the antenna 830 is indeed embedded into the platform body 810. Accordingly, the antenna cable holes 823 might be in the form of grooves or slots that extend to the antenna 830 and that provide a pathway for the antenna connection cable 834. Further, in some embodiments, the antenna 830 might be disposed on the upper surface 811. In such arrangement, there may not be need for the antenna cable holes 823.

The platform body 810, and other platform bodies or structures of the beverage apparatus, can include one or more receptacle apertures 820. The receptacle apertures 820 can include a first receptacle aperture. The receptacle apertures 820 can include a second receptacle aperture 820' and a third receptacle aperture 820". The receptacle aperture 820 can include an inner edge or wall 821. The second receptacle aperture 820' can include an inner edge or wall 821'. The third receptacle aperture 820" can include an inner edge or wall 821". The receptacle aperture can accommodate a receptacle to retain a pod in such receptacle.

The antenna 830 is shown schematically in FIG. 37, in accordance with at least some embodiments of the disclosure. The antenna 830 can include a spiral configuration. In at least one embodiment, the spiral configuration can extend around all or a portion of the receptacle aperture 820. In other words, the antenna 830 can surround or encompass the inner edge or wall 821 of the receptacle aperture 820. By the arrangement of the antenna 830 encircling the receptacle aperture 820, communication can be provided between the antenna 830 and an RFID tag 410 (of a pod 400 that is disposed in the particular receptacle aperture 820).

In accordance with the disclosure, the particular nature of communication pathways 357 in the beverage apparatus 300 can be varied as desired. Accordingly, while a "cable" may be described as connecting various components, other communication pathways can be utilized as desired. A cable as described herein can include one or more wires and/or other construct so as to provide electrical power or data communication between two connected components. A communication pathway as described herein can include one or more cables, wires and/or other construct so as to provide electrical power or data communication between two connected components.

Figure 39:
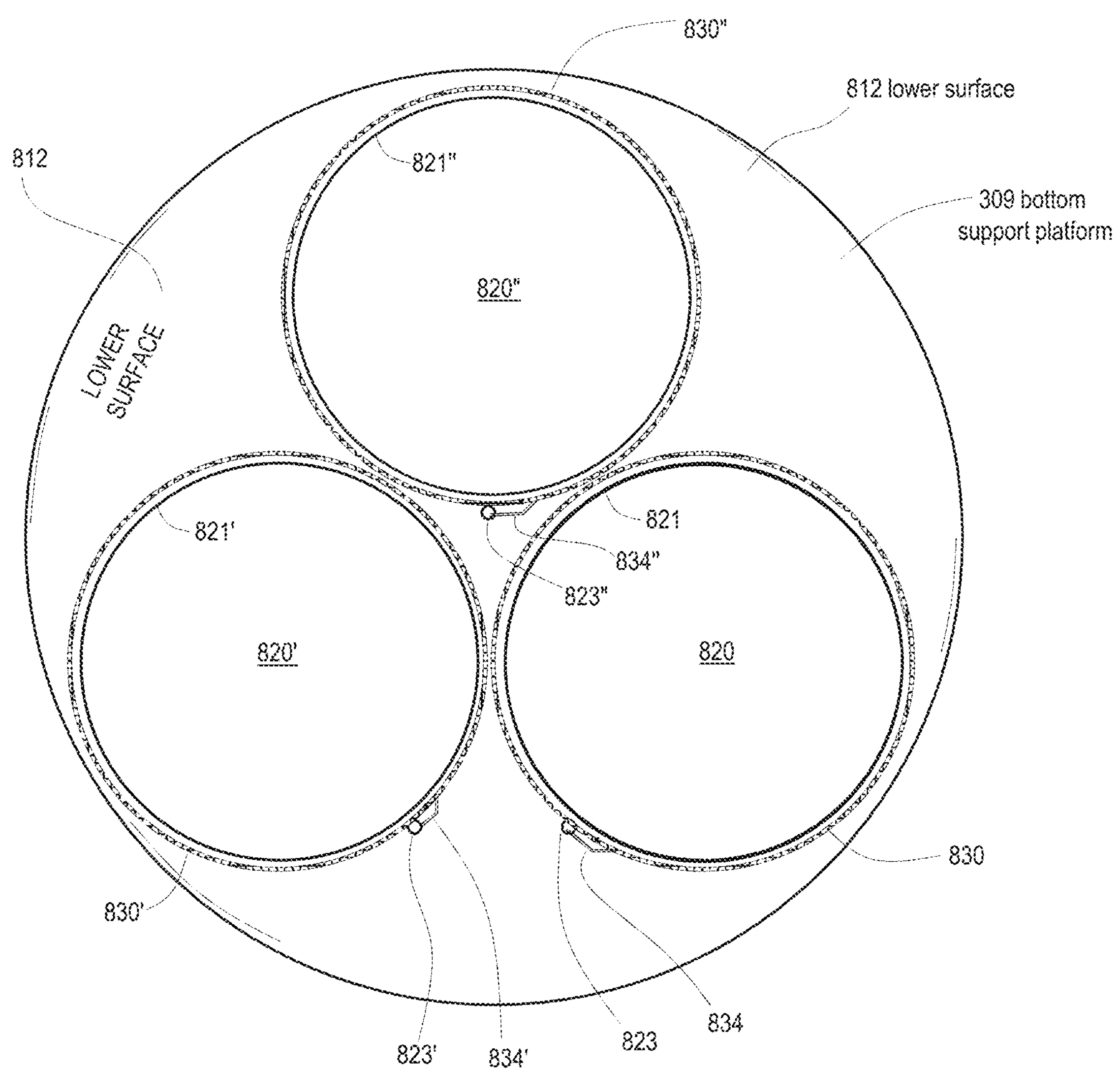
FIG. 39 is a schematic diagram showing details of the communication assembly 840 and support platform 808, according to principles of the disclosure.

FIG. 39 is a schematic diagram showing details of the communication assembly 840 and support platform 808. In particular, FIG. 39 shows a lower surface 812 of the support platform 808. In the embodiment of FIG. 39, the antennas 830 are mounted on the lower surface 812 so as to be visible. However, in other embodiments, the antennas 830 can be embedded into the platform body 810 so that the antennas 830 are not visible. FIG. 39 also shows that antenna connection cables 834 pass through the antenna cable holes 823. The antenna cable holes 823 can include antenna cable holes 823', 823''.

Figure 40:
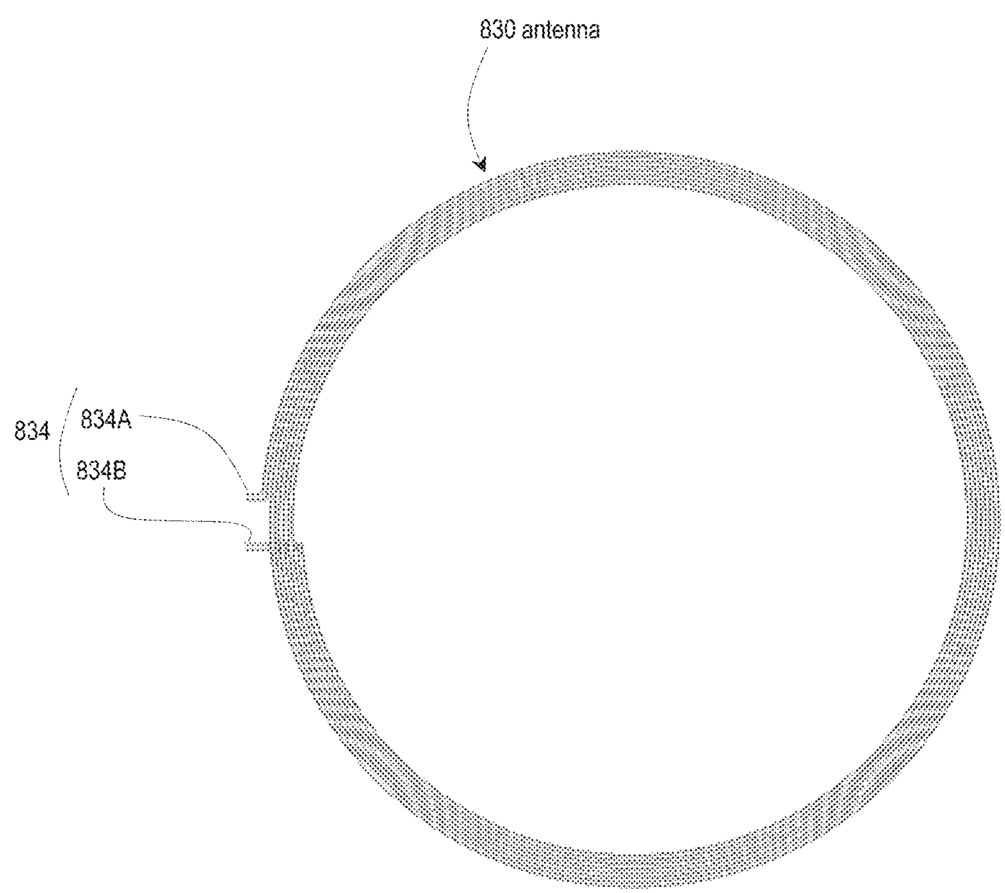
FIG. 40 is a schematic diagram illustrating further details of the antenna 830, according to principles of the disclosure.

FIG. 40 is a schematic diagram illustrating further details of the antenna 830. As described above, the antenna 830 can wrap around or encircle the receptacle aperture 820. The antenna 830 can be constructed of multiple windings or loops. The antenna 830 can be connected to the antenna switch 900 via antenna connection cables 834. The antenna connection cables 834 can include a first wire 834A and a second wire 834B. Each of the first wire 834A and the second wire 834B can be in connection with the antenna switch 900—so as to selectively provide for the exchange of data between the antenna 830 and the transceiver 841, via the antenna switch 900. The antenna 830 can wrap around or encircle the receptacle aperture 820 completely or some desired amount such as 90% around, 80% around or some other amount as may be desired. As described above, the antenna switch 900 can control which antenna 830 the transceiver 841 is connected to. In a first disposition of the antenna switch 900, the transceiver 841 may be connected to a first antenna 830 and only two such first antenna 830. In a second disposition of the antenna switch 900, the transceiver 841 may be connected only to the second antenna 830'. In a third disposition of the antenna switch 900, the transceiver 841 may be connected only to the third antenna 830''.

Figure 41:
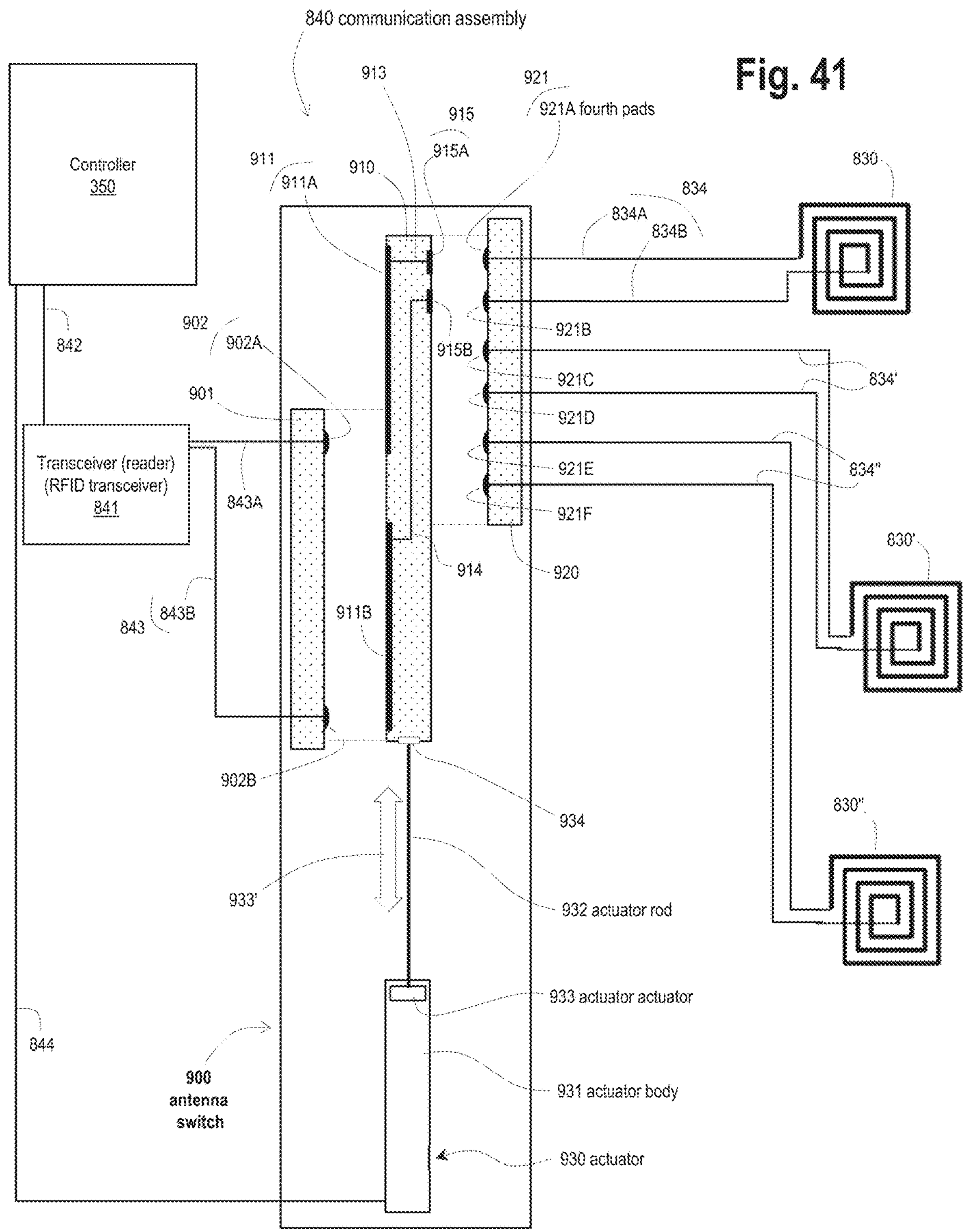
FIG. 41 is a schematic diagram showing further details of the communication assembly 840, according to principles of the disclosure.

FIG. 41 is a schematic diagram showing further details of the communication assembly 840, in accordance with at least some embodiments of the disclosure. In particular, FIG. 41 shows details of an antenna switch 900. The antenna switch 900 of FIG. 41 is a physical switch. Such physical switch has moving parts so as to control which antenna 830 is connected to the transceiver 841. In other embodiments, as described below other technology can be utilized so as to control which antenna 830 is connected to the transceiver 841.

As shown in FIG. 41, the antenna switch 900 can include what can be described as a moving board 910. The moving board 910 can be controlled by an actuator 930. The actuator 930 can include an actuator body 931. The actuator 930 can include an actuator element 933. The actuator element 933 can be controlled by the controller 350, so as to reciprocate within the actuator body 931. The actuator element 933 can be connected to an actuator rod 932. The actuator rod 932 can be connected to the moving board 910 at a moving board connection 934. The actuator rod 932 can reciprocate back and forth, i.e. up and down as illustrated by arrow 933'. By control of the controller 350, the actuator rod 932 can be positioned at a desired location in a "range" of reciprocation.

The actuator itself 930 can use known technology so as to provide reciprocation. The actuator 930 can include or be in the form of a solenoid that utilizes an electromagnet arrangement so as to control position of the actuator element 933. For example, the actuator element 933 can include a plunger that is disposed within one or more coils in the actuator body 931. Energization of such coils can be selectively performed so as to control the position of the actuator element 933. Other arrangements can be utilized so as to provide reciprocation of the actuator element 933. For example, a rack and pinion arrangement might be utilized. For example, the actuator element 933 can include a rack of gears. The actuator body 931 can include a pinion gear, driven by a motor, that engages with the rack of gears. The controller 350 can control rotation of the pinion gear by control of the motor—and as a result, control reciprocation of the actuator element 933. Other mechanical arrangements can be utilized such that the controller 350 can control reciprocation of the actuator element 933. Accordingly, such control of the actuator element 933 provides control of reciprocation of the actuator rod 932 and the moving board 910.

As shown in FIG. 41, the communication assembly 840 includes a transceiver cable board 901, the moving board 910, and an antenna cable board 920. Each of the boards 901, 910, 920 can be constructed of insulating material.

The transceiver cable board 901 includes conductive pads. The conductive pads on the transceiver cable board 901 can include first pads 902. The first pads 902 can include pad 902A and pad 902B. The pad 902A can be connected to the transceiver via cable 843A. The pad 902B can be connected to the transceiver via cable 843B.

The moving board 910 can also be provided with conductive pads. The moving board 910 on a left side as shown in FIG. 41, can include second pads 911. The second pads 911 can include pad 911A and pad 911B. The moving board on the right side as shown in FIG. 41 can include third pads 915. The third pads 915 can include pad 915A and pad 915B. The pad 911B can be connected (and in electrical communication) to the pad 915B via an internal wire 914. The pad 911A can be connected (and in electrical communication) to the pad 915B via an internal wire 913.

The antenna cable board 920 can also be provided with conductive pads. The conductive pads of the antenna cable board 920 can include fourth pads 921. The fourth pads 921 can include pad 921A and pad 921B. The pad 921A can be connected to the antenna 830 via wire 834A. The pad 921B can be connected to the antenna 830 via wire 834B. As shown in FIG. 41, the antenna switch 900 is shown as an exploded view. That is, FIG. 41 shows the boards 901, 910, and 920 separated for purposes of illustration and clarity. Accordingly, in operation of the antenna switch 900, the first pads 902 can be positioned so as to be in contact with the second pads 911. As shown in FIG. 41, the first pads 902 will maintain contact with the second pads 911, respectively, regardless of the reciprocation or travel position of the moving board 910. That is, regardless of the reciprocation position of the moving board, the pad 902A will be in contact with the pad 911A, and also the pad 902B will be in contact with the pad 911B. Further, the pads 911 and 902 can be constructed of material such that the pads may slide easily relative to each other.

In operation of the antenna switch 900, the third pads 915 can be positioned so as to be in contact with a selected pair of the fourth pads 921. That is, in the particular reciprocation position of FIG. 41, the pad 915A will be in contact with the pad 921A. The pad 915B will be in contact with the pad 921B. As a result, the transceiver 941 will be in electrical contact with the antenna 830. Accordingly, the transceiver 941 can input and output data to the antenna 830, as well as to energize the antenna 830.

As shown in FIG. 41, the moving board 910 can move downwardly from the position illustrated. Accordingly, as the moving board 910 moves downwardly, contact between the third pads 915 and the pads 921A and 921B will be lost. In other words, the third pads 915 will, respectively, no longer be aligned the pads 921A and 921B. Accordingly, the transceiver 841 will no longer be in contact with the antenna 830.

As the moving board 910 moves downwardly, the third pads 915 will selectively be in contact with pairs of the fourth pads 921 that are connected to either second antenna 830' or third antenna 830". Accordingly, based on position of the moving board 910 as it reciprocates up and down as shown in FIG. 41, the controller 350 can control which antenna the transceiver 841 is connected to. Accordingly, upon the moving board 910 being positioned in a lower position, the third pads 915 will be connected to the third antenna 830". More specifically, the pad 915A will be connected to the pad 921E. The pad 915B will be connected to the pad 921F. Accordingly, connection between the transceiver 841 and the third antenna 830" will be provided. Accordingly, the moving board 910 can be reciprocated as desired so as to connect the transceiver 841 with the desired antenna 830. Thus, the third pads 915A, 915B can also be selectively connected to the pads 921C, 921D, respectively.

The antenna switch 900 of FIG. 41 is a physical switch—in that the antenna switch 900 utilizes moving parts so as to control which antenna 830 the transceiver 841 is connected to. In embodiments, other mechanisms can be utilized so as to control which antenna 830 is connected to the transceiver 841. For example, solid-state technology can be utilized in such arrangement. For example, respective electrical pathways between the transceiver 841 and each antenna can include materials that constrain or prevent the flow of electricity and/or data. For example, respective electrical pathways between the transceiver 841 can include one or more MOSFETs (Metal Oxide Semiconductor Field Effect Transistor). The controller 350 can control the MOSFET so as to control the electrical flow, through the various pathways, between the transceiver 841 and the antennas 830. Other arrangements can be utilized so as to selectively connect the transceiver 841 to an antenna 830 as desired.

FIG. 42 is a flowchart showing additive vessel processing, in accordance with at least one embodiment of the disclosure. More specifically, FIG. 42 illustrates processing that can be used to selectively provide communication between the transceiver 841 and an antenna 330.

As shown in FIG. 42, the process starts in step 770 and passes to step 771. In step 771, the controller 350 identifies that base cover 317 has been placed upon the dispensing assembly (from a removed disposition). As reflected at 771', other events could be identified by the controller to initiate processing. Then in step 772, the controller assigns variable: Antenna#<==1. Then, in step 773, the controller controls the antenna switch 900 to change setting to Antenna [Antenna#], so as to dictate which antenna the transceiver 841 communicates with.

Then, in step 774, the controller interfaces with the transceiver to input data from the transceiver (i.e. processing is performed to interrogate the vessel, via the transceiver, that is in communication with the connected antenna). Then, the process passes to step 775. In step 775, the controller assigns variable: Antenna#<==(Antenna# +1). Then, the controller determines if Antenna# >3. If no, the process passes back to step 773. As reflected at 778, such processing indicates that there is a further pod to interrogate and the controller advances to interrogate the next vessel in sequence. On the other hand, a yes may be rendered in step 776. Such reflects that all the vessels have been interrogated (777). Accordingly, the process passes to step 777', and the process ends. As reflected at 774' of FIG. 42, in step 774, the transceiver 841 performs processing to interface with the currently connected antenna (and the particular pod/tag to which such antenna is in communication). In such processing, subroutine 780 of FIG. 43 can be performed by the transceiver.

Accordingly, FIG. 43 is a flowchart showing processing in which the transceiver performs processing to interface with the currently connected antenna (and the particular pod/tag to which such antenna is in communication). The process starts in step 780 and passes to step 782. In step 782, the transceiver attempts to interface with the vessel (via the currently connected transceiver antenna). A determination is made of whether the interface was successful. If no, then the process passes to step 784. In step 784, transceiver generates data indicating that current vessel "not found" and outputs such data to the controller and/or outputs a communication to user.

On the other hand, a yes may be rendered in step 782. Accordingly, the process passes to step 783. In step 783, the transceiver generates data indicating that current vessel "found" and communicates same to the controller. Then, in step 785, the controller performs vessel interface processing for the vessel that is currently energized (i.e. data is passed between the controller and the tag antenna (via the transceiver and switch). In such processing, the subroutines of step 512 (FIG. 25) can be called upon, for example. Accordingly, data can be transferred between the controller and the tag of the vessel/pod. The tag can be an RFID tag. Then, in step 786, the controller determines if interrogation of the current vessel or pod is complete. Once complete, i.e. yes, the process passes to step 787. In step 787, the process returns to FIG. 42 (step 775 of FIG. 42).

To describe related features further, the beverage apparatus 300 can include a transceiver 841 and a selection portion (or antenna switch), such as the antenna switch 900 shown in FIG. 37. The beverage apparatus/bottle can include a first antenna 830 and a second antenna 830'.

A first electronic tag 410 (see FIG. 18 and FIG. 23) can be disposed on a first pod, and the first electronic tag can be an RFID tag. The first electronic tag 410 can include a first tag antenna 412 that interfaces with the first antenna 830. A second electronic tag 410 can be disposed on a second pod, and the second electronic tag 410 can be a further RFID tag. The second electronic tag 410 can include a second tag antenna 412 that interfaces with the second antenna 830' (FIG. 37).

The selection portion 900, e.g. antenna switch 900, can perform processing including performing in sequence or selectively: (a) energizing the first antenna 830 to provide communication, including downloading or transmitting data, with the first electronic tag via the first antenna 830 generating a carrier wave that energizes the first electronic tag; and (b) energizing the second antenna 830' to provide communication, including downloading or transmitting data, with the second electronic tag via the second antenna 830' generating a further carrier wave that energizes the second electronic tag of the second pod or vessel. Thus, data can be transmitted between the transceiver 841 and an RFID tag of a pod. Accordingly, the particular pod that the transceiver 841 communicates with can depend on the antenna 830/antenna 412 pair that is energized. The selection portion 900 can be controlled by a controller of the beverage apparatus.

To describe further, in some embodiments of the disclosure, neither an RFID tag (on a pod or vessel) nor an antenna of the RFID tag is provided with its own power source. For example, the RFID tag 410 and antenna 412, shown in FIG. 23, may not be provided with a power source. Rather, the antenna 412 of the RFID tag (and RFID tag) can be energized by an energy wave, such energy wave being generated by an antenna 830 (FIG. 37) of the bottle/beverage apparatus. The energy wave can be a carrier wave. Thus, an antenna 412 of the RFID tag 410 (on a pod) can be powered by the energy wave or carrier wave emitted by the antenna 830, for example. In other words, the RFID tag 410 can be passive. However, it is appreciated that in other embodiments the RFID tag on the pod/vessel and the antenna of the RFID tag can be powered. That is, an RFID tag, which is mounted on a pod, can be active. An RFID tag that is powered may be larger in size and more costly than an RFID tag that is not powered.

Known RFID technology can be utilized in the embodiments described herein, such as known technology can be used to afford the communication or communication protocol between two communicating antennas that communicate using RFID technology or other communication technology.

According to principles of the disclosure, processing can be performed so as to limit or constrain data transmission between a receiver 841 and an antenna 830. In accordance with at least one embodiment of the disclosure, the controller 350 can detect and communicate with a tag (on a vessel) only when the pod is fully inserted into the particular receptacle or bay. Accordingly, processing may be provided to reject tags that are placed in nearby (radial distance) or tags are not fully inserted (exile distance).

Figure 44:
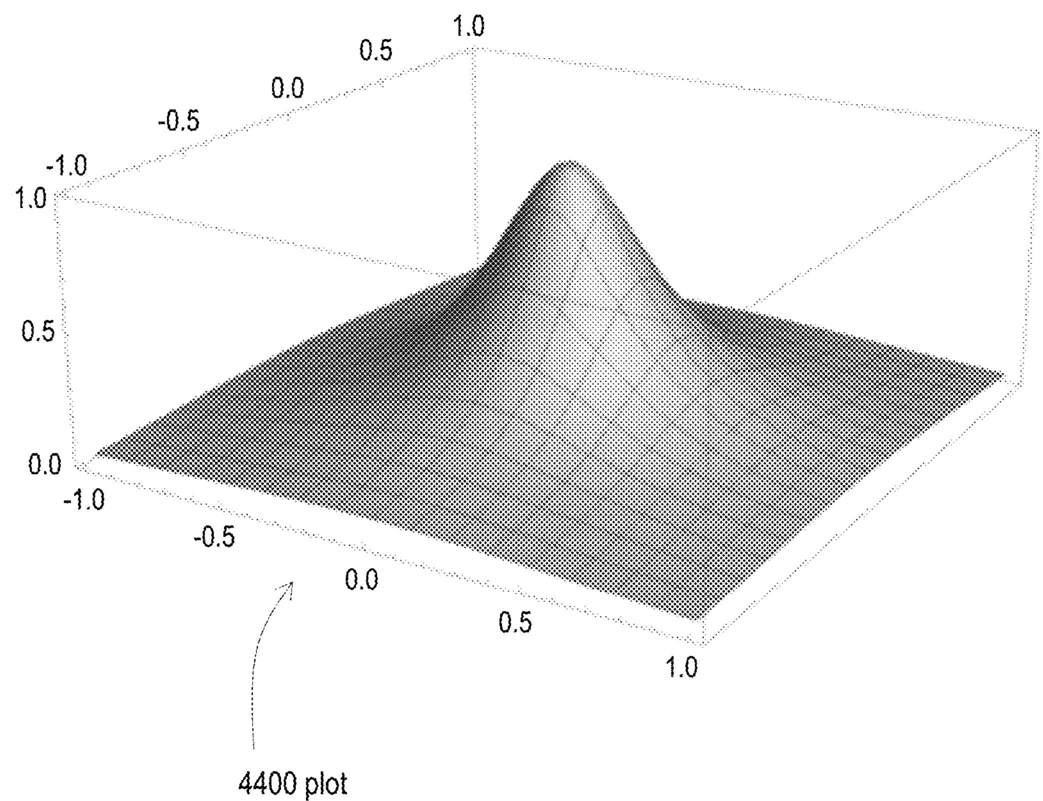
FIG. 44 is a diagram illustrating signal strength as it relates to radial distance, according to principles of the disclosure.
Figure 45:
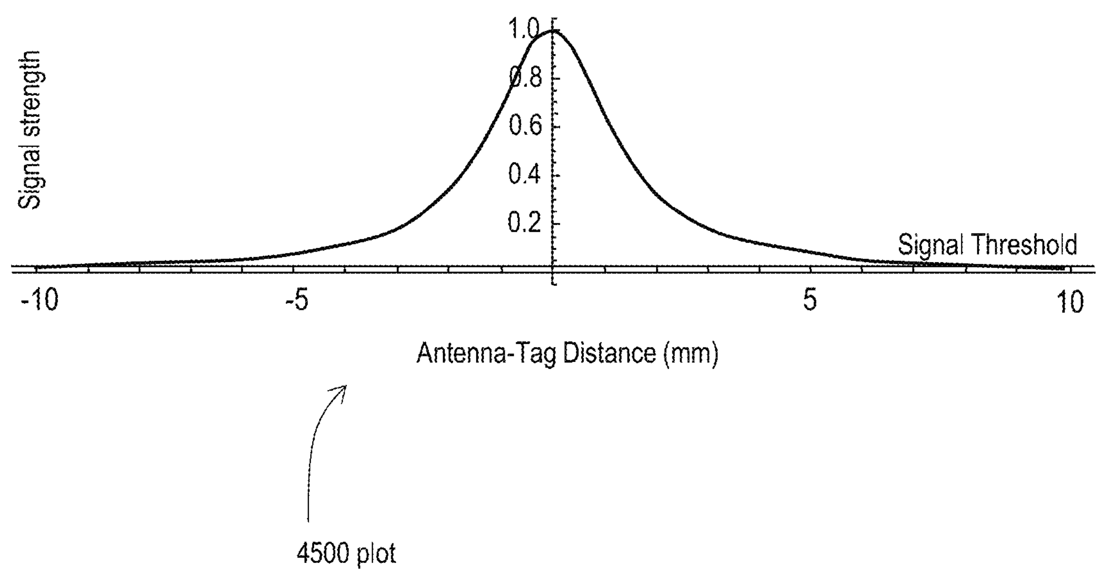
FIG. 45 is a diagram illustrating signal strength as it relates to axial distance, according to principles of the disclosure.

In accordance with an aspect of the processing, signal strength between the transceiver 841 and the antenna 830 can fall off or reduce notably as the tag moves from the center of the antenna in some arrangements. An approximation of this effect is shown in the plot 4400 of FIG. 44. That is, FIG. 44 is a diagram illustrating signal strength as it relates to radial distance. For example, with a particular arrangement, a tag can be rejected beyond a 2-3 mm from center position. The graph 4400 is for purposes of illustration and it should be appreciated that the magnitude of parameters and particular shape will vary depending on the particular geometry of the bottle, for example. Accordingly, FIG. 44 illustrates signal strength effect based on radial distance. There can be a similar effect with axial distance. FIG. 45 is a diagram illustrating signal strength as it relates to axial distance. In the plot 4500, of FIG. 45, distance 0 corresponds to the antenna plane, negative values are inside the unit (bottle), and positive values extend outward from the base. As illustrated by the plot 4400 and the plot 4500, signal strength can vary based on position of a pod and attached RFID tag vis-à-vis the structure of the beverage apparatus or bottle. Accordingly, attributes of the signal strength can be utilized by the controller 350 and/or transceiver 841 so as to limit transmission between an RFID tag of a pod and the transceiver/controller. For example, once the signal strength falls below some predetermined threshold, communication between the transceiver and the RFID tag of the pod can be disabled. Other attributes of the communication between the transceiver and the RFID tag of the pod can also be utilized. For example, gain attributes and signal strength of communications with the RFID tag can be utilized so as to require particular attributes, i.e. in that such particular attributes can be indicative of a properly positioned pod within the beverage apparatus.

In various processing described herein and illustrated by flowcharts or otherwise described, variables can be used in various processes. Such processes can include routines, subroutines, and steps, for example. The various variables can be passed between processes as may be needed in accord with the instructions provided to the ACP (apparatus computer processor). The various variables can be global variables that are available to the various processes, such as between a calling process and a subroutine, for example.

In accordance with one or more embodiments, a linear capacitive sensing strip, or other liquid level reader may be mounted within or adjacent to the chamber 316 of the beverage apparatus or bottle 300 within which a consumable liquid may be stored (e.g., retained, contained, etc.). The linear capacitive sensing strip, or other liquid level reader may be configured to determine the level, volume, or quantity (e.g., the amount) of liquid consumable in the bottle 300 at any given time. As such, data about the consumable liquid in the chamber 316 of the bottle 300 may be collected, analyzed, and/or communicated by the bottle 300 (e.g., by a processor and/or other components of the bottle 300), and made available to one or more user devices 106, storage systems or networks and the like. Related features are described in U.S. Publication 2016/0159632, now U.S. Pat. No. 9,932,217, which is incorporated herein by reference in its entirety. Such referenced (patent) is also referenced above. Features as described herein may be used in conjunction with the features described in such U.S. Pat. No. 9,932,217.

Hereinafter, illustrative processing particulars are described. Such particulars are for purposes of illustration and may be varied as desired. One dispense can correspond to 1 full reciprocation, up and down, of the piston 405-390 for example, resulting in a dispense of 1 mL, for example. To control the dispense amount, the ACP can vary travel distance of the reciprocation of the piston 405-390 and/or vary the number of reciprocations of the piston, i.e. the reciprocation(s) up and down of the vessel or pod 400. A dispense command can take on various forms such as a predetermined dispense amount in mL that the ACP translates into movement of the piston, a number of dispenses that the ACP translates into number of reciprocations, a set number of reciprocations to be performed, a mass of liquid to dispense that the ACP translate into reciprocations of the piston, etc. Dispense processing can be "open loop" meaning that the action as controlled by the ACP is independent of the actual output (although the action performed is crafted to generate a particular dispense amount). For example, one reciprocation of the piston down and up can be expected to generate a dispense of 1 mL. Dispense processing can be "closed loop" meaning that the action, as controlled by the ACP, is monitored by a sensor or feedback mechanism. For example, current required to perform the dispense can be monitored—and observed current can be mapped into a corresponding dispense amount. Alternatively, position of the plunger 409 in the pod can be monitored, such as by a light source/sensor that is positioned so as to detect position of the plunger. If feedback reveals that the desired dispense wasn't obtained, further dispense can be performed. Position of the plunger 409 can directly correspond to additive dispensed from the pod. For example, the mass of a pod empty can be 12 grams (g). The volume of additive in the pod can be 30 mL. The density of the additive can be 1.02 g/mL. Accordingly, the mass of the additive (in a full pod) can be 29.4 g. The additive can be dispensed based on an assumption that 1 mL (milliliter) of additive will be dispensed by one reciprocation of piston 405-390. The "additive" in the pods can also be referred to as "concentrate". The density of the additive may be greater than water or less than water, depending on the content of the additive/concentrate.

Various patterns or schemes can be utilized such that the user can effectively communicate with the beverage apparatus 300, as may be desired. For example, one push of a particular button could dictate to the beverage apparatus 300 that one additive should be released, where as two quick pushes of the particular button could dictate that another additive be dispensed. A push of a button and hold of that same button could also be input by the controller, of the beverage apparatus, and dictate that a dispense should be performed.

Teachings of the incorporated by reference patent applications regarding user interface can be utilized in conjunction with the teachings described herein. Other features of the above incorporated patent applications can also be utilized in conjunction with the teachings described herein.

In embodiments of the disclosure, a computer processor of the beverage apparatus 300 may provide information to the user regarding metrics associated with additives or other operation of the beverage apparatus 300.

As described above, the beverage apparatus of the disclosure can include one or more sensors to detect relative position of components of the beverage apparatus. For example, a Hall effect sensor in conjunction with one or more magnets can be used to detect whether or not the base cover 317 is on the dispensing assembly 318. That is, a magnet may be provided in the base cover 317 and a Hall effect sensor provided in the dispensing assembly 318, so as to sense proximity of the base cover 317.

As used herein, the indicia <== has been used to denote that a variable is assigned or "gets" a particular value. As used herein, the indicia • has been used to indicate a multiplication operation—for example, 2·3=6. Also, the symbol×has been used to indicate a multiplication operation, for example, 2×3=6.

As described herein, the vessel or pod 400 can be provided with an RFID tag 410 and the ACP 360 can communicate with the RFID tag via a transceiver or transceiver assembly 340, for example. However, it should be appreciated that other communication technologies, protocols or communication channels may be used as desired. As described herein, a receptacle 390, pod 400, and other structure can extend though one or more platforms, such as the platforms 308 and 309 shown in FIG. 22. Accordingly, suitable apertures or openings may be provided in such platforms so as to accommodate.

As described herein, the tag or RFID tag 410 can contain a wide variety of data. The transceiver 340 can input data from the RFID tag and output data to the RFID tag. The RFID tag, or other data memory of the vessel 400, can provide a data representation of a physical instance of the pod (to which the RFID tag is attached) and can provide a data representation of a physical instance of the bottle or beverage apparatus 300. Accordingly, an event that is observed by the ACP 360, via sensors or other input, can be saved to the memory of the pod and/or to the apparatus database portion 370. For example, various historical data regarding use of the bottle and consumption of a user may be written in data form to the memory of the pod and/or to the apparatus database portion 370. Accordingly, a log or record may be saved and maintained.

Features as disclose herein may be described in context of particular units or dimensions. It is appreciated that alternative units or dimensions can be used as desired. Additionally, conversion can be performed between units or dimensions as may be desired. For example, processing is described herein as using units of degrees, such as 148°. Other units can be used, such as radians, for example.

As described above, the apparatus controller 350 can include an apparatus computer processor (ACP) 360. The ACP 360 may also be described as an apparatus processing portion (APP) 360, a computer processor portion (CPP) 360, a computer processing portion (CPP) 360, or similar language. The ACP 360 can include or be in the form of a central processing unit (CPU).

In this disclosure, quotation marks, such as with "pod mass adjustment", have been used to enhance readability and/or to parse out a term or phrase for clarity.

All documents referenced herein are hereby incorporated by reference in their entirety.

The terms dispersion, dispensing, dispense, and other similar terms have been used herein to convey manipulation of a liquid or other material.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It is appreciated that the various components of embodiments of the disclosure may be made from any of a variety of materials including, for example, plastic, plastic resin, nylon, composite material, foam, rubber, wood, metal, and/or ceramic, for example, or any other material as may be desired.

A variety of production techniques may be used to make the apparatuses as described herein. For example, suitable injection molding and other molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner, such as with suitable adhesive and/or heat bonding.

The various apparatuses and components of the apparatuses, as described herein, may be provided in various sizes and/or dimensions, as desired.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; and similar language.

As used herein, the term "and/or" includes any and all combinations of one or more of the associated listed items. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially relative terms are intended to encompass different orientations of structures in use or operation, in addition to the orientation depicted in the drawing figures. For example, if a device or apparatus in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

As otherwise described herein, it is appreciated that a feature of one embodiment of the disclosure as described herein may be used in conjunction with features of one or more other embodiments as may be desired.

As used herein, "data" and "information" have been used interchangeably.

Any motorized structure or other mechanical structure as described herein may utilize gears, linkages, sprocket with chain, or other known mechanical arrangement so as to transfer requisite motion and/or energy.

Hereinafter, further aspects of implementation of the systems and methods of the disclosure will be described.

As described herein, at least some embodiments of the system of the disclosure and various processes, of embodiments, are described as being performed by one or more computer processors, i.e. processors. Such one or more computer processors may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be described as a program, software program, code or simply software.

As noted above, the processing machine, which may be constituted, for example, by the particular system and/or systems described above, can execute the instructions that are stored in the memory or memories to process data. This processing of data may be in response to commands by a user or users of the processing machine, in response to previous processing, in response to a request by another processing machine and/or any other input, for example. As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices, or apparatus that is capable of implementing the steps of the processes of the disclosure.

The processing machine used to implement the disclosure may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the disclosure as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing is described above can be performed by various components and various memories. However, it is appreciated that the processing performed by two distinct components as described above may, in accordance with a further embodiment of the disclosure, be performed by a single component. Further, the processing performed by one distinct component as described above may be performed by two distinct components. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

A set of instructions can be used, in the processing as described herein, on a processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of apparatus of the disclosure may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the systems and methods of the disclosure. Rather, any number of different programming languages may be utilized as is necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, the disclosure may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in practice of the disclosure may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure. Further, the memory or memories used in the processing machine that implements the disclosure may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the disclosure, a variety of "user interfaces" may be utilized to allow a user to interface with the processing machine or machines that are used to implement the disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton, light, or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface can be utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of an apparatus of the disclosure might interact, i.e., convey and receive information, with another processing machine, rather than a human user. Accordingly, the other processing machine might be described as a user. Further, it is contemplated that a user interface utilized in the systems and methods of the disclosure may interact partially with another processing machine or processing machines, while also interacting partially with a human user.

Features are disclosed in the following disclosure.

According to principles of the disclosure, in an embodiment 1A, a beverage apparatus can be hand-holdable by a user of the beverage apparatus to be portable, and the beverage apparatus can comprise: (A) a beverage chamber housing that includes a chamber, and the chamber storing a consumable liquid in the chamber; (B) a dispensing assembly that includes a first receptacle and second receptacle, and (a) the first receptacle for retaining a first vessel, and the first vessel including a first electronic tag and containing a first additive, (b) the second receptacle for retaining a second vessel, and the second vessel including a second electronic tag and containing a second additive; and (c) the dispensing assembly operatively controllable by a controller to (a) output the first additive from the first vessel into the consumable liquid, and (b) output the second additive from the second vessel into the consumable liquid; (C) an apparatus computer processor (ACP); (D) an apparatus database portion that includes instructions that are performed by the ACP in operation of the beverage apparatus; (E) a first antenna that is associated with the first receptacle, and the first antenna for transferring data with the first electronic tag; (F) a second antenna that is associated with the second receptacle, and the second antenna for transferring data with the second electronic tag; (G) a transceiver that performs processing of data, and the transceiver in communication with the ACP; and the processing of data including: (a) the transceiver communicating with the first antenna to transfer data with the second antenna, and (b) the transceiver communicating with the first antenna to transfer data with the second antenna, and (H) an antenna switch controllable to selectively connect the transceiver to (a) the first antenna for the ACP to transfer data with the first antenna, and (b) the second antenna for the ACP to transfer data with the second antenna.

An embodiment 2A can include the features of the embodiment 1A in which the antenna switch being controllable includes the antenna switch being controllable by the ACP to selectively connect the transceiver to the first antenna and the second antenna.

An embodiment 3A can include the features of the embodiment 2A in which the ACP being wired to the antenna switch to provide communication between the ACP and the antenna switch.

An embodiment 4A can include the features of the embodiment 1A in which further including a support platform, and the support platform supporting the first antenna and the second antenna.

An embodiment 5A can include the features of the embodiment 4A in which the antenna switch wired to the first antenna, and the antenna switch wired to the second antenna.

An embodiment 6A can include the features of the embodiment 4A in which the first antenna includes a first loop structure that is in the shape of a loop, and the second antenna includes a second loop structure that is in the shape of a loop.

An embodiment 7A can include the features of the embodiment 6A in which the support platform including: (a) a first receptacle aperture for supporting the first receptacle, the first antenna positioned about the first receptacle aperture, and (b) a second receptacle aperture for supporting the second receptacle, the second antenna positioned about the second receptacle aperture.

An embodiment 8A can include the features of the embodiment 7A in which the first antenna positioned about the first receptacle aperture including the first loop structure, of the first antenna, substantially encircling the first receptacle aperture; and (a) the second antenna positioned about the second receptacle aperture including the second loop structure, of the second antenna, substantially encircling the second receptacle aperture.

An embodiment 9A can include the features of the embodiment 8A in which the first antenna at least 80% encircling the first receptacle aperture, and the second antenna at least 80% encircling the second receptacle aperture.

An embodiment 10A can include the features of the embodiment 9A in which the first antenna concentric with the first receptacle aperture; and the second antenna concentric with the second receptacle aperture.

An embodiment 11A can include the features of the embodiment 1A in which the transceiver includes an RFID transceiver.

An embodiment 12A can include the features of the embodiment 1A in which beverage apparatus further including the first vessel and the second vessel.

An embodiment 13A can include the features of the embodiment 1A in which the dispensing assembly including: (a) a first valve associated with the first receptacle, and the first additive being dispensed into the consumable liquid through the first valve; and (b) a second valve associated with the second receptacle, and the second additive being dispensed into the consumable liquid through the second valve.

An embodiment 14A can include the features of the embodiment 13A in which the first valve is a one-way valve, and the second valve is a one-way valve.

An embodiment 15A can include the features of the embodiment 1A in which the beverage apparatus further including a third receptacle for retaining a third vessel that contains a third additive.

According to principles of the disclosure, in an embodiment 1B, a beverage apparatus can be hand-holdable by a user of the beverage apparatus so as to be portable, and the beverage apparatus can comprise: (A) a beverage chamber housing that includes a chamber, and the chamber storing a consumable liquid in the chamber; (B) a dispensing assembly that includes a first receptacle and second receptacle, (C) a first vessel that includes a first electronic tag and contains a first additive, and the first receptacle retaining the first vessel, and (D) a second vessel that includes a second electronic tag and contains a second additive, and the second receptacle retaining the second vessel; and the dispensing assembly operatively controllable by a controller to (a) output the first additive from the first vessel into the consumable liquid, and (b) output the second additive from the second vessel into the consumable liquid; (E) an apparatus computer processor (ACP); (F) an apparatus database portion that includes instructions that are performed by the ACP in operation of the beverage apparatus; (G) a first antenna that is associated with the first receptacle, and the first antenna for transferring data with the first electronic tag; (H) a second antenna that is associated with the second receptacle, and the second antenna for transferring data with the second electronic tag; (I) a transceiver that performs processing of data, and the transceiver in communication with the ACP; and the processing of data including: (a) the transceiver interfacing with the first antenna to provide first data transfer, and (b) the transceiver interfacing with the second antenna to provide second data transfer, and (J) a selection portion that performs controlling to control (a) the first data transfer, and (b) the second data transfer.

An embodiment 2B can include the features of the embodiment 1B in which the controlling performed by the selection portion including: (a) energizing the first antenna to provide communication, via the transceiver and first antenna, between the ACP and the first electronic tag; and (b) energizing the second antenna to provide communication, via the transceiver and second antenna, between the ACP and the second electronic tag.

An embodiment 3B can include the features of the embodiment 2B in which the energizing the first antenna is performed at a different time than the energizing the second antenna.

An embodiment 4B can include the features of the embodiment 2B in which the controlling including the selection portion toggling between energizing the first antenna and energizing the second antenna, so as to mutually exclusively energize the first antenna and the second antenna.

An embodiment 5B can include the features of the embodiment 4B in which the ACP interfaces with the selection portion to perform the controlling, such that that the ACP controls whether the first antenna or the second antenna is energized.

An embodiment 6B can include the features of the embodiment 1B in which the first antenna and the second antenna are in a common communication circuit with the transceiver such that the first antenna and the second antenna share the common communication circuit; and (a) the first antenna is associated with a first power supply; (b) the second antenna is associated with a second power supply; and (c) the selection portion is controlled, by the ACP, to selectively energize the first power supply or the second power supply, so as to selectively select either the first antenna or the second antenna to provide communication.

An embodiment 7B can include the features of the embodiment 6B in which the selection portion toggles between energizing the first power supply and the second power supply from a power source.

An embodiment 8B can include the features of the embodiment 1B in which the first electronic tag is an RFID tag, and the first electronic tag includes a first tag antenna that interfaces with the first antenna; and the second electronic tag is a further RFID tag, and the second electronic tag includes a second tag antenna that interfaces with the second antenna.

An embodiment 9B can include the features of the embodiment 1B in which the first antenna is circular in shape, and the second antenna is circular in shape.

An embodiment 10B can include the features of the embodiment 8B in which the first antenna substantially surrounds the first vessel and the second antenna substantially surrounds the second vessel.

An embodiment 11B can include the features of the embodiment 1B in which the selection portion performing processing including observing that a physical event has occurred with the beverage apparatus and, based on the observing, performing in sequence: (a) energizing the first antenna to provide communication, including downloading data, with the first electronic tag; and (b) energizing the second antenna to provide communication, including downloading data, with the second electronic tag.

An embodiment 12B can include the features of the embodiment 11B in which wherein the beverage apparatus includes a base cover that is removably attached to a remainder of the beverage housing, and the base cover is removable by the user to insert the first vessel and the second vessel; and the physical event includes at least one selected from the group consisting of: (a) the base cover being removed, and (b) the base cover being placed upon the beverage housing.

An embodiment 13B can include the features of the embodiment 12B in which the base cover including a magnet and the dispensing assembly including a magnet sensor, and the magnet sensor configured to detect the magnet.

An embodiment 14B can include the features of the embodiment 13B in which the base cover including three magnets, any of which are configured to activate the magnet sensor depending on a mounting angular orientation of the base cover on the beverage apparatus.

An embodiment 15B can include the features of the embodiment 1B in which the transceiver and/or the ACP processes data from the first antenna including: (a) determining an observed signal strength from the first electronic tag via the first antenna; (b) comparing the observed signal strength to a threshold signal strength; (c) generating a determination based on determining that the observed signal strength is less than the threshold signal strength; (d) ignoring the data from the first antenna based on the determination.

An embodiment 16B can include the features of the embodiment 1B in which the transceiver and/or the ACP processes data from the first antenna including: (a) determining an observed signal strength from the first electronic tag via the first antenna; (b) comparing the observed signal strength to a threshold signal strength; (c) generating a determination based on determining that the observed signal strength is greater than the threshold signal strength; (d) processing the data from the first antenna based on the determination.

An embodiment 17B can include the features of the embodiment 1B in which the selection portion is a switch that selectively (a) connects the transceiver to the first antenna for the first data transfer, and (b) connects the transceiver to the second antenna for the second data transfer.

An embodiment 18B can include the features of the embodiment 1B in which wherein (a) the first electronic tag is adhesively attached to the first vessel; and/or (b) the first electronic tag is integrated into a wall of the first vessel.

An embodiment 19B can include the features of the embodiment 1B in which wherein (a) the first electronic tag is an RFID tag, and the first electronic tag includes a first tag antenna that interfaces with the first antenna, and (b) the second electronic tag is a further RFID tag, and the second electronic tag includes a second tag antenna that interfaces with the second antenna; and (A) the selection portion performing processing including performing in sequence: (a) energizing the first antenna to provide communication, including downloading data, with the first electronic tag via the first antenna generating a carrier wave that energizes the first electronic tag; and (b) energizing the second antenna to provide communication, including downloading data, with the second electronic tag via the second antenna generating a further carrier wave that energizes the second electronic tag.

According to principles of the disclosure, in an embodiment 1C, a beverage apparatus can be hand-holdable by a user of the beverage apparatus so as to provide portability, and the beverage apparatus can comprise: (A) a beverage chamber housing that includes a chamber, and the container assembly storing a consumable liquid in the chamber; (B) a tag that includes a tag memory portion (TMP) and a tag communication element; (C) a vessel that contains an additive to be dispensed into the consumable liquid, and the vessel including a valve through which the additive is dispensed, and the tag being affixed to the vessel; (D) a dispensing assembly that includes: (a) an aperture, the aperture structured to retain the vessel such that the vessel is removable; and (b) a dispense mechanism associated with the vessel, and the dispense mechanism operable to affect transfer of the additive from the respective vessel, through the valve, into the consumable liquid; (E) a controller that includes: (a) a processer; (b) a database, and the database including instructions implemented by the processor, and the processor configured to control the dispense mechanism and to communicate with the tag; and (c) a controller communication element that interfaces with the tag communication element to transmit communications between the processor and the tag; and (F) the processor configured to perform processing including: (a) identifying a change in state of the beverage apparatus; (b) adjusting value of a state variable, based on the change in state, from a first value to a second value; and (c) writing the second value, of the state variable, to the TMP of the tag.

An embodiment 2C can include the features of the embodiment 1C in which the processor configured to perform processing including: (a) inputting a default dose from the tag; (b) determining a dispense amount, for a dispense, based on the default dose; (c) controlling the dispense mechanism to dispense the dispense amount, of the additive, into the consumable liquid; and (d) the adjusting value of the state variable includes performing fill value processing, the fill value processing including: decrementing a fill value, which constitutes the first value, of the vessel based on the dispense amount to render an adjusted fill value, which constitutes the second value; and (e) the writing the state variable to the TMP of the tag includes writing the second value to the TMP.

An embodiment 3C can include the features of the embodiment 2C in which the determining the dispense amount based on the default dose includes: comparing the dispense amount with the fill value to determine if sufficient additive is available, in the vessel, to support the dispense.

An embodiment 4C can include the features of the embodiment 2C in which the determining a dispense amount for a dispense, based on the default dose further includes: adjusting the default dose based on a taste preference coefficient (TPC) so as to generate an adjusted dispense value, and the processor using the adjusted dispense value as the dispense value.

An embodiment 5C can include the features of the embodiment 4C in which the adjusting the default dose based on the TPC includes the processor multiplying the default dose by the TPC to generate the adjusted dispense value.

An embodiment 6C can include the features of the embodiment 4C in which the processor configured to perform processing including: (a) comparing the adjusted dispense value with a maximum dose of the additive to determine if the adjusted dispense value is less than the maximum dose; and (b) determining that the adjusted dispense value is less than the maximum dose.

An embodiment 7C can include the features of the embodiment 6C in which the processor configured to perform processing including: (a) comparing the adjusted dispense value with a minimum dose of the additive to determine if the adjusted dispense value is more than the minimum dose; and (b) determining that the adjusted dispense value is more than the minimum dose.

An embodiment 8C can include the features of the embodiment 4C in which the processor configured to perform processing including: (a) inputting a maximum dose of the additive from the tag; (b) comparing the adjusted dispense value with the maximum dose of the additive to determine if the adjusted dispense value is less than the maximum dose; and (c) determining that the adjusted dispense value is less than the maximum dose.

An embodiment 9C can include the features of the embodiment 4C in which the processor configured to perform processing including: (a) inputting a minimum dose of the additive from the tag; (b) comparing the adjusted dispense value with the minimum dose of the additive to determine if the adjusted dispense value is more than the minimum dose; and (c) determining that the adjusted dispense value is more than the minimum dose.

An embodiment 10C can include the features of the embodiment 2C in which the perform fill value processing including retrieving the fill value from the TMP.

An embodiment 11C can include the features of the embodiment 10C in which the performing fill value processing further including writing the adjusted fill value to the TMP to write over the fill value in the TMP.

An embodiment 12C can include the features of the embodiment 10C in which the processor performing further processing, for a further dispense, including: (a) retrieving the adjusted fill value, which was written to the TMP so as to be a new fill value, and (b) confirming that there is sufficient additive for the further dispense based on the retrieved adjusted fill value.

An embodiment 13C can include the features of the embodiment 1C in which the processor configured to perform processing including: (a) retrieving tag warning data from the tag; (b) retrieving profile warning data from the database; (c) comparing the tag warning data and the profile warning data; and (d) determining that there is not a match between the tag warning data and the profile warning data.

An embodiment 14C can include the features of the embodiment 1C in which the processor configured to perform processing including: (a) retrieving expiry data from the tag, the expiry data including at least one selected from the group consisting of (1) an expiration date, and (2) a fill date and life duration; (b) determining, based on the expiry data, whether the vessel is or is not expired, to respectively indicative whether the vessel is or is not suitable for use; and (c) determining that the vessel is not expired.

An embodiment 15C can include the features of the embodiment 1C in which further including a light that is adjustable in color, and the light exposed to the consumable liquid; and the processor configured to perform processing including: (a) retrieving light color data from the tag; (b) controlling the light to emit a predetermined color, based on the light color data, in conjunction with operation of the dispense mechanism.

An embodiment 16C can include the features of the embodiment 1C in which the processor configured to communicate with the tag including: (a) encrypting information to be sent to the tag; and (b) the processor decrypting information received from the tag.

An embodiment 17C can include the features of the embodiment 1C in which the tag is an RFID tag that includes an integrated circuit, and the tag communication element is an antenna, and the controller communication element is a transceiver.

An embodiment 18C can include the features of the embodiment 1C in which the vessel constitutes a first vessel and, the tag constitutes a first tag, and the beverage apparatus further including a second vessel that is associated with a second tag that communicates with the controller to perform dispensing of a further additive in the further vessel.

According to principles of the disclosure, in an embodiment 1D, a method can include varying the composition of a consumable liquid in a beverage apparatus, the beverage apparatus being hand-holdable by a user of the beverage apparatus, the beverage apparatus including an internal volume that contains the consumable liquid, and the beverage apparatus including a vessel with a tag, and the vessel being removable and containing an additive. In the embodiment 1D, the method can include: (A) identifying, by the processor, a request for a dispense of an additive contained in the vessel; (B) determining, by the processor, a dispense amount for the dispense; (C) controlling, by the processor, a dispense mechanism to dispense the dispense amount, of the additive, from the vessel into the consumable liquid; (D) identifying, by the processor, a change in state of the beverage apparatus; (E) adjusting, by the processor a value of a state variable, based on the change in state, from a first value to a second value; and (F) writing, by the processor, the second value, of the state variable, to the tag.

An embodiment 2D can include the features of the embodiment 1D in which the change in state of the beverage apparatus being the dispense of the additive; and the state variable being a fill level, of additive, of the vessel.

An embodiment 3D can include the features of the embodiment 2D in which the adjusting value of the state variable from the first value to the second value is constituted by decrementing the first value, which represents fill level before dispense, to the second value, which represents fill level after the dispense.

An embodiment 4D can include the features of the embodiment 3D in which the tag including a tag memory portion (TMP) and an antenna that provides communication to the processor; and the beverage apparatus includes a receiver that communicates with the antenna.

An embodiment 5D can include the features of the embodiment 4D in which further including the processor inputting the first value from the TMP.

An embodiment 6D can include the features of the embodiment 5D in which the writing the second value, of the state variable, to the tag includes: writing over the first value in the TMP so as update the first value to the second value.

An embodiment 7D can include the features of the embodiment 6D in which the TMP including a data record with a field to store the fill level, and the update the first value to the second value is constituted by updating the field with the second value.

An embodiment 8D can include the features of the embodiment 1D in which the state variable is maintained in a tag memory portion in the tag.

An embodiment 9D can include the features of the embodiment 1D in which the state variable is maintained in a container database portion in the beverage container.

An embodiment 10D can include the features of the embodiment 1D in which the identifying a change in state includes an observed rapid deceleration; (a) the first value is a no value; (b) the second value is a yes value, to reflect that the beverage apparatus has been dropped; and (c) the writing the second value to the tag includes writing the second value to a predetermined data field in the tag.

An embodiment 11D can include the features of the embodiment 1D in which further including the processor: (a) communicating with the tag to read identification data from a user data field of the tag; (b) based on a returned value, determining that the vessel has not been associated with a previous beverage apparatus.

An embodiment 12D can include the features of the embodiment 11D in which further including the processor: (a) retrieving identification data from a database portion of the beverage apparatus; and (b) writing the identification data to a user data field in the tag so as to establish an association of the beverage apparatus with the vessel.

An embodiment 13D can include the features of the embodiment 1D in which further including the processor: (a) retrieving identification data from a database portion of the beverage apparatus; and (b) writing the identification data to a user data field in the tag so as to uniquely associate the beverage apparatus with the vessel.

An embodiment 14D can include the features of the embodiment 1D in which the identifying a change in state includes identifying an elevated temperature; and (a) the first value reflects an acceptable operating temperature; (b) the second value reflects an unacceptable operating temperature; and (c) the writing the second value to the tag includes writing the second value to a predetermined data field in the tag.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure. Accordingly, the foregoing disclosure is not intended to be construed or to limit the present disclosure or otherwise to exclude any other such embodiments, adaptations, variations, modifications and equivalent arrangements.

What is claimed is:

1. A beverage apparatus, the beverage apparatus being hand-holdable by a user of the beverage apparatus so as to provide portability, the beverage apparatus comprising:

a beverage chamber housing that includes a chamber, and the chamber storing a consumable liquid in the chamber;

a tag that includes a tag memory portion (TMP) and a tag communication element;

a vessel that contains an additive to be dispensed into the consumable liquid in the chamber, and the vessel including a valve through which the additive is dispensed, and the tag being affixed to the vessel;

a dispensing assembly that includes:

an aperture, the aperture structured to retain the vessel such that the vessel is removable; and a dispense mechanism associated with the vessel, and the dispense mechanism operable to affect transfer of the additive from the vessel, through the valve, into the consumable liquid in the chamber;

a controller that includes:

a processor;

a database, and the database including instructions implemented by the processor, and the processor configured to control the dispense mechanism and to communicate with the tag; and a controller communication element that interfaces with the tag communication element to transmit communications between the processor and the tag; and the processor configured to perform processing including:

identifying a change in state of the beverage apparatus;

adjusting value of a state variable, based on the change in state, from a first value to a second value; and writing the second value, of the state variable, to the TMP of the tag.

2. The beverage apparatus of claim 1, the processor configured to perform processing including:

inputting a default dose from the tag;

determining a dispense amount, for a dispense, based on the default dose;

controlling the dispense mechanism to dispense the dispense amount, of the additive, into the consumable liquid in the chamber; and the adjusting value of the state variable includes performing fill value processing, the fill value processing including:

decrementing a fill value, which constitutes the first value, of the vessel based on the dispense amount to render an adjusted fill value, which constitutes the second value; and the writing the state variable to the TMP of the tag includes writing the second value to the TMP.

3. The beverage apparatus of claim 2, the determining the dispense amount based on the default dose includes:

comparing the dispense amount with the fill value to determine if sufficient additive is available, in the vessel, to support the dispense.

4. The beverage apparatus of claim 2, the determining a dispense amount for a dispense, based on the default dose further includes:

adjusting the default dose based on a taste preference coefficient (TPC) so as to generate an adjusted dispense value, and the processor using the adjusted dispense value as the dispense amount.

5. The beverage apparatus of claim 4, the adjusting the default dose based on the TPC includes the processor multiplying the default dose by the TPC to generate the adjusted dispense value.

6. The beverage apparatus of claim 4, the processor configured to perform processing including:

comparing the adjusted dispense value with a maximum dose of the additive to determine if the adjusted dispense value is less than the maximum dose; and determining that the adjusted dispense value is less than the maximum dose.

7. The beverage apparatus of claim 6, the processor configured to perform processing including:

comparing the adjusted dispense value with a minimum dose of the additive to determine if the adjusted dispense value is more than the minimum dose; and determining that the adjusted dispense value is more than the minimum dose.

8. The beverage apparatus of claim 4, the processor configured to perform processing including:

inputting a maximum dose of the additive from the tag;

comparing the adjusted dispense value with the maximum dose of the additive to determine if the adjusted dispense value is less than the maximum dose; and determining that the adjusted dispense value is less than the maximum dose.

9. The beverage apparatus of claim 4, the processor configured to perform processing including:

inputting a minimum dose of the additive from the tag;

comparing the adjusted dispense value with the minimum dose of the additive to determine if the adjusted dispense value is more than the minimum dose; and determining that the adjusted dispense value is more than the minimum dose.

10. The beverage apparatus of claim 2, the performing fill value processing including retrieving the fill value from the TMP.

11. The beverage apparatus of claim 10, the performing fill value processing further including writing the adjusted fill value to the TMP to write over the fill value in the TMP.

12. The beverage apparatus of claim 10, the processor performing further processing, for a further dispense, including:

retrieving the adjusted fill value, which was written to the TMP so as to be a new fill value, and confirming that there is sufficient additive for the further dispense based on the retrieved adjusted fill value.

13. The beverage apparatus of claim 1, the processor configured to perform processing including:

retrieving tag warning data from the tag;

retrieving profile warning data from the database;

comparing the tag warning data and the profile warning data; and determining that there is not a match between the tag warning data and the profile warning data.

14. The beverage apparatus of claim 1, the processor configured to perform processing including:

retrieving expiry data from the tag, the expiry data including at least one selected from the group consisting of (1) an expiration date, and (2) a fill date and life duration;

determining, based on the expiry data, whether the vessel is or is not expired, to respectively indicate whether the vessel is not or is suitable for use; and determining that the vessel is not expired.

15. The beverage apparatus of claim 1, further including a light that is adjustable in color, and the light exposed to the consumable liquid; and the processor configured to perform processing including:

retrieving light color data from the tag;

controlling the light to emit a predetermined color, based on the light color data, in conjunction with operation of the dispense mechanism.

16. The beverage apparatus of claim 1, the processor configured to communicate with the tag including:

encrypting information to be sent to the tag; and the processor decrypting information received from the tag.

17. The beverage apparatus of claim 1, the tag is an RFID tag that includes an integrated circuit, and the tag communication element is an antenna, and the controller communication element is a transceiver.

18. The beverage apparatus of claim 1, the vessel constitutes a first vessel and, the tag constitutes a first tag, and the beverage apparatus further including a second vessel that is associated with a second tag that communicates with the controller to perform dispensing of a further additive from the second vessel.

* * * * *